US012634097B2

(12) United States Patent
Ma et al.

(10) Patent No.: US 12,634,097 B2
(45) Date of Patent: May 19, 2026

(54) BANDWIDTH PART SWITCHING BY ACTIVATION AND SIGNALING

(71) Applicant: QUALCOMM Incorporated, San Diego, CA (US)

(72) Inventors: Liangping Ma, San Diego, CA (US); Xiao Feng Wang, San Diego, CA (US); Alberto Rico Alvarino, San Diego, CA (US); Peter Pui Lok Ang, San Diego, CA (US); Ayan Sengupta, San Diego, CA (US); Bharat Shrestha, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 351 days.

(21) Appl. No.: 17/359,377

(22) Filed: Jun. 25, 2021

(65) Prior Publication Data

US 2022/0006600 A1 Jan. 6, 2022

Related U.S. Application Data

(60) Provisional application No. 63/047,904, filed on Jul. 2, 2020.

(51) Int. Cl.
H04L 5/00 (2006.01)
H04B 7/185 (2006.01)

(52) U.S. Cl.
CPC ....... H04L 5/0098 (2013.01); H04B 7/18513 (2013.01)

(58) Field of Classification Search
None
See application file for complete search history.

(56) References Cited

U.S. PATENT DOCUMENTS 10,863,571 B2 12/2020 Cirik et al.
2012/0083299 A1* 4/2012 Kruglick .................. H04B 7/01
455/501

(Continued)

FOREIGN PATENT DOCUMENTS

WO WO-2019040579 A1 2/2019
WO WO-2019070579 A1 4/2019

(Continued)

OTHER PUBLICATIONS

International Search Report and Written Opinion—PCT/US2021/039336—ISA/EPO—Oct. 12, 2021 (205701WO).

(Continued)

*Primary Examiner* — Jeffrey M Rutkowski
*Assistant Examiner* — Mehedi S Aley
(74) *Attorney, Agent, or Firm* — Holland & Hart LLP/QUALCOMM Incorporated

(57) ABSTRACT

Methods, systems, and devices for wireless communications are described. Various techniques for bandwidth part activation and signaling are described. Control messaging may be used to indicate a mapping of beams and bandwidth part to respective indices, such as a bandwidth part identifier or a transmission configuration indicator (TCI) state codepoint. Further control messaging may specify one of these indices, and a user equipment (UE) may communicate with a network entity, such as a satellite or base station using a bandwidth part in a beam specified in the control messaging.

29 Claims, 21 Drawing Sheets

(56) References Cited

U.S. PATENT DOCUMENTS

| | | | | |
|---|---|---|---|---|
| 2019/0150172 A1* | 5/2019 | Ang | H04W 72/1268 370/329 |
| 2019/0166066 A1 | 5/2019 | Ang et al. | |
| 2019/0239245 A1 | 8/2019 | Davydov et al. | |
| 2019/0260532 A1 | 8/2019 | Manolakos et al. | |
| 2019/0296956 A1 | 9/2019 | John Wilson et al. | |
| 2019/0306924 A1 | 10/2019 | Zhang et al. | |
| 2019/0313357 A1 | 10/2019 | Wang et al. | |
| 2019/0313411 A1 | 10/2019 | Ly et al. | |
| 2020/0052782 A1 | 2/2020 | Wang et al. | |
| 2020/0153500 A1* | 5/2020 | Kim | H04B 17/318 |
| 2020/0229161 A1* | 7/2020 | Raghavan | H04W 24/10 |
| 2020/0374890 A1 | 11/2020 | Wu et al. | |
| 2021/0006328 A1* | 1/2021 | Kim | H04W 72/23 |
| 2021/0067979 A1* | 3/2021 | Rahman | H04L 5/0023 |
| 2021/0360594 A1* | 11/2021 | Park | H04L 5/0048 |
| 2021/0385832 A1* | 12/2021 | Zhang | H04B 7/0695 |
| 2022/0007248 A1 | 1/2022 | Shrestha et al. | |
| 2022/0007346 A1 | 1/2022 | Ma et al. | |
| 2022/0007351 A1 | 1/2022 | Ma et al. | |
| 2022/0007372 A1 | 1/2022 | Ma et al. | |
| 2022/0029692 A1* | 1/2022 | Yang | H04B 7/0862 |
| 2022/0109478 A1* | 4/2022 | Wei | H04W 72/23 |
| 2022/0167338 A1 | 5/2022 | Cao et al. | |
| 2022/0338230 A1 | 10/2022 | Yu et al. | |
| 2022/0377770 A1* | 11/2022 | Li | H04W 48/20 |
| 2023/0132040 A1* | 4/2023 | Gao | H04W 72/23 370/329 |
| 2023/0164711 A1 | 5/2023 | Ma et al. | |
| 2023/0188308 A1 | 6/2023 | Karjalainen et al. | |
| 2023/0224725 A1 | 7/2023 | Ma et al. | |
| 2023/0232384 A1 | 7/2023 | Ma et al. | |

FOREIGN PATENT DOCUMENTS

| | | |
|---|---|---|
| WO | WO-2019094781 A2 | 5/2019 |
| WO | WO-2019095656 A1 | 5/2019 |
| WO | WO-2019195528 A1 | 10/2019 |
| WO | WO-2020092561 A1 | 5/2020 |
| WO | WO-2021161065 A1 | 8/2021 |
| WO | WO-2021163877 A1 | 8/2021 |
| WO | WO-2021255491 A1 | 12/2021 |

OTHER PUBLICATIONS

OPPO: "Discussion on Multi-Beam Operation Enhancements", 3GPP Draft, 3GPP TSG RAN WG1 #98, R1-1908352, 3rd Generation Partnership Project (3GPP), Mobile Competence Centre, 650, Route Des Lucioles, F-06921, Sophia-Antipolis Cedex, France, vol. RAN WG1, No. Prague, CZ, Aug. 26, 2019-Aug. 30, 2019, Aug. 17, 2019 (Aug. 17, 2019), XP051764961, 9 pages, Retrieved from the Internet: URL: http://www.3gpp.org/ftp/tsg_ran/WG1_RL1/TSGR1_98/Docs/R1-1908352.zip [retrieved on Aug. 17, 2019] p. 2, line 25—p. 3, line 21 p. 8, line 3-line 20, paragraph [02. 4].

Panasonic: "Discussion on Beam Management and Polarization for NTN", 3GPP TSG RAN WG1 #99, 3rd Generation Partnership Project (3GPP), Mobile Competence Centre, 650, Route Des Lucioles, F-06921 Sophia-Antipolis Cedex, France, R1-1912902, Reno, USA, Nov. 18-22, 2019, Nov. 8, 2019 (Nov. 8, 2019), 3 Pages, XP051820237, Retrieved from the Internet: URL: https://ftp.3gpp.org/tsg_ran/WG1_RL1/TSGR1_99/Docs/R1-1912902.zip. R1-1912902 NTN BM and Polarization.docx [Retrieved on Nov. 8, 2019], Section 2.

3GPP TS 38.213: 3rd Generation Partnership Project, Technical Specification Group Radio Access Network, NR, Physical layer procedures for control (Release 16), V16.1.0, Mar. 2020, 3GPP Organizational Partners, Sophia Antipolis Valbonne, France, Section 12, Bandwidth part operation, 5 pages.

3GPP TS 38.331: 3rd Generation Partnership Project, Technical Specification Group Radio Access Network, NR, Radio Resource Control (RRC) Protocol Specification (Release 16), V16.0.0, Mar. 2020, 3GPP Organizational Partners, Sophia Antipolis Valbonne, France, Section 6.3.2, pp. 567-577, 13 Pages.

Asia Pacific Telecom: "Discussion on Physical Layer Control Procedures for NTN [online]", 3GPP Tsg-Ran WG1 Meeting #98, R1-1908934, Prague, Czech Republic, Aug. 26, 2019-Aug. 30, 2019, Aug. 26, 2019, 6 Pages.

CATT: "Physical Layer Control Procedure Enhancement", 3GPP Tsg Ran WG1 Meeting #99, R1-1912164, Reno, USA, Nov. 18, 2019-Nov. 22, 2019, Nov. 18, 2019, 4 Pages.

Mediatek Inc: "Physical Layer Control Procedure in NR-NTN [online]", 3GPP Tsg Ran WG1 Meeting #99, R1-1912123, Reno, Nevada, US, Nov. 18, 2019- Nov. 22, 2019, Nov. 18, 2019, 5 Pages.

Qualcomm Incorporated: "Bwp Operation and Other Issues for NTN [online]", 3GPP TSG RAN WG1 #103-e, R1-2009265, 3rd Generation Partnership Project, Mobile Competence Centre, 650, Route Des Lucioles, F-06921 Sophia-Antipolis Cedex, France, vol. Ran WG1, No. e-Meeting, Oct. 26, 2020-Nov. 13, 2020, Oct. 24, 2020, pp. 1-11, Oct. 26, 2020, XP051946928.

* cited by examiner

First Control Message 210

Second Control Message 215

Beam Footprint 220

200

305

| Serving Cell ID | CORESET ID | Oct 1 |
| CORESET ID | TCI State ID (TCI State of Satellite-beam-index-type) | Oct 2 |

300-a

310

| Serving Cell ID | Sub TCI State ID | Oct 1 |
| | TCI State ID (TCI State of Satellite-beam-index-type) | Oct 2 |

315

| Serving Cell ID | CORESET ID | Oct 1 |
| CORESET ID | TCI State ID (e.g., QCL-Type A) | Oct 2 |

300-b

710

715

720

705

700

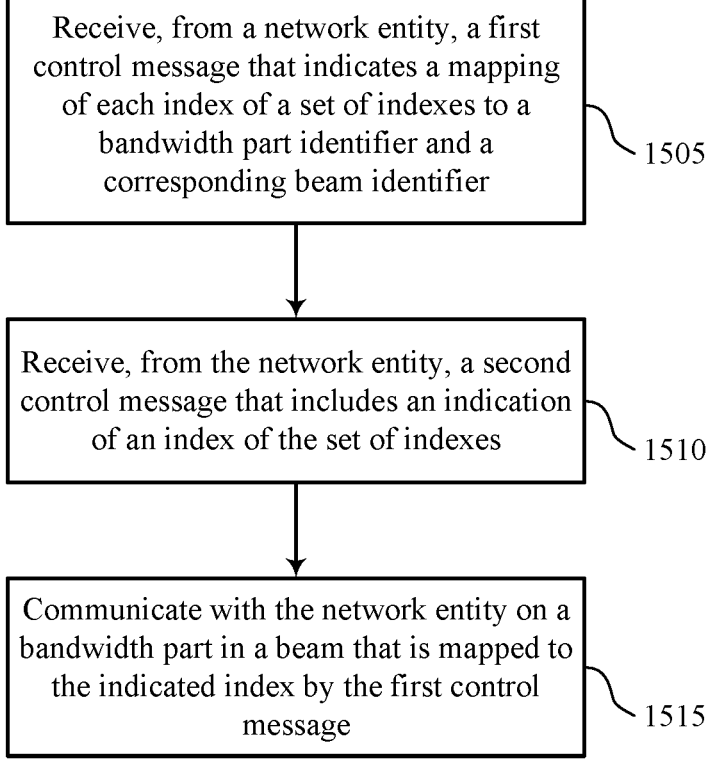

Receive, from a network entity, a first control message that indicates a mapping of each index of a set of indexes to a bandwidth part identifier and a corresponding beam identifier

1505

Receive, from the network entity, a second control message that includes an indication of an index of the set of indexes

1510

Communicate with the network entity on a bandwidth part in a beam that is mapped to the indicated index by the first control message

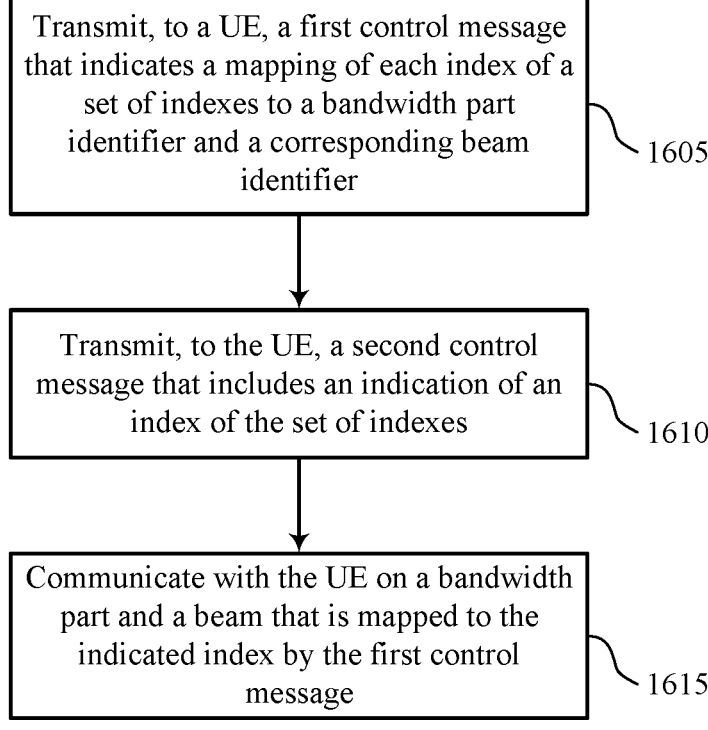

Transmit, to a UE, a first control message that indicates a mapping of each index of a set of indexes to a bandwidth part identifier and a corresponding beam identifier

1605

Transmit, to the UE, a second control message that includes an indication of an index of the set of indexes

1610

Communicate with the UE on a bandwidth part and a beam that is mapped to the indicated index by the first control message

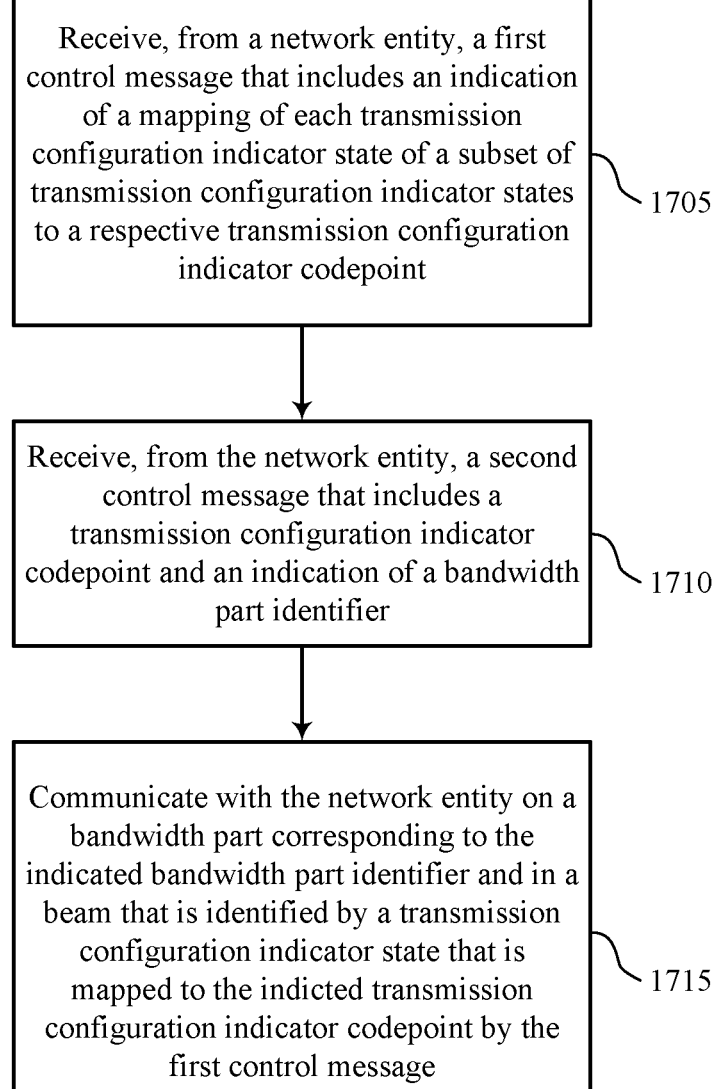

Receive, from a network entity, a first control message that includes an indication of a mapping of each transmission configuration indicator state of a subset of transmission configuration indicator states to a respective transmission configuration indicator codepoint

1705

Receive, from the network entity, a second control message that includes a transmission configuration indicator codepoint and an indication of a bandwidth part identifier

1710

Communicate with the network entity on a bandwidth part corresponding to the indicated bandwidth part identifier and in a beam that is identified by a transmission configuration indicator state that is mapped to the indicted transmission configuration indicator codepoint by the first control message

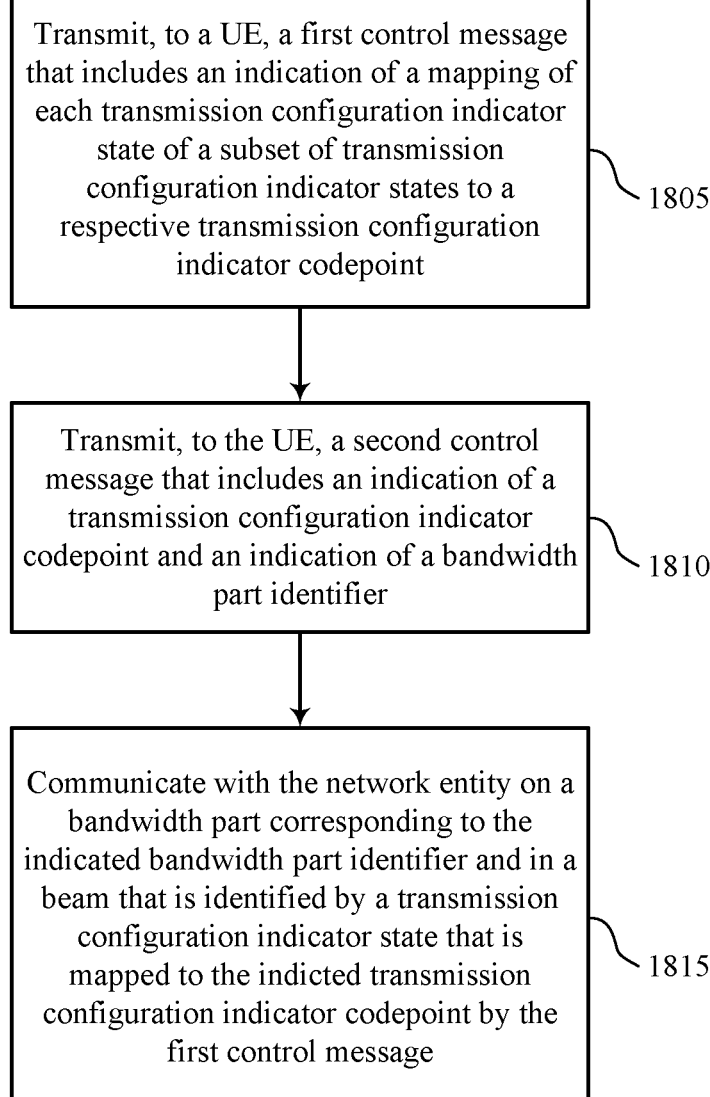

Transmit, to a UE, a first control message that includes an indication of a mapping of each transmission configuration indicator state of a subset of transmission configuration indicator states to a respective transmission configuration indicator codepoint

1805

Transmit, to the UE, a second control message that includes an indication of a transmission configuration indicator codepoint and an indication of a bandwidth part identifier

1810

Communicate with the network entity on a bandwidth part corresponding to the indicated bandwidth part identifier and in a beam that is identified by a transmission configuration indicator state that is mapped to the indicted transmission configuration indicator codepoint by the first control message

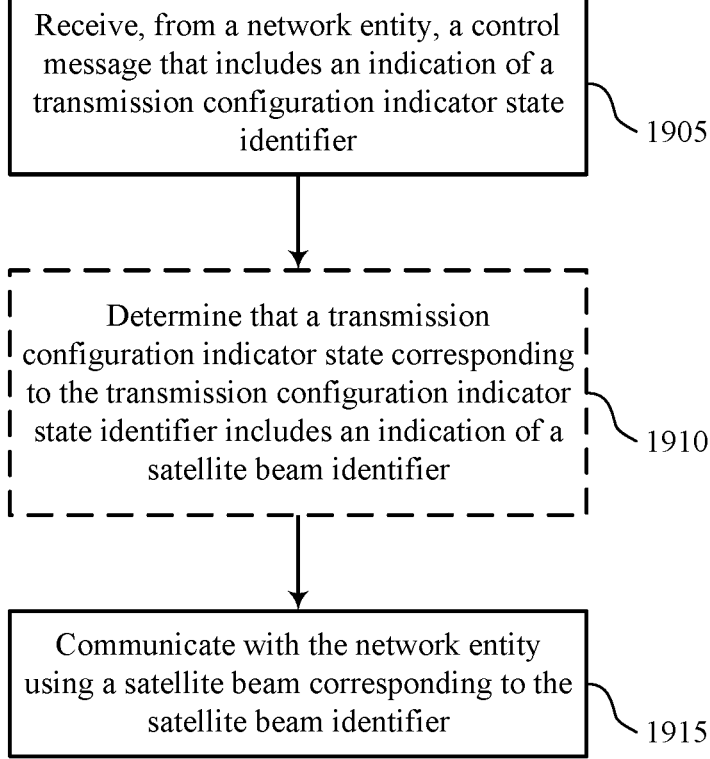

Receive, from a network entity, a control message that includes an indication of a transmission configuration indicator state identifier

1905

Determine that a transmission configuration indicator state corresponding to the transmission configuration indicator state identifier includes an indication of a satellite beam identifier

1910

Communicate with the network entity using a satellite beam corresponding to the satellite beam identifier

Figure 20:
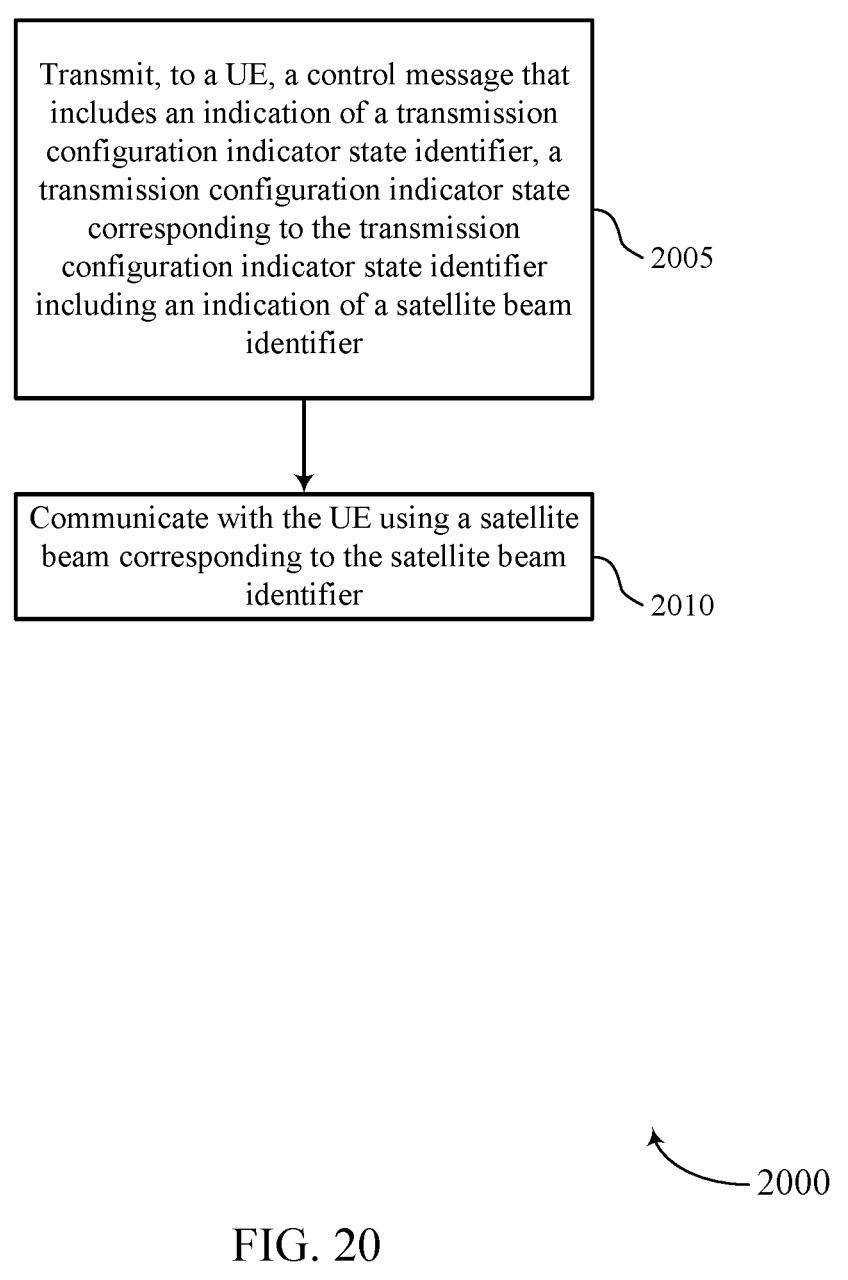

Transmit, to a UE, a control message that includes an indication of a transmission configuration indicator state identifier, a transmission configuration indicator state corresponding to the transmission configuration indicator state identifier including an indication of a satellite beam identifier

2005

Communicate with the UE using a satellite beam corresponding to the satellite beam identifier

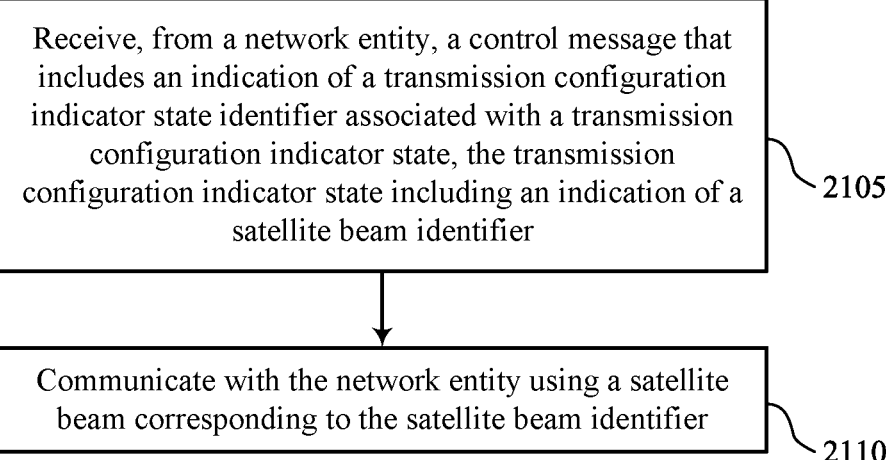

Receive, from a network entity, a control message that
includes an indication of a transmission configuration
indicator state identifier associated with a transmission
configuration indicator state, the transmission
configuration indicator state including an indication of a
satellite beam identifier

2105

Communicate with the network entity using a satellite
beam corresponding to the satellite beam identifier

BANDWIDTH PART SWITCHING BY ACTIVATION AND SIGNALING

CROSS REFERENCE

The present Application for Patent claims the benefit of U.S. Provisional Patent Application No. 63/047,904 by MA et al., entitled "BANDWIDTH PART SWITCHING BY ACTIVATION AND SIGNALING," filed Jul. 2, 2020, assigned to the assignee hereof, and expressly incorporated by reference herein.

INTRODUCTION

The following relates to wireless communications and more specifically to bandwidth part switching.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communications at a UE is described. The method may include receiving, from a network entity, a first control message that includes an indication of a mapping of each transmission configuration indicator (TCI) state of a subset of TCI states to a respective transmission configuration indicator codepoint. The method may further include receiving, from the network entity, a second control message that includes a transmission configuration indicator codepoint and an indication of a bandwidth part identifier. The method may further include communicating with the network entity on a bandwidth part corresponding to the indicated bandwidth part identifier and in a beam that is identified by a TCI state that is mapped to the indicted transmission configuration indicator codepoint by the first control message.

An apparatus for wireless communications at a UE is described. The apparatus may include a processor, memory coupled with the processor, the processor and memory configured to receive, from a network entity, a first control message that includes an indication of a mapping of each TCI state of a subset of TCI states to a respective transmission configuration indicator codepoint. The processor and memory may be further configured to receive, from the network entity, a second control message that includes a transmission configuration indicator codepoint and an indication of a bandwidth part identifier. The processor and memory may be further configured to communicate with the network entity on a bandwidth part corresponding to the indicated bandwidth part identifier and in a beam that is identified by a TCI state that is mapped to the indicted transmission configuration indicator codepoint by the first control message.

Another apparatus for wireless communications at a UE is described. The apparatus may include means for receiving, from a network entity, a first control message that includes an indication of a mapping of each TCI state of a subset of TCI states to a respective transmission configuration indicator codepoint. The apparatus may further include means for receiving, from the network entity, a second control message that includes a transmission configuration indicator codepoint and an indication of a bandwidth part identifier. The apparatus may further include means for communicating with the network entity on a bandwidth part corresponding to the indicated bandwidth part identifier and in a beam that is identified by a TCI state that is mapped to the indicted transmission configuration indicator codepoint by the first control message.

A non-transitory computer-readable medium storing code for wireless communications at a UE is described. The code may include instructions executable by a processor to receive, from a network entity, a first control message that includes an indication of a mapping of each TCI state of a subset of TCI states to a respective transmission configuration indicator codepoint. The code may include instructions executable by a processor to receive, from the network entity, a second control message that includes a transmission configuration indicator codepoint and an indication of a bandwidth part identifier. The code may include instructions executable by a processor to communicate with the network entity on a bandwidth part corresponding to the indicated bandwidth part identifier and in a beam that is identified by a TCI state that is mapped to the indicted transmission configuration indicator codepoint by the first control message.

In some examples of the method, apparatuses, and non-transitory computer-readable medium described herein, receiving the second control message may include operations, features, means, or instructions for receiving, from the network entity, the second control message in a single transmission that includes the transmission configuration indicator codepoint and the indication of the bandwidth part identifier.

In some examples of the method, apparatuses, and non-transitory computer-readable medium described herein, receiving the second control message may include operations, features, means, or instructions for receiving the second control message that indicates a TCI state identifier corresponding to the TCI state having a TCI state type corresponding to a satellite beam index type.

Some examples of the method, apparatuses, and non-transitory computer-readable medium described herein may further include operations, features, means, or instructions for receiving, from the network entity, a radio resource control (RRC) message that configures a set of TCI states that include a TCI state identifier, a TCI state type, and a satellite beam identifier, the first control message including the indication of the mapping of each transmission configuration indicator state to the respective transmission configuration indicator codepoint.

In some examples of the method, apparatuses, and non-transitory computer-readable medium described herein, receiving the first control message may include operations, features, means, or instructions for receiving a medium access control-control element (MAC-CE) message that indicates the mapping.

In some examples of the method, apparatuses, and non-transitory computer-readable medium described herein, receiving the first control message may include operations, features, means, or instructions for receiving a bitmap, each value in the bitmap indicating an activation state of a corresponding TCI state, the respective TCI codepoint being mapped to the TCI state based on the activation state being an active state as indicated by the bitmap.

In some examples of the method, apparatuses, and non-transitory computer-readable medium described herein, receiving the second control message may include operations, features, means, or instructions for receiving a downlink control information (DCI) message that includes the transmission configuration indicator codepoint and the bandwidth part identifier.

Some examples of the method, apparatuses, and non-transitory computer-readable medium described herein may further include operations, features, means, or instructions for receiving a RRC message that indicates that the UE may be to switch an uplink bandwidth part when a downlink bandwidth part may be switched by the transmission configuration indicator codepoint of the second control message.

Some examples of the method, apparatuses, and non-transitory computer-readable medium described herein may further include operations, features, means, or instructions for determining that the bandwidth part corresponding to the indicated bandwidth part identifier may be different from a current bandwidth part and identifying an uplink bandwidth part different from the current bandwidth part based on determining that the bandwidth part may be different from the current bandwidth part in accordance with the RRC message.

In some examples of the method, apparatuses, and non-transitory computer-readable medium described herein, communicating with the network entity may include operations, features, means, or instructions for determining that the beam that may be identified by the TCI state may be different from a current beam and performing a beam switch procedure to communicate with the network entity on the bandwidth part in the beam based on determining that the beam may be different from the current beam.

In some examples of the method, apparatuses, and non-transitory computer-readable medium described herein, performing the beam switch procedure may include operations, features, means, or instructions for identifying one or more default bandwidth parts that correspond to the beam.

In some examples of the method, apparatuses, and non-transitory computer-readable medium described herein, performing the beam switch procedure may include operations, features, means, or instructions for adjusting a frequency compensation, a timing parameter, or a combination thereof corresponding to the beam.

In some examples of the method, apparatuses, and non-transitory computer-readable medium described herein, de-mapping the transmission configuration indicator codepoint based on the mapping indicated in the first control message to identify the TCI state that indicates the beam.

Some examples of the method, apparatuses, and non-transitory computer-readable medium described herein may further include operations, features, means, or instructions for identifying the beam from the TCI state based on a satellite beam identifier, a cell identifier, or a synchronization signal block index included in the TCI state.

In some examples of the method, apparatuses, and non-transitory computer-readable medium described herein, the first control message may be a medium access control layer signaling message and the second control message may be a physical layer signaling message.

A method is described. The method may include transmitting, to a UE, a first control message that includes an indication of a mapping of each TCI state of a subset of TCI states to a respective transmission configuration indicator codepoint. The method may further include transmitting, to the UE, a second control message that includes an indication of a transmission configuration indicator codepoint and an indication of a bandwidth part identifier. The method may further include communicating with the network entity on a bandwidth part corresponding to the indicated bandwidth part identifier and in a beam that is identified by a TCI state that is mapped to the indicted transmission configuration indicator codepoint by the first control message.

An apparatus is described. The apparatus may include a processor, memory coupled with the processor, and the processor and memory configured to transmit, to a UE, a first control message that includes an indication of a mapping of each TCI state of a subset of TCI states to a respective transmission configuration indicator codepoint. The processor and memory may be configured to transmit, to the UE, a second control message that includes an indication of a transmission configuration indicator codepoint and an indication of a bandwidth part identifier. The processor and memory may be configured to communicate with the network entity on a bandwidth part corresponding to the indicated bandwidth part identifier and in a beam that is identified by a TCI state that is mapped to the indicted transmission configuration indicator codepoint by the first control message.

Another apparatus is described. The apparatus may include means for transmitting, to a UE, a first control message that includes an indication of a mapping of each TCI state of a subset of TCI states to a respective transmission configuration indicator codepoint. The apparatus may also include means for transmitting, to the UE, a second control message that includes an indication of a transmission configuration indicator codepoint and an indication of a bandwidth part identifier. The apparatus may also include means for communicating with the network entity on a bandwidth part corresponding to the indicated bandwidth part identifier and in a beam that is identified by a TCI state that is mapped to the indicted transmission configuration indicator codepoint by the first control message.

A non-transitory computer-readable medium storing code is described. The code may include instructions executable by a processor to transmit, to a UE, a first control message that includes an indication of a mapping of each TCI state of a subset of TCI states to a respective transmission configuration indicator codepoint. The code may include instructions executable by the processor to transmit, to the UE, a second control message that includes an indication of a transmission configuration indicator codepoint and an indication of a bandwidth part identifier. The code may include instructions executable by the processor to communicate with the network entity on a bandwidth part corresponding to the indicated bandwidth part identifier and in a beam that is identified by a TCI state that is mapped to the indicted transmission configuration indicator codepoint by the first control message.

In some examples of the method, apparatuses, and non-transitory computer-readable medium described herein, transmitting the second control message may include operations, features, means, or instructions for transmit, by the network entity, the second control message in a single transmission that includes the transmission configuration indicator codepoint and the indication of the bandwidth part identifier.

In some examples of the method, apparatuses, and non-transitory computer-readable medium described herein, transmitting the second control message may include operations, features, means, or instructions for transmitting the second control message that indicates the transmission configuration indicator codepoint corresponding to the TCI state having a TCI state type corresponding to a satellite beam index type.

Some examples of the method, apparatuses, and non-transitory computer-readable medium described herein may further include operations, features, means, or instructions for transmitting, to the UE, a RRC message that configures a set of TCI states (e.g., set of transmission configuration indicator states) that include a TCI state identifier, a TCI state type, and a satellite beam identifier, the first control message including the indication of the mapping of each TCI state to the respective TCI codepoint.

A method is described. The method may include receiving, from a network entity, a control message that includes an indication of a TCI state identifier associated with a TCI state, the TCI state including an indication of a satellite beam identifier. The method may include communicating with the network entity using a satellite beam corresponding to the satellite beam identifier.

An apparatus is described. The apparatus may include a processor, memory coupled with the processor, the processor and memory configured to receive, from a network entity, a control message that includes an indication of a TCI state identifier associated with a TCI state, the TCI state including an indication of a satellite beam identifier. The processor and memory may be configured to communicate with the network entity using a satellite beam corresponding to the satellite beam identifier.

Another apparatus is described. The apparatus may include means for receiving, from a network entity, a control message that includes an indication of a TCI state identifier associated with a TCI state, the TCI state including an indication of a satellite beam identifier. The apparatus may include means for communicating with the network entity using a satellite beam corresponding to the satellite beam identifier.

A non-transitory computer-readable medium storing code is described. The code may include instructions executable by a processor to receive, from a network entity, a control message that includes an indication of a TCI state identifier associated with a TCI state, the TCI state including an indication of a satellite beam identifier. The code may include instructions executable by a processor to communicate with the network entity using a satellite beam corresponding to the satellite beam identifier.

Some examples of the method, apparatuses, and non-transitory computer-readable medium described herein may further include operations, features, means, or instructions for receiving, from the network entity, a RRC message that configures a set of TCI states that include a TCI state identifier, a TCI state type, and a satellite beam identifier, the control message including the indication of a TCI state identifier configured by the RRC message.

Some examples of the method, apparatuses, and non-transitory computer-readable medium described herein may further include operations, features, means, or instructions for determining that the TCI state may have a TCI state type of satellite beam index type.

A method is described. The method may include transmitting, to a UE, a control message that includes an indication of a TCI state identifier, a TCI state corresponding to the TCI state identifier including an indication of a satellite beam identifier. The method may include communicating with the UE using a satellite beam corresponding to the satellite beam identifier.

An apparatus is described. The apparatus may include a processor, memory coupled with the processor, the processor and memory configured to transmit, to a UE, a control message that includes an indication of a TCI state identifier, a TCI state corresponding to the TCI state identifier including an indication of a satellite beam identifier. The processor and memory may be configured to communicate with the UE using a satellite beam corresponding to the satellite beam identifier.

Another apparatus is described. The apparatus may include means for transmitting, to a UE, a control message that includes an indication of a TCI state identifier, a TCI state corresponding to the TCI state identifier including an indication of a satellite beam identifier. The apparatus may include means for communicating with the UE using a satellite beam corresponding to the satellite beam identifier.

A non-transitory computer-readable medium storing code is described. The code may include instructions executable by a processor to transmit, to a UE, a control message that includes an indication of a TCI state identifier, a TCI state corresponding to the TCI state identifier including an indication of a satellite beam identifier. The code may include instructions executable by the processor to communicate with the UE using a satellite beam corresponding to the satellite beam identifier.

Some examples of the method, apparatuses, and non-transitory computer-readable medium described herein may further include operations, features, means, or instructions for transmitting, to the UE, a RRC message that configures a set TCI states that include a TCI state identifier, a TCI state type, and a satellite beam identifier, the control message including the indication of a TCI state identifier configured by the RRC message.

In some examples of the method, apparatuses, and non-transitory computer-readable medium described herein, transmitting the control message may include operations, features, means, or instructions for transmitting the control message that indicates the TCI state that may be associated with may have a TCI state type of satellite beam index type.

A method for wireless communications at a UE is described. The method may include receiving, from a network entity, a first control message that indicates a mapping of each index of a set of indexes to a bandwidth part identifier and a corresponding beam identifier. The method may include receiving, from the network entity, a second control message that includes an indication of an index of the set of indexes. The method may include communicating with the network entity on a bandwidth part in a beam that is mapped to the indicated index by the first control message.

An apparatus for wireless communications at a UE is described. The apparatus may include a processor, memory coupled with the processor, the processor and memory configured to receive, from a network entity, a first control message that indicates a mapping of each index of a set of indexes to a bandwidth part identifier and a corresponding beam identifier. The processor and memory may be configured to receive, from the network entity, a second control message that includes an indication of an index of the set of indexes. The processor and memory may be configured to communicate with the network entity on a bandwidth part in a beam that is mapped to the indicated index by the first control message.

Another apparatus for wireless communications at a UE is described. The apparatus may include means for receiving, from a network entity, a first control message that indicates a mapping of each index of a set of indexes to a bandwidth part identifier and a corresponding beam identifier. The apparatus may include means for receiving, from the network entity, a second control message that includes an indication of an index of the set of indexes. The apparatus may include means for communicating with the network entity on a bandwidth part in a beam that is mapped to the indicated index by the first control message.

A non-transitory computer-readable medium storing code for wireless communications at a UE is described. The code may include instructions executable by a processor to receive, from a network entity, a first control message that indicates a mapping of each index of a set of indexes to a bandwidth part identifier and a corresponding beam identifier. The code may include instructions executable by a processor to receive, from the network entity, a second control message that includes an indication of an index of the set of indexes. The code may include instructions executable by a processor to communicate with the network entity on a bandwidth part in a beam that is mapped to the indicated index by the first control message.

In some examples of the method, apparatuses, and non-transitory computer-readable medium described herein, receiving the first control message may include operations, features, means, or instructions for receiving the first control message that indicates the mapping of each index to the bandwidth part identifier, the corresponding beam identifier, and a satellite identifier.

In some examples of the method, apparatuses, and non-transitory computer-readable medium described herein, receiving the first control message may include operations, features, means, or instructions for receiving a MAC-CE (MAC-CE) message that indicates the mapping.

A method is described. The method may include transmitting, to a UE, a first control message that indicates a mapping of each index of a set of indexes to a bandwidth part identifier and a corresponding beam identifier. The method may include transmitting, to the UE, a second control message that includes an indication of an index of the set of indexes. The method may include communicating with the UE on a bandwidth part and a beam that is mapped to the indicated index by the first control message.

An apparatus is described. The apparatus may include a processor, memory coupled with the processor, and instructions stored in the memory. The instructions may be executable by the processor to cause the apparatus to transmit, to a UE, a first control message that indicates a mapping of each index of a set of indexes to a bandwidth part identifier and a corresponding beam identifier. The instructions may be executable by the processor to cause the apparatus to transmit, to the UE, a second control message that includes an indication of an index of the set of indexes. The instructions may be executable by the processor to cause the apparatus to communicate with the UE on a bandwidth part and a beam that is mapped to the indicated index by the first control message.

Another apparatus is described. The apparatus may include means for transmitting, to a UE, a first control message that indicates a mapping of each index of a set of indexes to a bandwidth part identifier and a corresponding beam identifier. The apparatus may include means for transmitting, to the UE, a second control message that includes an indication of an index of the set of indexes. The apparatus may include means for communicating with the UE on a bandwidth part and a beam that is mapped to the indicated index by the first control message.

A non-transitory computer-readable medium storing code is described. The code may include instructions executable by a processor to transmit, to a UE, a first control message that indicates a mapping of each index of a set of indexes to a bandwidth part identifier and a corresponding beam identifier. The code may include instructions executable by the processor to transmit, to the UE, a second control message that includes an indication of an index of the set of indexes. The code may include instructions executable by a processor to communicate with the UE on a bandwidth part and a beam that is mapped to the indicated index by the first control message.

In some examples of the method, apparatuses, and non-transitory computer-readable medium described herein, transmitting the first control message may include operations, features, means, or instructions for transmitting the first control message that indicates the mapping of each index to the bandwidth part identifier, the corresponding beam identifier, and a satellite identifier.

A method of wireless communications at a UE is described. The method may include receiving, from a network entity, a first control message that indicates a mapping of each index of a set of indexes to a bandwidth part identifier and a corresponding beam identifier. The method may further include receiving, from the network entity, a second control message that includes an indication of an index of the set of indexes. The method may further include communicating with the network entity on a bandwidth part in a beam that is mapped to the indicated index by the first control message.

An apparatus for wireless communications at a UE is described. The apparatus may include a processor and memory coupled with the processor. The processor and memory are configured to receive, from a network entity, a first control message that indicates a mapping of each index of a set of indexes to a bandwidth part identifier and a corresponding beam identifier. The processor and memory are further configured to receive, from the network entity, a second control message that includes an indication of an index of the set of indexes. The processor and memory are further configured to communicate with the network entity on a bandwidth part in a beam that is mapped to the indicated index by the first control message.

Another apparatus for wireless communications at a UE is described. The apparatus may include means for receiving, from a network entity, a first control message that indicates a mapping of each index of a set of indexes to a bandwidth part identifier and a corresponding beam identifier. The apparatus may include means for receiving, from the network entity, a second control message that includes an indication of an index of the set of indexes. The apparatus may further include means for communicating with the network entity on a bandwidth part in a beam that is mapped to the indicated index by the first control message.

A non-transitory computer-readable medium storing code for wireless communications at a UE is described. The code may include instructions executable by a processor to receive, from a network entity, a first control message that indicates a mapping of each index of a set of indexes to a bandwidth part identifier and a corresponding beam identifier. The instructions may be further executable by the processor to receive, from the network entity, a second control message that includes an indication of an index of the set of indexes. The instructions may be further executable by the processor to communicate with the network entity on a bandwidth part in a beam that is mapped to the indicated index by the first control message.

Some examples of the method, apparatuses, and non-transitory computer-readable medium described herein may further include operations, features, means, or instructions for receiving a MAC-CE (MAC-CE) message that indicates the mapping.

Some examples of the method, apparatuses, and non-transitory computer-readable medium described herein may further include operations, features, means, or instructions for receiving the first control message that indicates the mapping such that each index may be mapped to the bandwidth part identifier corresponding to an uplink bandwidth part or such that each index may be mapped to the bandwidth part identifier corresponding to a downlink bandwidth part.

Some examples of the method, apparatuses, and non-transitory computer-readable medium described herein may further include operations, features, means, or instructions for receiving the first control messages that indicates the mapping of each index to the bandwidth part identifier, the corresponding beam identifier, and a satellite identifier.

Some examples of the method, apparatuses, and non-transitory computer-readable medium described herein may further include operations, features, means, or instructions for receiving the first control message that indicates the mapping based on the corresponding beam identifier being included in a parameter of a bandwidth part indicated by the corresponding bandwidth part identifier.

Some examples of the method, apparatuses, and non-transitory computer-readable medium described herein may further include operations, features, means, or instructions for receiving a DCI message that includes the indication of the index.

In some examples of the method, apparatuses, and non-transitory computer-readable medium described herein, the indication of the index includes a bandwidth part index field.

Some examples of the method, apparatuses, and non-transitory computer-readable medium described herein may further include operations, features, means, or instructions for receiving a third control message having a same format as the first control message, the third control message indicating a new mapping of each index of the set of indexes to a bandwidth part identifier and a corresponding beam identifier, the third control message being received based on a change in location of the UE relative to the beam.

Some examples of the method, apparatuses, and non-transitory computer-readable medium described herein may further include operations, features, means, or instructions for determining that the beam that may be mapped to the indicated index may be different from a current beam, and performing a beam switch procedure to communicate with the network entity on the beam based on determining that the beam may be different from the current beam.

Some examples of the method, apparatuses, and non-transitory computer-readable medium described herein may further include operations, features, means, or instructions for identifying one or more default bandwidth parts that correspond to the beam.

Some examples of the method, apparatuses, and non-transitory computer-readable medium described herein may further include operations, features, means, or instructions for adjusting a frequency compensation, a timing parameter, or a combination thereof corresponding to the beam.

Some examples of the method, apparatuses, and non-transitory computer-readable medium described herein may further include operations, features, means, or instructions for de-mapping the indicated index based on the mapping indicated in the first control message to identify the bandwidth part and the beam.

In some examples of the method, apparatuses, and non-transitory computer-readable medium described herein, the network entity includes a satellite.

In some examples of the method, apparatuses, and non-transitory computer-readable medium described herein, the first control message may be a medium access control layer signaling message and the second control message may be a physical layer signaling message.

A method for wireless communications at a network entity is described. The method may include transmitting, to a UE, a first control message that indicates a mapping of each index of a set of indexes to a bandwidth part identifier and a corresponding beam identifier. The method may further include transmitting, to the UE, a second control message that includes an indication of an index of the set of indexes. The method may further include communicating with the UE on a bandwidth part and a beam that is mapped to the indicated index by the first control message.

An apparatus for wireless communications at a network entity is described. The apparatus may include a processor, memory coupled with the processor, the processor and memory configured to transmit, to a UE, a first control message that indicates a mapping of each index of a set of indexes to a bandwidth part identifier and a corresponding beam identifier. The processor and memory are further configured to transmit, to the UE, a second control message that includes an indication of an index of the set of indexes. The processor and memory are further configured to communicate with the UE on a bandwidth part and a beam that is mapped to the indicated index by the first control message.

Another apparatus for wireless communications at a network entity is described. The apparatus may include means for transmitting, to a UE, a first control message that indicates a mapping of each index of a set of indexes to a bandwidth part identifier and a corresponding beam identifier. The apparatus may further include means for transmitting, to the UE, a second control message that includes an indication of an index of the set of indexes. The apparatus may further include means for communicating with the UE on a bandwidth part and a beam that is mapped to the indicated index by the first control message.

A non-transitory computer-readable medium storing code for wireless communications at a network entity is described. The code may include instructions executable by a processor to transmit, to a UE, a first control message that indicates a mapping of each index of a set of indexes to a bandwidth part identifier and a corresponding beam identifier. The instructions may be further executable by the processor to transmit, to the UE, a second control message that includes an indication of an index of the set of indexes. The instructions may be further executable by the processor to communicate with the UE on a bandwidth part and a beam that is mapped to the indicated index by the first control message.

Some examples of the method, apparatuses, and non-transitory computer-readable medium described herein may further include operations, features, means, or instructions for transmitting a MAC-CE message that indicates the mapping.

Some examples of the method, apparatuses, and non-transitory computer-readable medium described herein may further include operations, features, means, or instructions for transmitting the first control message that indicates the mapping such that each index may be mapped to the bandwidth part identifier corresponding to an uplink bandwidth part or such that each index may be mapped to the bandwidth part identifier corresponding to a downlink bandwidth part.

Some examples of the method, apparatuses, and non-transitory computer-readable medium described herein may further include operations, features, means, or instructions for transmitting the first control messages that indicates the mapping of each index to the bandwidth part identifier, the corresponding beam identifier, and a satellite identifier.

Some examples of the method, apparatuses, and non-transitory computer-readable medium described herein may further include operations, features, means, or instructions for transmitting the first control message that indicates the mapping based on the corresponding beam identifier being included in a parameter of a bandwidth part indicated by the corresponding bandwidth part identifier.

Some examples of the method, apparatuses, and non-transitory computer-readable medium described herein may further include operations, features, means, or instructions for transmitting a DCI message that includes the indication of the index.

In some examples of the method, apparatuses, and non-transitory computer-readable medium described herein, the indication of the index includes a bandwidth part index field.

Some examples of the method, apparatuses, and non-transitory computer-readable medium described herein may further include operations, features, means, or instructions for transmitting a third control message having a same format as the first control message, the third control message indicating a new mapping of each index of the set of indexes to a bandwidth part identifier and a corresponding beam identifier, the third control message being transmitted based on a change in location of the UE relative to the beam.

Some examples of the method, apparatuses, and non-transitory computer-readable medium described herein may further include operations, features, means, or instructions for determining that the beam that may be mapped to the indicated index may be different from a current beam, and performing a beam switch procedure to communicate with the UE on the beam based on determining that the beam may be different from the current beam.

Some examples of the method, apparatuses, and non-transitory computer-readable medium described herein may further include operations, features, means, or instructions for identifying one or more default bandwidth parts that correspond to the beam.

Some examples of the method, apparatuses, and non-transitory computer-readable medium described herein may further include operations, features, means, or instructions for adjusting a frequency compensation, a timing parameter, or a combination thereof corresponding to the beam.

In some examples of the method, apparatuses, and non-transitory computer-readable medium described herein, the network entity includes a satellite.

In some examples of the method, apparatuses, and non-transitory computer-readable medium described herein, the first control message may be a medium access control layer signaling message and the second control message may be a physical layer signaling message.

A method of wireless communications at a UE is described. The method may include receiving, from a network entity, a first control message that includes an indication of a mapping of each TCI state of a subset of TCI states to a respective transmission configuration indicator codepoint. The method may further include receiving, from the network entity, a second control message that includes a transmission configuration indicator codepoint and an indication of a bandwidth part identifier. The method may further include communicating with the network entity on a bandwidth part corresponding to the indicated bandwidth part identifier and in a beam that is identified by a TCI state that is mapped to the indicted transmission configuration indicator codepoint by the first control message.

An apparatus for wireless communications at a UE is described. The apparatus may include a processor, memory coupled with the processor, the processor and memory are configured to receive, from a network entity, a first control message that includes an indication of a mapping of each TCI state of a subset of TCI states to a respective transmission configuration indicator codepoint. The processor and memory are further configured to receive, from the network entity, a second control message that includes a transmission configuration indicator codepoint and an indication of a bandwidth part identifier. The processor and memory are further configured to communicate with the network entity on a bandwidth part corresponding to the indicated bandwidth part identifier and in a beam that is identified by a TCI state that is mapped to the indicted transmission configuration indicator codepoint by the first control message.

Another apparatus for wireless communications at a UE is described. The apparatus may include means for receiving, from a network entity, a first control message that includes an indication of a mapping of each TCI state of a subset of TCI states to a respective transmission configuration indicator codepoint. The apparatus may further include means for receiving, from the network entity, a second control message that includes a transmission configuration indicator codepoint and an indication of a bandwidth part identifier. The apparatus may further include means for communicating with the network entity on a bandwidth part corresponding to the indicated bandwidth part identifier and in a beam that is identified by a TCI state that is mapped to the indicted transmission configuration indicator codepoint by the first control message.

A non-transitory computer-readable medium storing code for wireless communications at a UE is described. The code may include instructions executable by a processor to receive, from a network entity, a first control message that includes an indication of a mapping of each TCI state of a subset of TCI states to a respective transmission configuration indicator codepoint. The code may include instructions executable by a processor to receive, from the network entity, a second control message that includes a transmission configuration indicator codepoint and an indication of a bandwidth part identifier. The code may include instructions executable by a processor to communicate with the network entity on a bandwidth part corresponding to the indicated bandwidth part identifier and in a beam that is identified by a TCI state that is mapped to the indicted transmission configuration indicator codepoint by the first control message.

Some examples of the method, apparatuses, and non-transitory computer-readable medium described herein may further include operations, features, means, or instructions for receiving, from the network entity, a RRC message that configures a set of TCI states that include a TCI state identifier, a TCI state type, and a satellite beam identifier, the first control message including the indication of the mapping of each transmission configuration indicator state to the respective transmission configuration indicator codepoint.

Some examples of the method, apparatuses, and non-transitory computer-readable medium described herein may further include operations, features, means, or instructions for receiving a MAC-CE (MAC-CE) message that indicates the mapping.

Some examples of the method, apparatuses, and non-transitory computer-readable medium described herein may further include operations, features, means, or instructions for receiving a bitmap, each value in the bitmap indicating an activation state of a corresponding TCI state, the respective TCI codepoint being mapped to the TCI state based on the activation state being an active state as indicated by the bitmap.

Some examples of the method, apparatuses, and non-transitory computer-readable medium described herein may further include operations, features, means, or instructions for receiving a DCI message that includes the transmission configuration indicator codepoint and the bandwidth part identifier.

Some examples of the method, apparatuses, and non-transitory computer-readable medium described herein may further include operations, features, means, or instructions for receiving the second control message that indicates the TCI state identifier corresponding to the TCI state having a TCI state type corresponding to a satellite beam index type.

Some examples of the method, apparatuses, and non-transitory computer-readable medium described herein may further include operations, features, means, or instructions for receiving a RRC message that indicates that the UE may be to switch an uplink bandwidth part when a downlink bandwidth part may be switched by the transmission configuration indicator codepoint of the second control message.

Some examples of the method, apparatuses, and non-transitory computer-readable medium described herein may further include operations, features, means, or instructions for determining that the bandwidth part corresponding to the indicated bandwidth part identifier may be different from a current bandwidth part, and identifying an uplink bandwidth part different from the current bandwidth part based on determining that the bandwidth part may be different from the current bandwidth part in accordance with the RRC message.

Some examples of the method, apparatuses, and non-transitory computer-readable medium described herein may further include operations, features, means, or instructions for determining that the beam that may be identified by the TCI state may be different from a current beam, and performing a beam switch procedure to communicate with the network entity on the bandwidth part in the beam based on determining that the beam may be different from the current beam.

Some examples of the method, apparatuses, and non-transitory computer-readable medium described herein may further include operations, features, means, or instructions for identifying one or more default bandwidth parts that correspond to the beam.

Some examples of the method, apparatuses, and non-transitory computer-readable medium described herein may further include operations, features, means, or instructions for adjusting a frequency compensation, a timing parameter, or a combination thereof corresponding to the beam.

Some examples of the method, apparatuses, and non-transitory computer-readable medium described herein may further include operations, features, means, or instructions for de-mapping the transmission configuration indicator codepoint based on the mapping indicated in the first control message to identify the TCI sate that indicates the beam.

Some examples of the method, apparatuses, and non-transitory computer-readable medium described herein may further include operations, features, means, or instructions for identifying the beam from the TCI state based on a satellite beam identifier, a cell identifier, or a synchronization signal block index included in the TCI state.

In some examples of the method, apparatuses, and non-transitory computer-readable medium described herein, the first control message may be a medium access control layer signaling message and the second control message may be a physical layer signaling message.

A method for wireless communications at a network entity is described. The method may include transmitting, to a UE, a first control message that includes an indication of a mapping of each TCI state of a subset of TCI states to a respective transmission configuration indicator codepoint, The method may include transmitting, to the UE, a second control message that includes an indication of a transmission configuration indicator codepoint and an indication of a bandwidth part identifier. The method may include communicating with the network entity on a bandwidth part corresponding to the indicated bandwidth part identifier and in a beam that is identified by a TCI state that is mapped to the indicted TCI codepoint by the first control message.

An apparatus for wireless communications at a network entity is described. The apparatus may include a processor and memory coupled with the processor. The processor and memory are configured to transmit, to a UE, a first control message that includes an indication of a mapping of each TCI state of a subset of TCI states to a respective transmission configuration indicator codepoint. The processor and memory are further configured to transmit, to the UE, a second control message that includes an indication of a transmission configuration indicator codepoint and an indication of a bandwidth part identifier. The processor and memory are further configured to communicate with the network entity on a bandwidth part corresponding to the indicated bandwidth part identifier and in a beam that is identified by a TCI state that is mapped to the indicted TCI codepoint by the first control message.

Another apparatus for wireless communications at a network entity is described. The apparatus may include means for transmitting, to a UE, a first control message that includes an indication of a mapping of each TCI state of a subset of TCI states to a respective transmission configuration indicator codepoint. The apparatus may include means for transmitting, to the UE, a second control message that includes an indication of a transmission configuration indicator codepoint and an indication of a bandwidth part identifier. The apparatus may include means for communicating with the network entity on a bandwidth part corresponding to the indicated bandwidth part identifier and in a beam that is identified by a TCI state that is mapped to the indicted TCI codepoint by the first control message.

A non-transitory computer-readable medium storing code for wireless communications at a network entity is described. The code may include instructions executable by a processor to transmit, to a UE, a first control message that includes an indication of a mapping of each TCI state of a subset of TCI states to a respective transmission configuration indicator codepoint The code may include instructions executable by a processor to transmit, to the UE, a second control message that includes an indication of a transmission configuration indicator codepoint and an indication of a bandwidth part identifier. The code may include instructions executable by a processor to communicate with the network entity on a bandwidth part corresponding to the indicated bandwidth part identifier and in a beam that is identified by a TCI state that is mapped to the indicted TCI codepoint by the first control message.

Some examples of the method, apparatuses, and non-transitory computer-readable medium described herein may further include operations, features, means, or instructions for transmitting, to the UE, a RRC message that configures a set of TCI states that include a TCI state identifier, a TCI state type, and a satellite beam identifier, the first control message including the indication of the mapping of each TCI state to the respective TCI codepoint.

Some examples of the method, apparatuses, and non-transitory computer-readable medium described herein may further include operations, features, means, or instructions for transmitting a MAC-CE (MAC-CE) message that indicates the mapping.

Some examples of the method, apparatuses, and non-transitory computer-readable medium described herein may further include operations, features, means, or instructions for transmitting a bitmap, each value in the bitmap indicating an activation state of a corresponding TCI state, the respective TCI codepoint being mapped to the TCI state based on the activation state being an active state as indicated by the bitmap.

Some examples of the method, apparatuses, and non-transitory computer-readable medium described herein may further include operations, features, means, or instructions for transmitting a DCI message that includes the indication of the transmission configuration indicator codepoint and the bandwidth part identifier.

Some examples of the method, apparatuses, and non-transitory computer-readable medium described herein may further include operations, features, means, or instructions for transmitting the second control message that indicates the transmission configuration indicator codepoint corresponding to the TCI state having a TCI state type corresponding to a satellite beam index type.

Some examples of the method, apparatuses, and non-transitory computer-readable medium described herein may further include operations, features, means, or instructions for transmitting a RRC message that indicates that the UE may be to switch an uplink bandwidth part when a downlink bandwidth part may be switched by the transmission configuration indicator codepoint of the second control message.

Some examples of the method, apparatuses, and non-transitory computer-readable medium described herein may further include operations, features, means, or instructions for determining that the bandwidth part corresponding to the indicated bandwidth part identifier may be different from a current bandwidth part, and identifying an uplink bandwidth part different from the current bandwidth part based on determining that the bandwidth part may be different from the current bandwidth part in accordance with the RRC message.

Some examples of the method, apparatuses, and non-transitory computer-readable medium described herein may further include operations, features, means, or instructions for determining that the beam that may be identified by the TCI state may be different from a current beam, and performing a beam switch procedure to communicate with the network entity on the bandwidth part in the beam based on determining that the beam may be different from the current beam.

Some examples of the method, apparatuses, and non-transitory computer-readable medium described herein may further include operations, features, means, or instructions for transmitting an indication of the beam in the TCI state based on a satellite beam identifier, a cell identifier, or a synchronization signal block index included in the TCI state.

In some examples of the method, apparatuses, and non-transitory computer-readable medium described herein, the first control message may be a medium access control layer signaling message and the second control message may be a physical layer signaling message.

A method for wireless communications at a UE is described. The method may include receiving, from a network entity, a control message that includes an indication of a TCI state identifier. The method may include determining that a TCI state corresponding to the TCI state identifier includes an indication of a satellite beam identifier. The method may include communicating with the network entity using a satellite beam corresponding to the satellite beam identifier.

An apparatus for wireless communications at a UE is described. The apparatus may include a processor, memory coupled with the processor, the processor and memory configured to receive, from a network entity, a control message that includes an indication of a TCI state identifier. The processor and memory are further configured to determine that a TCI state corresponding to the TCI state identifier includes an indication of a satellite beam identifier. The processor and memory are further configured to communicate with the network entity using a satellite beam corresponding to the satellite beam identifier.

Another apparatus for wireless communications at a UE is described. The apparatus may include means for receiving, from a network entity, a control message that includes an indication of a TCI state identifier. The apparatus may include means for determining that a TCI state corresponding to the TCI state identifier includes an indication of a satellite beam identifier. The apparatus may include means for communicating with the network entity using a satellite beam corresponding to the satellite beam identifier.

A non-transitory computer-readable medium storing code for wireless communications at a UE is described. The code may include instructions executable by a processor to receive, from a network entity, a control message that includes an indication of a TCI state identifier. The code may include instructions executable by a processor to determine that a TCI state corresponding to the TCI state identifier includes an indication of a satellite beam identifier. The code may include instructions executable by a processor to communicate with the network entity using a satellite beam corresponding to the satellite beam identifier.

Some examples of the method, apparatuses, and non-transitory computer-readable medium described herein may further include operations, features, means, or instructions for receiving, from the network entity, a RRC message that configures a set of TCI states that include a TCI state identifier, a TCI state type, and a satellite beam identifier, the control message including the indication of a TCI state identifier configured by the RRC message.

Some examples of the method, apparatuses, and non-transitory computer-readable medium described herein may further include operations, features, means, or instructions for determining that the TCI state may have a TCI state type of satellite beam index type.

Some examples of the method, apparatuses, and non-transitory computer-readable medium described herein may further include operations, features, means, or instructions for receiving a MAC-CE (MAC-CE) message that includes the indication of the TCI state identifier.

Some examples of the method, apparatuses, and non-transitory computer-readable medium described herein may further include operations, features, means, or instructions for receiving the control message that includes the indication of the TCI state identifier and an indication of a sub-TCI state identifier, where the satellite beam may be identified based on the indication of the sub-TCI state identifier.

In some examples of the method, apparatuses, and non-transitory computer-readable medium described herein, the sub-TCI state identifier may be included in the TCI state identified by the TCI state identifier and a sub-TCI state corresponding to the sub-TCI state identifier includes the indication of the satellite beam.

In some examples of the method, apparatuses, and non-transitory computer-readable medium described herein, a sub-TCI state corresponding to the sub-TCI state identifier includes an indication of a satellite identifier corresponding to the satellite beam.

Some examples of the method, apparatuses, and non-transitory computer-readable medium described herein may further include operations, features, means, or instructions for receiving, from the network entity, a DCI message that indicates a bandwidth part identifier, the communicating being performed on a bandwidth part corresponding to the indicated bandwidth part identifier.

Some examples of the method, apparatuses, and non-transitory computer-readable medium described herein may further include operations, features, means, or instructions for determining that an activate TCI state corresponding to the indicated bandwidth part may be a TCI state that includes an indication of the satellite beam identifier, and performing a beam switch procedure based on determining that the activate TCI state includes the indication of the satellite beam identifier.

Some examples of the method, apparatuses, and non-transitory computer-readable medium described herein may further include operations, features, means, or instructions for determining that the satellite beam corresponding to the satellite beam identifier may be different from a current beam, and performing a beam switch procedure to communicate with the network entity on the satellite beam based on determining that the satellite beam may be different from the current beam.

A method for wireless communications at a network entity is described. The method may include transmitting, to a UE, a control message that includes an indication of a TCI state identifier, a TCI state corresponding to the TCI state identifier including an indication of a satellite beam identifier. The method may include communicating with the UE using a satellite beam corresponding to the satellite beam identifier.

An apparatus for wireless communications at a network entity is described. The apparatus may include a processor, memory coupled with the processor, the processor and memory are configured to transmit, to a UE, a control message that includes an indication of a TCI state identifier, a TCI state corresponding to the TCI state identifier including an indication of a satellite beam identifier. The processor and memory are further configured to communicate with the UE using a satellite beam corresponding to the satellite beam identifier.

Another apparatus for wireless communications at a network entity is described. The apparatus may include means for transmitting, to a UE, a control message that includes an indication of a TCI state identifier, a TCI state corresponding to the TCI state identifier including an indication of a satellite beam identifier. The apparatus may include means for communicating with the UE using a satellite beam corresponding to the satellite beam identifier.

A non-transitory computer-readable medium storing code for wireless communications at a network entity is described. The code may include instructions executable by a processor to transmit, to a UE, a control message that includes an indication of a TCI state identifier, a TCI state corresponding to the TCI state identifier including an indication of a satellite beam identifier. The code may include instructions executable by a processor to communicate with the UE using a satellite beam corresponding to the satellite beam identifier.

Some examples of the method, apparatuses, and non-transitory computer-readable medium described herein may further include operations, features, means, or instructions for transmitting, to the UE, a RRC message that configures a set of TCI states that include a TCI state identifier, a TCI state type, and a satellite beam identifier, the control message including the indication of a TCI state identifier configured by the RRC message.

Some examples of the method, apparatuses, and non-transitory computer-readable medium described herein may further include operations, features, means, or instructions for transmitting the control message that indicates the TCI state that may be associated with may have a TCI state type of satellite beam index type.

Some examples of the method, apparatuses, and non-transitory computer-readable medium described herein may further include operations, features, means, or instructions for transmitting a MAC-CE (MAC-CE) message that includes the indication of the TCI state identifier.

Some examples of the method, apparatuses, and non-transitory computer-readable medium described herein may further include operations, features, means, or instructions for transmitting the control message that includes the indication of the TCI state identifier and an indication of a sub-TCI state identifier, where the satellite beam may be identified based on the indication of the sub-TCI state identifier.

In some examples of the method, apparatuses, and non-transitory computer-readable medium described herein, the sub-TCI state identifier may be included in the TCI state identified by the TCI state identifier and a sub-TCI state corresponding to the sub-TCI state identifier includes the indication of the satellite beam.

In some examples of the method, apparatuses, and non-transitory computer-readable medium described herein, a sub-TCI state corresponding to the sub-TCI state identifier includes an indication of a satellite identifier corresponding to the satellite beam.

Some examples of the method, apparatuses, and non-transitory computer-readable medium described herein may further include operations, features, means, or instructions for transmitting, to the UE, a DCI message that indicates a bandwidth part identifier, the communicating being performed on a bandwidth part corresponding to the indicated bandwidth part identifier.

BRIEF DESCRIPTION OF THE DRAWINGS

FIGS. 15 through 21 show flowcharts illustrating methods that support bandwidth part switching by activation and signaling in accordance with one or more aspects of the present disclosure.

DETAILED DESCRIPTION

Figure 1:
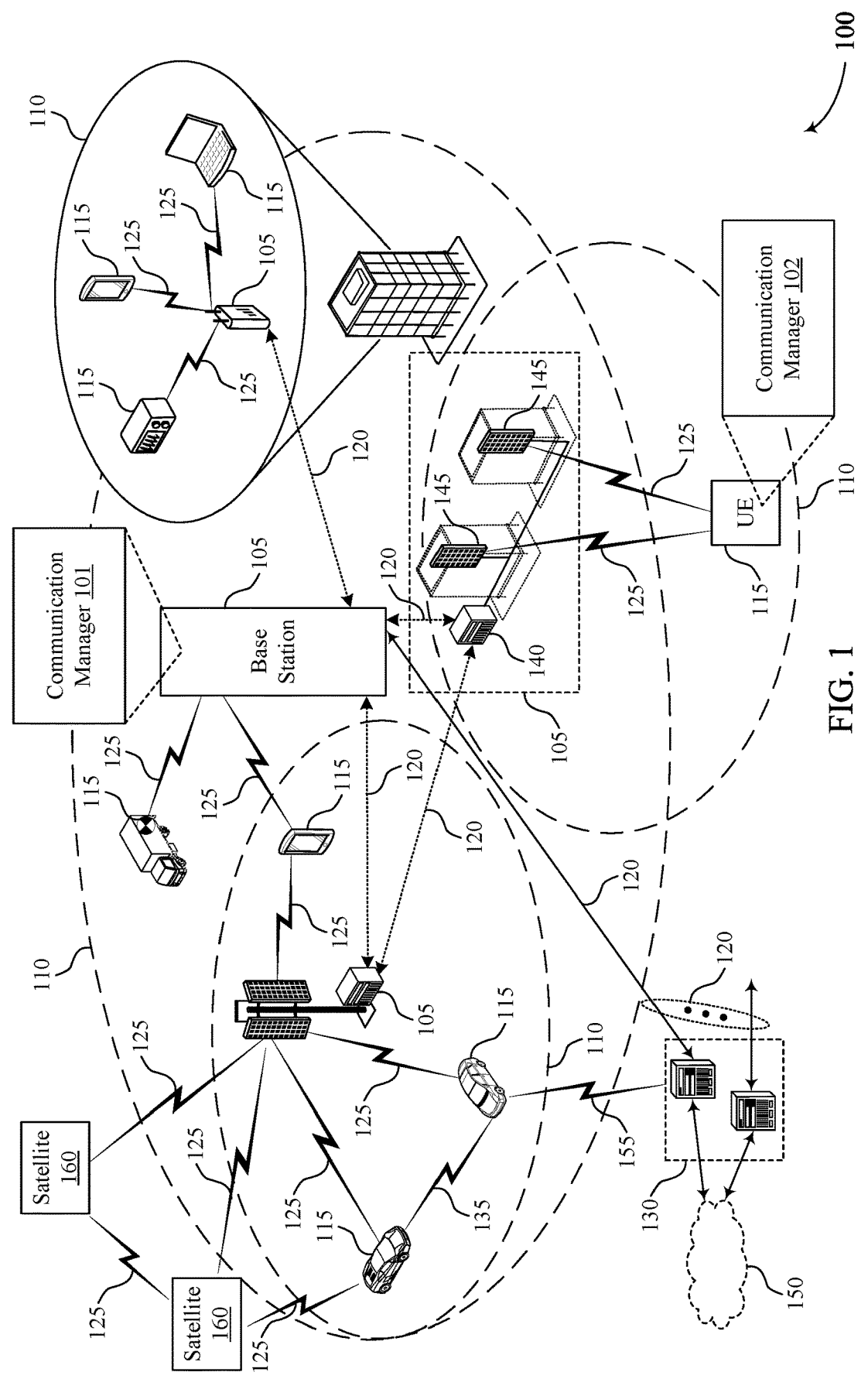
FIG. 1 illustrates an example of a system for wireless communications that supports bandwidth part switching by activation and signaling in accordance with one or more aspects of the present disclosure.

In some wireless communication environments, such as in non-terrestrial networks (e.g., satellite supported networks), beam switching may occur frequently relative to other environments (e.g., terrestrial networks). This may be due to beam coverage being relatively small while the satellites may be moving with a relatively high rate of speed. A network may configure a user equipment (UE) with each beam supported by a satellite as well as an initial resource (e.g., bandwidth part) per beam. As the beam footprints move (or as the UE moves), the network may signal the UE as to which bandwidth part to utilize. In some cases, a wireless communications system may limit the quantity of bandwidth parts that are configured at a UE. This may be due to the size of a field that is used to signal a bandwidth part. Because the UE and the network may be mobile, the limitation of bandwidth parts may affect a UEs ability to efficiently switch between beams.

Techniques described herein provide for efficient signaling of bandwidth parts and beams by a network entity, such as a satellite. It should be understood that the described implementations may be applicable in non-terrestrial as well as terrestrial networks. Thus, a network entity may be an example of a satellite, such as a low earth orbit (LEO) satellite, a base station, and the like. In accordance with one implementation, the network entity may utilize MAC-CE (MAC-CE) messaging to signal a mapping between a set of index values and a bandwidth part identifier and a corresponding beam identifier. In some cases, the beam identifier corresponds to a beam supported by a satellite or other type of network entity, such as a base station. The set of index values that are signaled via MAC-CE may be possible index values, one of which may be indicated by a particular field in a control message, such as a DCI (DCI) message. For example, a DCI message may include a field that indicates a bandwidth part (e.g., bwp-id). This field may be limited to a particular number of bits, such as two bits. In such cases, the field may be able to indicate 4 different index values. Thus, the MAC-CE messaging may map each of the four index values to a bandwidth part identifier and a beam identifier. Thereafter, the DCI messaging may be used to signal one of the indices such that the UE is able to switch to a bandwidth part and/or beam based on the DCI indication. Thus, as a UE moves between coverage areas of network entities (or as network entities, such as satellites, move relative to the UE), the MAC-CE messaging may update mappings and DCI may indicate the bandwidth parts and beams for the UE to use. This process may support efficient bandwidth part and beam switching in a mobile environment.

In accordance with other examples, the network entity may use MAC-CE messaging to indicate a mapping of transmission configuration indicator (TCI) states to a set of TCI codepoints. These TCI states may be examples of TCI states that include an indication of a beam, such as a satellite beam. DCI messaging may include an indication of a TCI codepoint. Thus, based on the DCI messaging, the UE may identify a TCI state and corresponding beam that is to be used for communications with a network entity. The DCI messaging may also include an indication of a bandwidth part (e.g., the bwp-id field). Thus, using MAC-CE messaging to map TCI codepoints to TCI states with beam identifiers and DCI messaging to signal the TCI codepoints and bandwidth part identifiers, the UE may efficiently switch between bandwidth parts and beams. In some examples, the TCI states that include the beam identifiers (e.g., satellite beam identifiers) may be pre-configured at the UE via RRC (RRC) signaling (e.g., a radio resource control message). A TCI state may include parameters for configuring quasi co-location (QCL) relationships between one or two downlink reference signals and the demodulation reference signal (DMRS) ports of a downlink shared channel, a downlink control channel, or the channel state information reference signal (CSI-RS) port(s) of a CSI-RS resource. The TCI state may signal to a UE as to which beam(s) to use for communications with the network entity. A TCI codepoint may be an example a table with a limited size.

In accordance with other examples, the network entity may configure the TCI states with the beam identifiers (e.g., satellite beam identifiers) using RRC signaling. MAC-CE messaging may be used to signal the TCI state via the TCI state identifier. In some cases, the TCI state signaled via MAC-CE includes an indication of sets of sub-TCI states.

Thus, the MAC-CE signaling may indicate the TCI state and the sub-TCI state. This technique may avoid utilizing a set of TCI state identifiers that may be used for other types of TCI states.

Particular aspects of the subject matter described herein may be implemented to support the bandwidth part and beam signaling framework. For example, the various TCI state, bandwidth part, and beam identifier signaling techniques described herein may support bandwidth part and beam switching in scenarios in which a number of bandwidth parts or beams that may be configured at a device, such as a UE, may be limited. Further, these techniques may support efficient bandwidth part and beam switching in environments when bandwidth part and beam switching is frequent. As such, supported techniques may include improved network operations and, in some examples, may promote network efficiencies.

Aspects of the disclosure are initially described in the context of wireless communications systems. Aspects of the disclosure are further described with reference to wireless communications systems and process flow diagrams. Aspects of the disclosure are further illustrated by and described with reference to apparatus diagrams, system diagrams, and flowcharts that relate to bandwidth part switching by activation and signaling.

FIG. 1 illustrates an example of a wireless communications system 100 that supports bandwidth part switching by activation and signaling in accordance with one or more aspects of the present disclosure. The wireless communications system 100 may include one or more base stations 105, one or more UEs 115, and a core network 130. In some examples, the wireless communications system 100 may be a LTE network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or another interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell may cover a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in the range of 300 megahertz (MHz) to 300 gigahertz (GHz). The region from 300 MHz to 3 GHz may be known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same code-word) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI-RS, which may be precoded or unprecoded. The UE 115 may provide feedback for beam selection, which may be a precoding matrix indicator (PMI) or code-book-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications system 100 may also include one or more satellites 160. Satellite 160 may communicate with base stations 105 (also referred to as gateways in NTNs) and UEs 115 (or other high altitude or terrestrial communications devices). Satellite 160 may be any suitable type of communication satellite configured to relay communications between different end nodes in a wireless communication system. Satellite 160 may be an example of a space satellite, a balloon, a dirigible, an airplane, a drone, an unmanned aerial vehicle, and/or the like. In some examples, the satellite 160 may be in a geosynchronous or geostationary earth orbit, a LEO or a medium earth orbit (MEO) and may support a global navigation satellite system (GNSS). A satellite 160 may be a multi-beam satellite configured to provide service for multiple service beam coverage areas in a predefined geographical service area. The satellite 160 may be any distance away from the surface of the earth.

In some cases, a cell may be provided or established by a satellite 160 as part of a non-terrestrial network. A satellite 160 may, in some cases, perform the functions of a base station 105, act as a bent-pipe satellite, or may act as a regenerative satellite, or a combination thereof. In other cases, satellite 160 may be an example of a smart satellite, or a satellite with intelligence. For example, a smart satellite may be configured to perform more functions than a regenerative satellite (e.g., may be configured to perform particular algorithms beyond those used in regenerative satellites, to be reprogrammed, etc.). A bent-pipe transponder or satellite may be configured to receive signals from ground stations and transmit those signals to different ground stations. In some cases, a bent-pipe transponder or satellite may amplify signals or shift from uplink frequencies to downlink frequencies. A regenerative transponder or satellite may be configured to relay signals like the bent-pipe transponder or satellite, but may also use on-board processing to perform other functions. Examples of these other functions may include demodulating a received signal, decoding a received signal, re-encoding a signal to be transmitted, or modulating the signal to be transmitted, or a combination thereof. For example, a bent-pipe satellite (e.g., satellite 160) may receive a signal from a base station 105 and may relay the signal to a UE 115 or base station 105, or vice-versa. A UE 115 may communicate with a cell provided or established by a satellite 160 (e.g., via a base station 105 or a satellite 160 performing the functions of a base station 105).

In some environments, a UE 115 may perform a number of beam switches in a short period of time, and each beam may be associated with one or more resources, such as bandwidth parts. A UE 115 may also be limited in the quantity of bandwidth parts that it may use at one particular time. This quantity limitation may inhibit the ability of the UE 115 to efficiently switch between beams. For example, in LEO systems, satellites 160 may support beam footprints that are small relative to the orbital speed of the satellites 160. Thus, a UE 115 may frequently switch between beams supported by different satellites 160. A limitation on the amount of bandwidth parts may limit the ability of the UE 115 to efficiently communicate in such environments. This frequent beam switching may occur in other systems different than LEO systems, such as MEO systems, GNSS, and other non-terrestrial as well as terrestrial systems. As such, the solutions described herein may be applicable in a variety of different systems.

Aspects of the disclosure described herein provide for various signaling techniques that may be used to signal bandwidth parts and beams. In one example, MAC-CE signaling (e.g., via a communications manager 101 a network entity, such as a base station 105 or a satellite 160) may be used to indicate a mapping between a set of indexes and a beam identifier and a bandwidth part identifier. A beam identifier and bandwidth part identifier may be an example of tuple that is mapped to a particular index via the MAC-CE message. A DCI message (e.g., a downlink control information message) from the communications manager 101 may include an indication of one of the indices. Thus, when DCI is transmitted to a UE 115, the communications manager 102 of the UE 115 may identify a bandwidth part and beam to utilize for communications with a network entity, such as a base station 105 or a satellite. As the UE 115 moves (or the satellites move), the MAC-CE messaging may be used to update the mapping. Thus, using a combination of MAC-CE messaging and DCI messaging, the network may signal to a UE 115 as to which beams and bandwidth parts to utilize for communications.

Another example described herein utilizes MAC-CE messaging to map TCI states to TCI codepoints that may be signaled via DCI. These TCI states may include an indication of a beam identifier, such as a satellite beam identifier. Thus, a DCI message may indicate, to a UE 115, a bandwidth part (e.g., bwp-id field) and a TCI codepoint. Based on these DCI indications, the UE 115 may identify a beam and bandwidth part to utilize for network communications. In some cases, the TCI states may be configured via RRC signaling. Another example uses these TCI states, but the MAC-CE messaging may include an indication of the TCI state that a UE 115 is to use for network communications. These and other implementations are described further with respect to the following figures.

Figure 2:
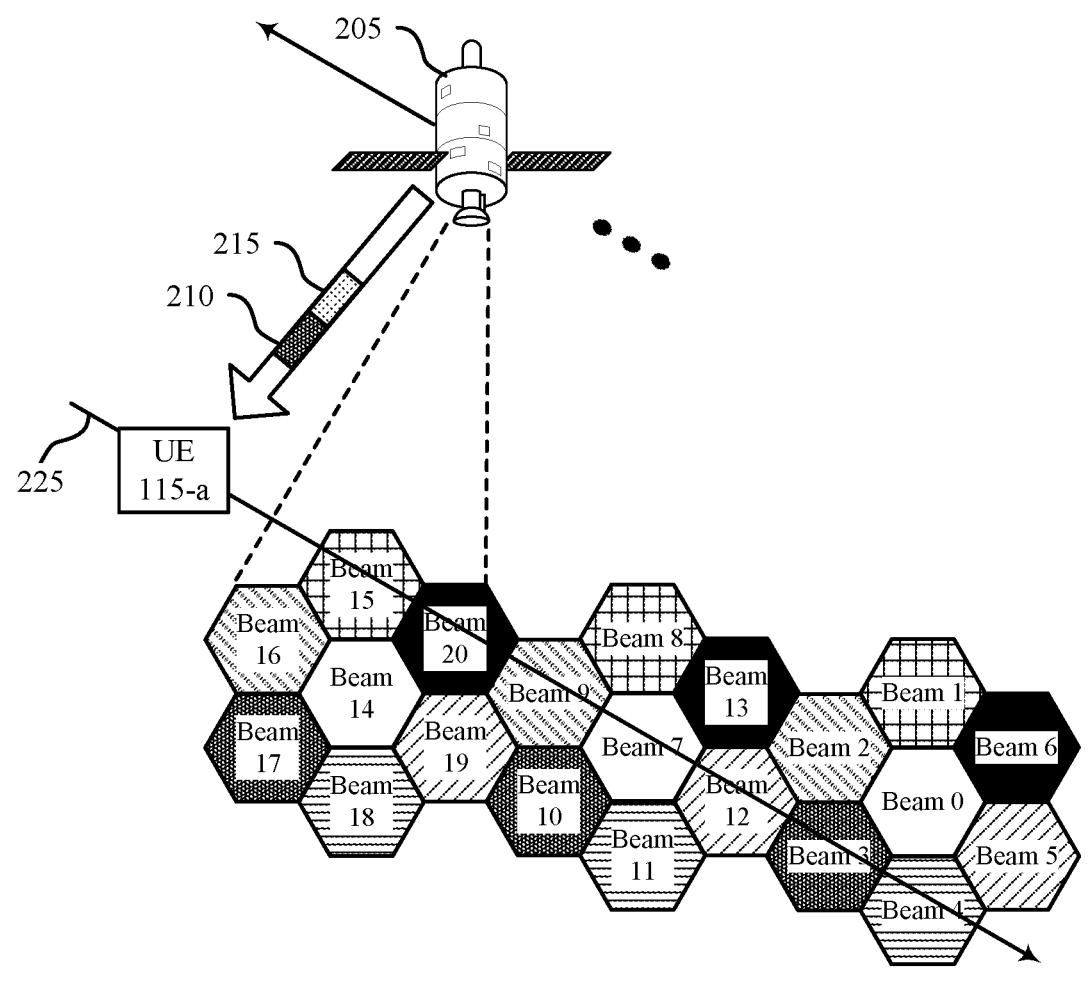
FIG. 2 illustrates an example of a wireless communications system that supports bandwidth part switching by activation and signaling in accordance with one or more aspects of the present disclosure.

FIG. 2 illustrates an example of a wireless network 200 that supports bandwidth part switching by activation and signaling in accordance with one or more aspects of the present disclosure. In some examples, wireless network 200 may implement aspects of wireless communications system 100. The wireless network 200 includes a network entity 205 and a UE 115-a, which may be an example of a UE 115 as described with respect to FIG. 1. The network entity 205 is illustrated as a satellite (e.g., satellite 160 of FIG. 1), but the network entity may be an example of a base station 105 as described with respect to FIG. 1. The network entity 205 may also be an example of a satellite 160 (e.g., LEO satellite). As such, the wireless network 200 may be an example of a non-terrestrial network, a terrestrial network, or a combination of a non-terrestrial and terrestrial network.

In some wireless communication environments, beam switching may be frequent relative to other environments. For example, as illustrated in FIG. 2, a beam footprint 220 (e.g., a coverage area of a beam) may be small relative to the speed of a network entity 205. In other examples, the frequency of beam switching may depend on the mobility of the UE 115, and/or the mobility of a UE 115 in combination with movement of a base station 105. A network may configure each beam from a satellite as a cell with an initial bandwidth part per beam. Each pattern of the beam footprint 220 in FIG. 2 may represent a different bandwidth part, and each beam footprint 220 may correspond to a particular beam, that is identified within the footprint and transmitted by the network entity. The beam footprints 220 are indicated as being hexagonal for illustrative purposes, but the footprints may be associated with a variety of shapes, such as circular, elliptical, hexagonal, or the like. The shape and size of the beam footprint 220 may depend on the distance of the transmitting device (e.g., network entity 205) from the surface of the earth, the transmitting angle, power levels associated with the beams, the shape and structure of the antenna, and the like. Further, beam footprints 220 that are adjacent may have different shapes and sizes dependent on the transmission angle and distance of the transmitting device, the structure of the antenna, etc. In some cases, beam footprints 220 may overlap. The network (e.g., network entity 205) may signal to the UE 115-a which bandwidth part to utilize as the beam footprints 220 move or the UE 115-a moves. In some cases, networks may support a limited number of bandwidth parts that may be configured per UE 115. For example, UE 115-a may be configured with four bandwidth parts at one particular instance of time. This bandwidth part limitation may be insufficient, because in some environments, such as non-terrestrial networks, the number of bandwidth parts among which a UE 115 may switch to may be greater than four in a short period of time. As illustrated in FIG. 2, the UE 115-a may switch between seven bandwidth parts along path 225 as illustrated by the various patterns of beam footprints 220.

Each beam may be associated with particular bandwidth parts. For example, one or more bandwidth parts may be configured for a beam (e.g., satellite beam) per UE 115. Each satellite beam may be configured with an initial uplink bandwidth part and an initial downlink bandwidth part. Each satellite beam may also be configured with a default uplink bandwidth part and a default downlink bandwidth part for a UE 115. If the default uplink/downlink bandwidth part is not configured, then the default uplink bandwidth part may be configured as the initial uplink bandwidth part and the default downlink part may be configured as the initial downlink bandwidth part. Additional bandwidth parts may be configured per satellite beam. As noted herein, the network may configure bandwidth parts in a satellite beam for a UE 115, and the configuration may be conveyed to the UE 115 via a system information block (SIB) message or an RRC message. For example, a SIB may be used if the bandwidth part is the initial bandwidth part. Otherwise, RRC messaging may be used. There may be two types of bandwidth part switching. In inter-beam switching, a UE 115 switches from a bandwidth part in one satellite beam to a bandwidth part in a second satellite beam. In intra-beam bandwidth part switching, a UE 115 switches from a first bandwidth part to a second bandwidth part in the same satellite beam.

A parameter switchTime may indicate the time needed by a UE 115 for adjusting the antenna pointing direction to change from one network entity 205 to another network entity 205 (e.g., from satellite to satellite) and may account for the time needed by the UE 115 for changing the frequency pre-compensation. The switchTime parameter may include values depending on the type of antenna (e.g., a very small aperture terminal (VSAT) antenna or active electronically scanned array (AESA)) antenna. $T_1$ may be indicated for a motor steered antenna, and $T_2$ may be indicated for an AESA antenna, where $T_1$ is greater than or equal to $T_2$.

To support efficient beam and bandwidth part switching, various signaling techniques may be used as described herein. In one implementation, a first control message 210, which may be an example of a MAC-CE message may indicate a mapping of bandwidth part identifier and a beam identifier (e.g., satellite beam identifier) to an index. That is, the network may jointly encode the bandwidth part identifier and beam identifier. For example, a tuple (bandwidth part identifier, beam identifier) may be assigned or mapped to a unique identifier, such as an index value. A satellite beam identifier may be an example of a cell identifier (e.g., each satellite beam is configured as a separate cell), a synchronization signal block (SSB) index, or a general satellite beam identifier. The satellite beam identifier may indicate a satellite beam that a UE 115 is likely to enter within a particular time interval due to mobility, such as satellite mobility. In some cases, the encoding may be signaled by SIB or RRC.

In accordance with this technique, the network may select n tuples or associations of bandwidth part identifiers and satellite beam identifiers and maps these associations to unique indexes of ceil($\log_2$n) bits and thus activates these associations. These indices may be signaled via MAC-CE to the UE 115-a. The mapping may follow a rule agreed upon between the network and the UE 115-a. For example, in cases where an index may be signaled via two bits (e.g., using a bwp-id field of a DCI), the ordering of the bandwidth part identifiers and satellite beam identifiers associations that are signal may inform the index mapping. That is, the first association may be mapped to 00, the second to 01, the third to 10, and the fourth to 11. In some cases, the bandwidth parts in the associations may be either all uplink bandwidth parts or all downlink bandwidth parts.

Thus, the bwp-id field (or a different field) in the DCI may be used to represent an association between a bandwidth part identifier and beam identifier. When the UE 115-a receives the second control message 215 (e.g., DCI), the UE 115-a may demap the bwp-id field to the bandwidth part identifier and satellite beam identifier and switch to the associated bandwidth part and beam, if the beam is different from the current beam. Further, if the indicated beam is different from the current serving beam, the UE 115-a may reset default bandwidth parts to those associated with the indicate satellite beam. Switching to a new beam may also include adjusting the frequency compensation, timing parameters, etc. that are beam specific. In some cases, the associations between a bandwidth part identifier and a beam are indicated via a particular bandwidth part. For example, a bandwidth part may include a number of parameters, and a parameter may indicate a beam that is associated with the bandwidth part. Thus, the bwp-id field of the DCI may indicate a bandwidth part that includes an indication of a beam that the UE 115-*a* is to utilize for communications.

As discussed, the first control message 210 may be an example of a MAC-CE message, and the second control message 215 may be an example of a DCI message. Thus, the first control message 210 may be an example of a MAC layer message, and the second message may be an example of a physical layer message. As MAC layer messaging may be a slower or less efficient form of messaging than physical layer messaging, MAC layer messaging may be used less frequently than the physical layer messaging in some examples. As such, using the techniques described herein, the MAC layer messaging may be used to provide mappings (e.g., bandwidth part identifier and beam identifier to index mappings or TCI states to index mappings) and the physical layer messaging may be used to more frequently switch between the beams and/or bandwidth parts based on the mappings. Other messaging layers are contemplated within the scope of the disclosure.

In accordance with another technique, the network may use TCI states to indicate a beam, such as a satellite beam. For example, a new TCI state type may be used to indicate a satellite beam identifier, which may be an example of a cell identifier, a SSB index, or a more general satellite beam identifier. In accordance with this technique, RRC signaling may configure a set of TCI states, where each of these states includes a TCI state identifier (e.g., a transmission configuration indicator state identifier), a TCI type (e.g., "satellite-beam-index-Type"), and a beam identifier (e.g., satellite beam identifier). That is, the RRC signaling may configure the UE with a set of transmission configuration indicator states, each TCI state including a respective transmission configuration indicator state identifier, a respective satellite beam identifier, and a transmission configuration indicator state type (e.g., a transmission configuration indicator state type of satellite beam index type). MAC-CE messaging (e.g., first control message 210) may be used to map a subset of these configured TCI states to indices, as described with respect to the first technique. In some examples, the MAC-CE message may include a bitmap, where each value activates/deactivates a corresponding TCI state (e.g., a corresponding transmission configuration indicator state). This bitmap may be used to map the active TCI states to TCI codepoints. The first activated TCI state is mapped to a codepoint of value 0, the second activated TCI state is mapped to a codepoint of value 1, and so on. The subset of TCI states may include indications of beam identifiers corresponding to beams that the UE 115-*a* may enter in a time interval. Thus, the subset may be updated over time via MAC-CE messaging. To signal the UE 115-*a* to switch to a downlink bandwidth part w and a satellite beam b, the network may transmit a DCI message (e.g., a second control message 215) with the bwp-id field set to w and the TCI field set to the TCI codepoint of the TCI state that has a "satellite-beam-index-Type" and indicates satellite beam identifier b.

The UE 115-*a* may behave based on whether the DCI (e.g., the second control message 215) indicates a different beam that a current beam, a different bandwidth part, or both. For example, if a TCI state indicated by the TCI field has a "satellite-beam-index-type" and a satellite beam identifier equal to b and b is different from the identifier of the current serving satellite beam, the UE 115-*a* may switch satellite beam b in switchTime. The bwp-id field of the DCI may indicate the downlink bandwidth part in the new satellite beam for the UE 115-*a* to utilize. The UE 115-*a* may reset a default downlink bandwidth part that is configured for the UE in the satellite beam indicated in the TCI state.

Switching to a new satellite beam may include adjusting the frequency compensation, timing parameter, etc. that are beam specific. In some cases, the network may configure (e.g., via RRC) whether the corresponding uplink bandwidth part is to be switched if downlink bandwidth part switching occurs. That is, the network entity 205 may signal, via RRC, that the UE 115-*a* is to switch an uplink bandwidth part if a DCI indicates a new downlink bandwidth part If b is the same as the identifier of the current serving satellite beam, then the UE 115-*a* may not switch satellite beam. If the bandwidth part identifier is different from the identifier of the active bandwidth part, then the UE may switch to the indicated bandwidth part for communications with the network entity 205. Otherwise (e.g., the bandwidth part identifier is the same as the active bandwidth par), the UE 115-*a* may not switch to another bandwidth part.

In accordance with another technique, the TCI state configuration as described above may be used in conjunction with MAC-CE signaling. That is, a new TCI state may be used that has a beam identifier (e.g., a satellite beam identifier), a "satellite-beam-index-Type," etc. Further, RRC may be used to configure these TCI states. To let the UE switch to a satellite beam b, the network (e.g., network entity 205) may transmit a MAC-CE message that indicates a TCI state identifier with the type "satellite-beam-index-type" and a satellite beam identifier b. In some cases, the TCI state may indicate a serving cell identifier and a control resource set (CORESET) identifier. The behavior of the UE 115-*a* may depend on whether the beam and/or bandwidth part is switched by the MAC-CE (e.g., first control message 210) and a DCI message (e.g., second control message 215).

Figure 3A:
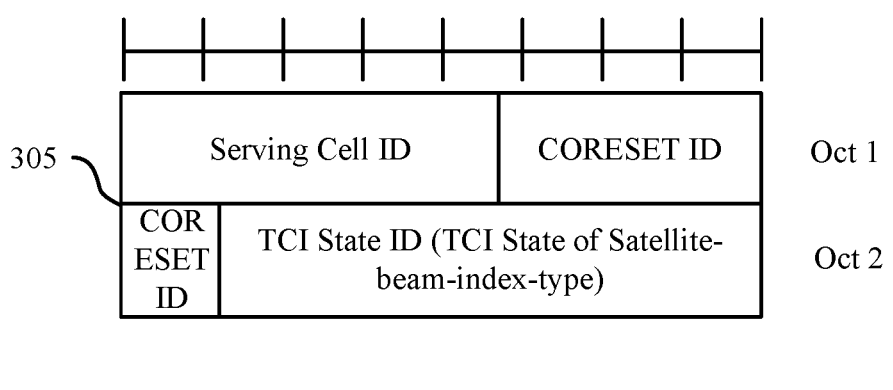
FIGS. 3A and 3B illustrate examples of TCI states that support bandwidth part switching by activation and signaling in accordance with one or more aspects of the present disclosure.

Upon receiving the MAC-CE, the UE 115-*a* may identify the TCI state indicated by the TCI state identifier field of the MAC-CE. If the TCI state is of type "satellite-beam-Index-Type", the UE 115-*a* may switch to satellite beam b (indicated by the TCI state) and the corresponding default downlink bandwidth part or the initial downlink bandwidth part within a duration switch Time. Further, the UE 115-*a* may switch to the default uplink bandwidth part or the initial uplink bandwidth part in satellite beam b (e.g., based on the RRC configuration, as described herein). If the indicated TCI state is of other types (e.g., QCL-Type A), the UE 115-*a* may interpret the MAC-CE as applying the TCI state to the CORESET identified by the CORESET ID and may take actions accordingly. If a DCI indicates that the UE 115-*a* is to switch downlink bandwidth parts, the CORESETs may change. For each CORESET, the associated TCI states including the activate TCI state may also change. Thus, if the active state is of type "satellite-beam-index-Type" as described herein, the UE 115-*b* may perform a beam switch based on the beam identified in the TCI state. Accordingly, the UE 115-*a* may also switch to the default uplink bandwidth part or the initial uplink bandwidth part in the satellite beam indicated by the TCI state. FIG. 3A illustrates an example of a configuration 300-*a* of the new TCI state that may be used in this example implementation or the implementation that uses the TCI state and DCI signaling in accordance with one or more aspects of the present disclosure. The configuration 300-*a* includes a TCI state 305, which includes a field for a serving cell identifier, a CORESET identifier, a TCI state identifier. The TCI state identifier may correspond to a TCI state type of satellite-beam-index-type. Further the serving cell identifier may correspond to a satellite beam identifier.

In some cases, an additional new TCI state type of "satellite-beam-index-Type" may be defined. This TCI type may include a TCI state identifier and up to $2''$ sub-TCI states. The sub-TCI state type may include a sub TCI state identifier of n bits, a satellite beam identifier, and a satellite identifier. The network entity 205 may configure (e.g., using RRC signaling) a TCI state of type "satellite-beam-Index-Type" and configures up to $2^n$ sub-TCI states. The network may also configure TCI states of other types. To signal the UE 115-*b* to switch to a satellite beam b, the network may configure and signal a MAC-CE that carries a TCI state identifier for a TCI state with type "satellite-beam-Index-Type" and a sub-TCI state ID of a sub-TCI state with the satellite beam identifier b.

Figure 3B:
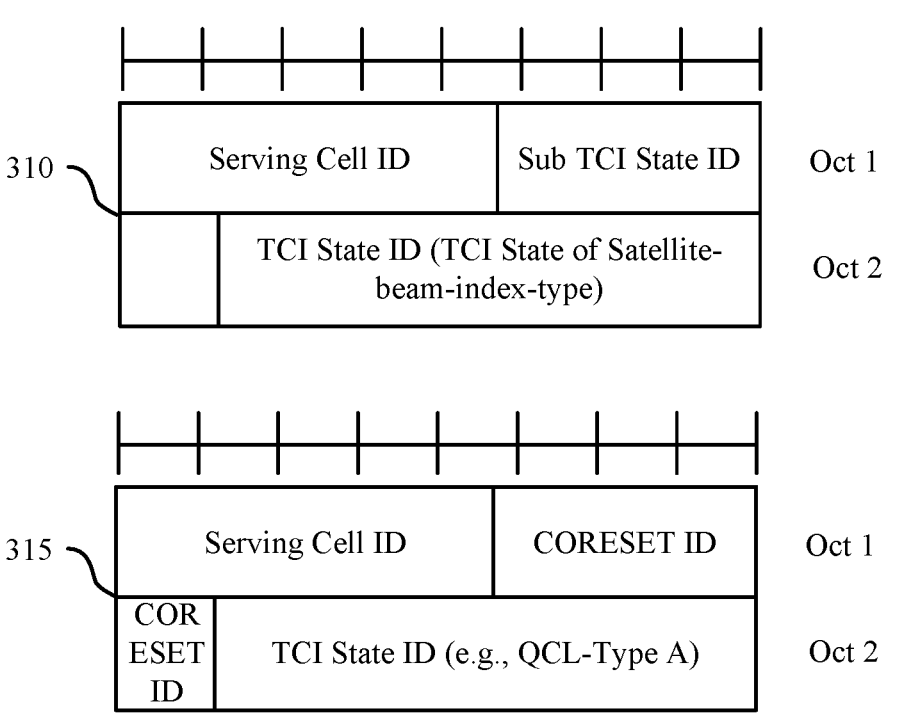

In such cases, the UE 115-*a* may behave based on the signaling. Upon receiving the MAC-CE, the UE 115-*a* may identify the TCI sate indicated by the TCI state identifier of the MAC-CE. If the TCI state is of type "satellite-beam-index-Type," then the field of n bits indicates sub TCI state ID. Based on the field of n bits, the UE 115-*a* may identify the sub-TCI state and obtain the satellite beam identifier from the sub-TCI state. The UE 115-*a* may switch to the default downlink bandwidth part or the initial downlink bandwidth in the satellite beam indicated in the sub-TCI state. The UE 115-*a* may also switch to the downlink bandwidth part or the initial uplink bandwidth in satellite beam b. If the TCI sate is of other types (e.g., QCL-Type A), the UE 115-*a* may interpret the MAC-CE as applying the TCI state to the CORESET identified by the CORESET identifier and takes actions accordingly. FIG. 3B illustrates examples of configurations 300-*b* (e.g., TCI state configurations) using a TCI state and a sub-TCI state in accordance with one or more aspects of the present disclosure. The configuration 300-*b* includes TCI state 310 and TCI state 315. The TCI state 310 (e.g., transmission configuration indicator state) includes a serving cell identifier, a Sub-TCI state identifier, and a TCI state identifier. The TCI state identifier may correspond to a TCI state type (e.g., transmission configuration indicator state type) of satellite-beam-index-type, and the sub-TCI state identifier may indicate the identifier for TCI state 315, or the like. The TCI state 315 includes a serving cell identifier, a CORESET identifier, and a TCI state identifier. The serving cell identifier of TCI state 315 may include an indication of a beam (e.g., a satellite beam identifier).

Figure 4:
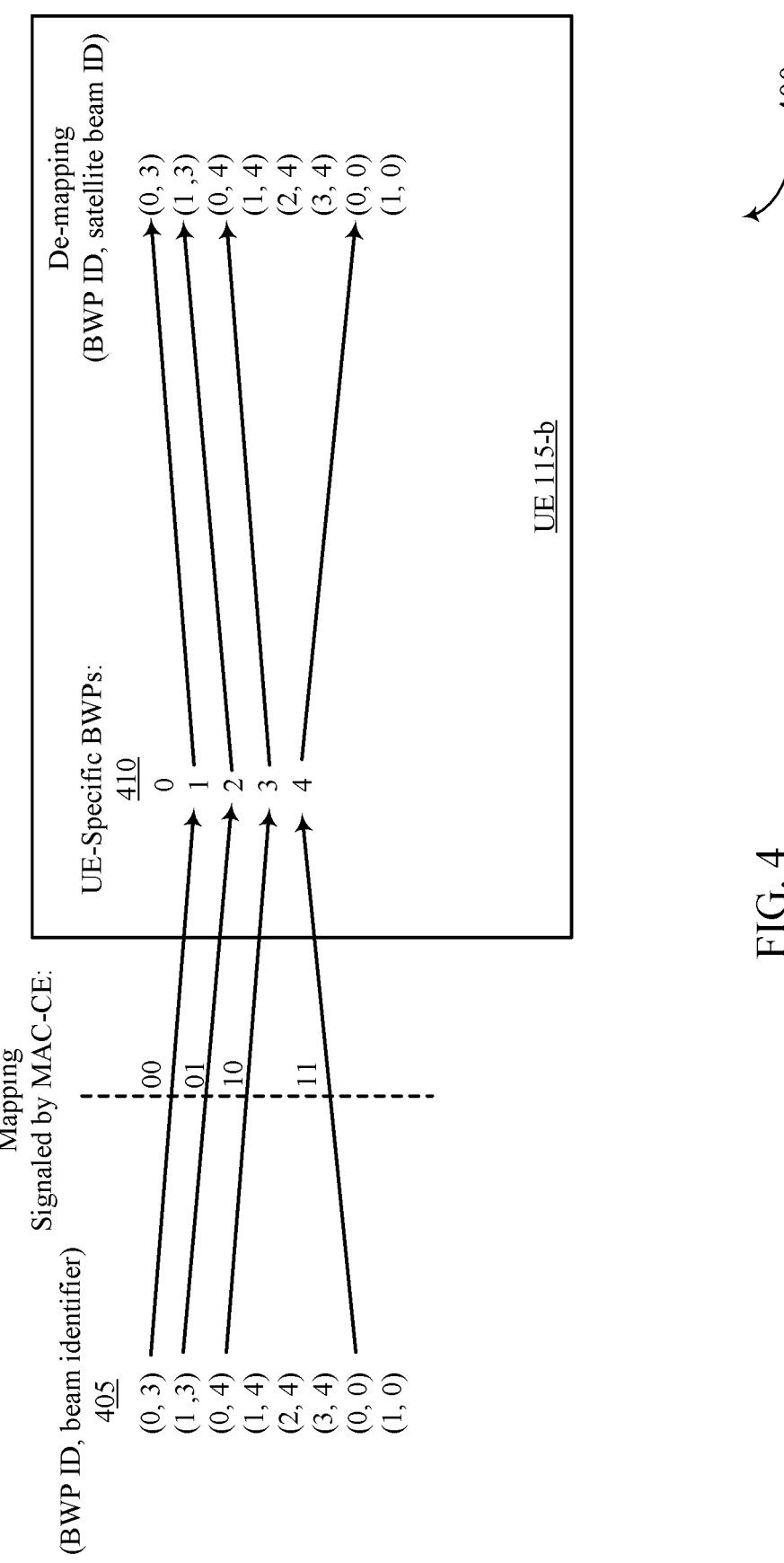
FIG. 4 illustrates an example of a mapping configuration that supports bandwidth part switching by activation and signaling in accordance with one or more aspects of the present disclosure.

FIG. 4 illustrates an example of a mapping configuration 400 that supports bandwidth part switching by activation and signaling in accordance with one or more aspects of the present disclosure. In some examples, the mapping configuration 400 may implement aspects of wireless communications system 100. The mapping configuration may be implemented by a network entity 205 as described with respect to FIG. 2 and a UE 115-*b*, which may be example of a UE 115 as described with respect to FIGS. 1. and 2.

The mapping configuration may be signaled to the UE via MAC-CE messaging (e.g., a first control message), and a bandwidth part and a satellite beam identifier may be signaled to the UE 115-*b* using a DCI message (e.g., a second control message). A network entity may select a subset of a set of associations between bandwidth part identifiers and beam identifiers 405 and map these associations to a set of indexes that may be signaled via DCI messaging. As illustrated in FIG. 4, the association (0, 3) is mapped to index 00, (1,3) to 01, (0,4) to 10 and (0, 0) to 11. This mapping may be indicated based on the ordering in the MAC-CE messaging. That is, the MAC-CE messaging may indicate (0, 3), (1, 3), (0, 4), then (0, 0), which may imply an ordered mapping to 00, 01, 10, 11 and to UE specific bandwidth parts 410. It should be understood that other types of mapping rules may be used.

In accordance with this mapping, a bwp-id field of the DCI (or another field of the DCI) may signal one of the indexes. For example, the DCI may indicate 00, which indicates that the UE 115-*b* is to use the UE specific bandwidth part corresponding bandwidth part identifier 0 and a satellite beam corresponding satellite beam identifier 3 for communications with the network entity. It should be understood that these mappings may be used with other network entities, such as base stations 105 in terrestrial networks.

Figure 5:
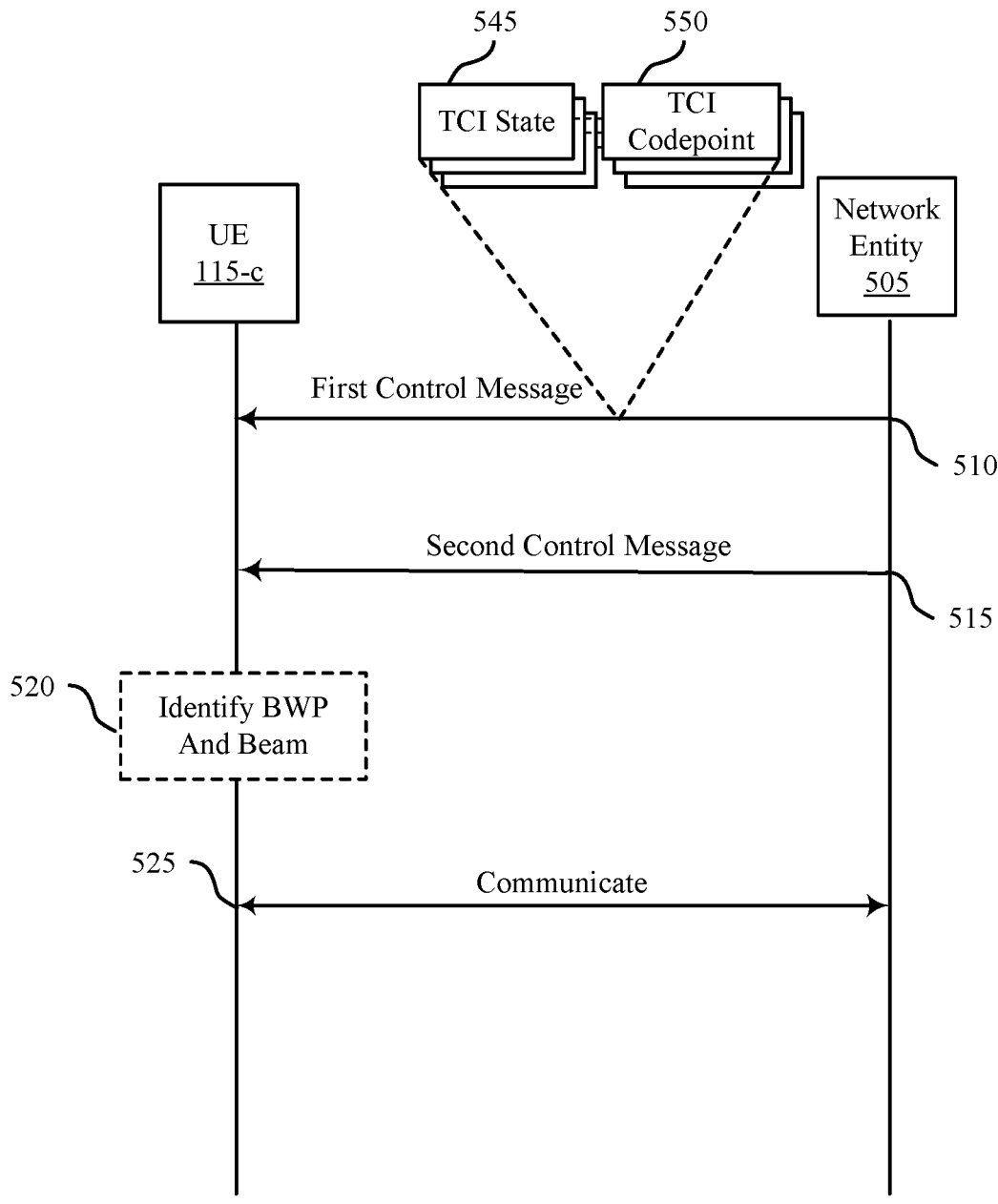
FIG. 5 illustrates an example of a process flow diagram that supports bandwidth part switching by activation and signaling in accordance with one or more aspects of the present disclosure.

FIG. 5 illustrates an example of a process flow diagram 500 that supports bandwidth part switching by activation and signaling in accordance with one or more aspects of the present disclosure. In some examples, process flow diagram 500 may implement aspects of wireless communications system 100. The process flow diagram 500 includes a UE 115-*c* and a network entity 505, which may be examples of the corresponding devices as described with respect to FIGS. 1 through 3.

In accordance with one implementation, at 510, the UE 115-*c* may receive, from the network entity 505, a first control message that indicates a mapping of each index of a set of indexes to a bandwidth part identifier and a corresponding beam identifier. In some cases, the first control message is an example of a MAC layer message, such as a MAC-CE message. The indexes may correspond to a field that may be included in DCI messaging.

At 515, the UE 115-*c* may receive, from the network entity 505, a second control message that includes an indication of an index of the set of indexes. The second control message may be an example of a physical layer message, such as a DCI message. In some cases, the index may be indicated by a bwp-id field of the DCI.

At 520, the UE 115-*c* may identify a bandwidth part and a beam based on the index included in the second control message. For example, the UE 115-*c* may demap the indicated index based on the mapping indicated via the first control message. Thus, the bandwidth part identifier and the beam identifier (e.g., a satellite beam identifier) may be identified in accordance with the mapping.

At 525, the UE 115-*c* may communicate with the network entity 505 on a bandwidth part in a beam that is mapped to the indicated index by the first control message. In some cases, this may include switching to a new bandwidth part, performing a beam switch, etc.

In accordance with another implementation, at 510, the UE 115-*c* may receive from the network entity 505, a first control message that includes an indication of a mapping of each TCI state 545 of a subset of TCI states to a respective TCI codepoint 550. A TCI state 545 may include parameters for configuring QCL relationships between one or two downlink reference signals and the DMRS ports of a downlink shared channel (e.g., a PDSCH), a downlink control channel (e.g., a PDCCH), or the CSI-RS port(s) of a CSI-RS resource. The TCI state 545 may signal to the UE 115-*d* as to which beam(s) to use for communications with the network entity 505. The TCI codepoint 550 may be an example a table (with a set of TCI states 545) with a limited size. The first control message may be an example of a MAC-CE message. The subset of TCI states (e.g., subset of transmission configuration indicator states) may be examples of TCI states that include indications of a beam identifier (e.g., a satellite beam identifier). The TCI states may have a type of "satellite-beam-index-Type," as described herein. These TCI states may be configured via RRC signaling.

At 515, the UE 115-*c* may receive, from the network entity 505, a second control message that includes a TCI codepoint (e.g., an index of the codepoint/table) and an indication of a bandwidth part identifier. The second control message may be an example of a DCI message. The DCI message (e.g., the second control message) that includes the indication of the TCI codepoint and the bandwidth part identifier may be included in a single transmission from the network entity 505 to the UE 115-*c*. Thus, upon receiving the second control message, the UE 115-*c* may identify the TCI state indicated by the TCI codepoint and identify a beam identified by the TCI state.

At 520, the UE 115-*c* may communicate with the network entity 505 on a bandwidth part corresponding to the indicated bandwidth part identifier and in a beam that is identified by a TCI state that is mapped to the indicted transmission configuration indicator codepoint by the first control message. In some cases, the communication may include switching to a new bandwidth part, performing a beam switch, etc.

Figure 6:
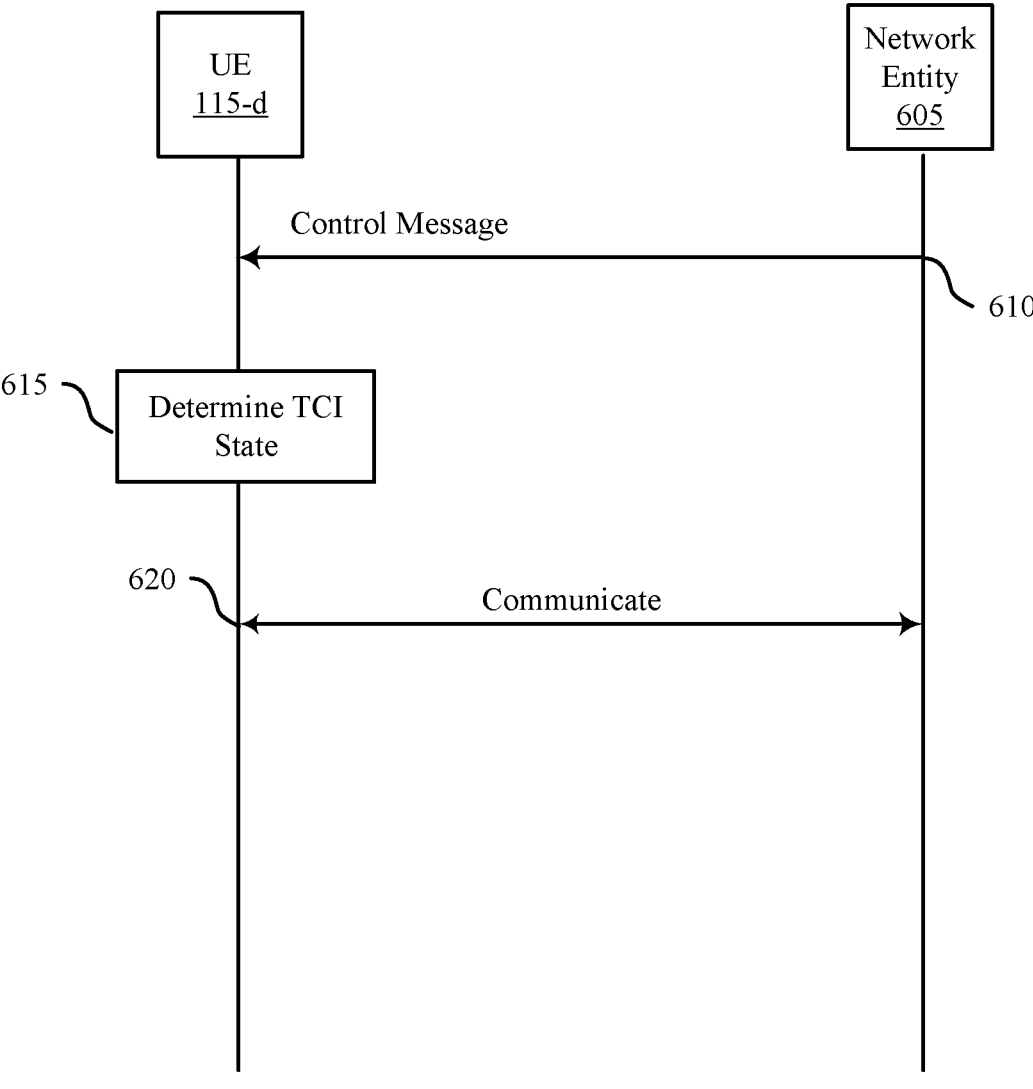
FIG. 6 illustrates an example of a process flow diagram that supports bandwidth part switching by activation and signaling in accordance with one or more aspects of the present disclosure.

FIG. 6 illustrates an example of a process flow diagram 600 that supports bandwidth part switching by activation and signaling in accordance with one or more aspects of the present disclosure. In some examples, process flow diagram 600 may implement aspects of wireless communications system 100. The process flow diagram 600 includes a UE 115-*d* and a network entity 605, which may be examples of the corresponding devices as described with respect to FIGS. 1 through 4.

At 610, the UE 115-*d* may receive, from the network entity 605, a control message that includes an indication of a TCI state identifier. The control message may be an example of a MAC layer message, such as a MAC-CE message. A set of TCI states may be configured at the UE 115-*d* using RRC messaging. The MAC-CE messaging may indicate a TCI state identifier (e.g., a transmission configuration indicator state identifier) of one of the configured TCI states.

At 615, the UE 115-*d* may determine that a TCI state corresponding to the TCI state identifier includes an indication of a satellite beam identifier. That is, the UE 115-*d* may identify the TCI state corresponding to the TCI state identifier, and determine that the TCI state includes an indication of a satellite beam identifier. In some cases, this may include determining that the TCI state has a TCI state type of satellite-beam-index-type.

At 620, the UE 115-*d* may communicate with the network entity 605 using a satellite beam corresponding to the satellite beam identifier. In some cases, this may include performing a beam switch. The UE 115-*d* may receive a DCI message that indicates a bandwidth part, and the UE 115-*d* may communicate with the network entity 605 using the bandwidth part identified via the DCI message.

Figure 7:
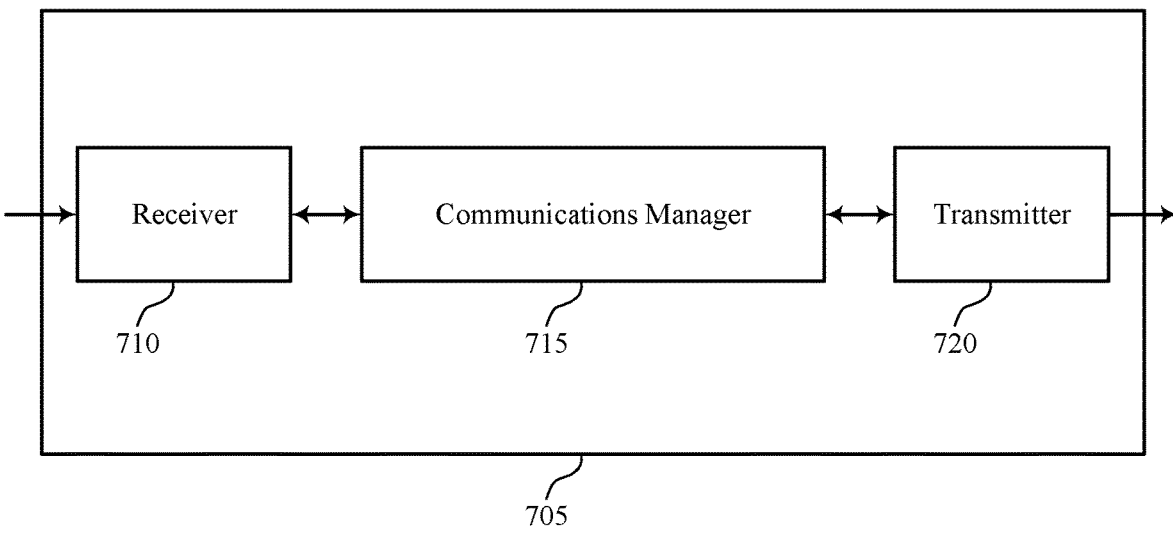
FIGS. 7 and 8 show block diagrams of devices that support bandwidth part switching by activation and signaling in accordance with one or more aspects of the present disclosure.

FIG. 7 shows a block diagram 700 of a device 705 that supports bandwidth part switching by activation and signaling in accordance with one or more aspects of the present disclosure. The device 705 may be an example of aspects of a UE 115 as described herein.

The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to bandwidth part switching by activation and signaling, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive, from a network entity, a first control message that indicates a mapping of each index of a set of indexes to a bandwidth part identifier and a corresponding beam identifier, receive, from the network entity, a second control message that includes an indication of an index of the set of indexes, and communicate with the network entity on a bandwidth part in a beam that is mapped to the indicated index by the first control message. The communications manager 715 may also receive, from a network entity, a first control message that includes an indication of a mapping of each TCI state of a subset of TCI states to a respective transmission configuration indicator codepoint, receive, from the network entity, a second control message that includes a transmission configuration indicator codepoint and an indication of a bandwidth part identifier, and communicate with the network entity on a bandwidth part corresponding to the indicated bandwidth part identifier and in a beam that is identified by a TCI state that is mapped to the indicted transmission configuration indicator codepoint by the first control message. The communications manager 715 may also receive, from a network entity, a control message that includes an indication of a TCI state identifier, determine that a TCI state corresponding to the TCI state identifier includes an indication of a satellite beam identifier, and communicate with the network entity using a satellite beam corresponding to the satellite beam identifier. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

In some examples, the communications manager 715 may be implemented as an integrated circuit or chipset for a mobile device modem, and the receiver 710 and transmitter 720 may be implemented as analog components (e.g., amplifiers, filters, antennas) coupled with the mobile device modem to enable wireless transmission and reception over one or more bands.

The communications manager 715 as described herein may be implemented. One implementation may allow the device 705 to more efficiently coordinate communication between a network entity and the device 705, and more specifically to determine beams and/or bandwidth parts to utilize for communications with the network entity. For example, the device 705 may receive control messaging that indicates a beam and/or bandwidth part (e.g., via MAC-CE and/or DCI messaging).

Based on implementing the beam and bandwidth part identification techniques as described herein, a processor of a UE 115 (e.g., controlling the receiver 710, the transmitter 720, or the transceiver 1020 as described with reference to FIG. 10) may increase reliability and decrease signaling overhead in the communication since the beam and bandwidth part identification configuration may be indicated to the UE 115 using higher layer signaling.

Figure 8:
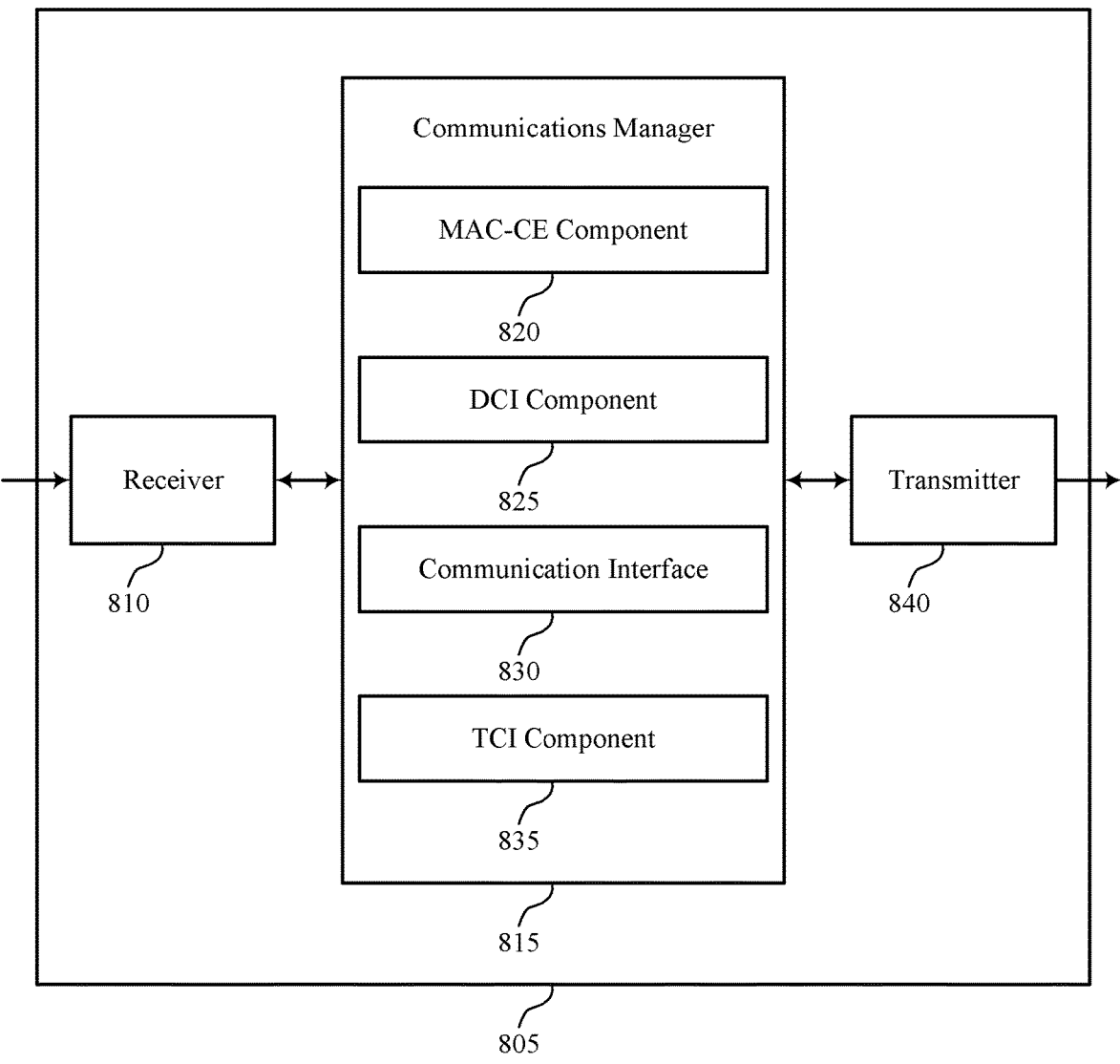

FIG. 8 shows a block diagram 800 of a device 805 that supports bandwidth part switching by activation and signaling in accordance with one or more aspects of the present disclosure. The device 805 may be an example of aspects of a device 705, or a UE 115 as described herein. The device 805 may include a receiver 810, a communications manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to bandwidth part switching by activation and signaling, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a MAC-CE component 820, a DCI component 825, a communication interface 830, and a TCI component 835. The communications manager 815 may be an example of aspects of the communications manager 1010 described herein.

The MAC-CE Component 820 may receive, from a network entity, a first control message that indicates a mapping of each index of a set of indexes to a bandwidth part identifier and a corresponding beam identifier.

The DCI component 825 may receive, from the network entity, a second control message that includes an indication of an index of the set of indexes.

The communication interface 830 may communicate with the network entity on a bandwidth part in a beam that is mapped to the indicated index by the first control message.

The MAC-CE Component 820 may receive, from a network entity, a first control message that includes an indication of a mapping of each TCI state of a subset of TCI states to a respective transmission configuration indicator codepoint.

The DCI component 825 may receive, from the network entity, a second control message that includes a transmission configuration indicator codepoint and an indication of a bandwidth part identifier.

The communication interface 830 may communicate with the network entity on a bandwidth part corresponding to the indicated bandwidth part identifier and in a beam that is identified by a TCI state that is mapped to the indicted transmission configuration indicator codepoint by the first control message.

The MAC-CE Component 820 may receive, from a network entity, a control message that includes an indication of a TCI state identifier.

The TCI component 835 may determine that a TCI state corresponding to the TCI state identifier includes an indication of a satellite beam identifier.

The communication interface 830 may communicate with the network entity using a satellite beam corresponding to the satellite beam identifier.

The transmitter 840 may transmit signals generated by other components of the device 805. In some examples, the transmitter 840 may be collocated with a receiver 810 in a transceiver module. For example, the transmitter 840 may be an example of aspects of the transceiver 1020 described with reference to FIG. 10. The transmitter 840 may utilize a single antenna or a set of antennas.

Figure 9:
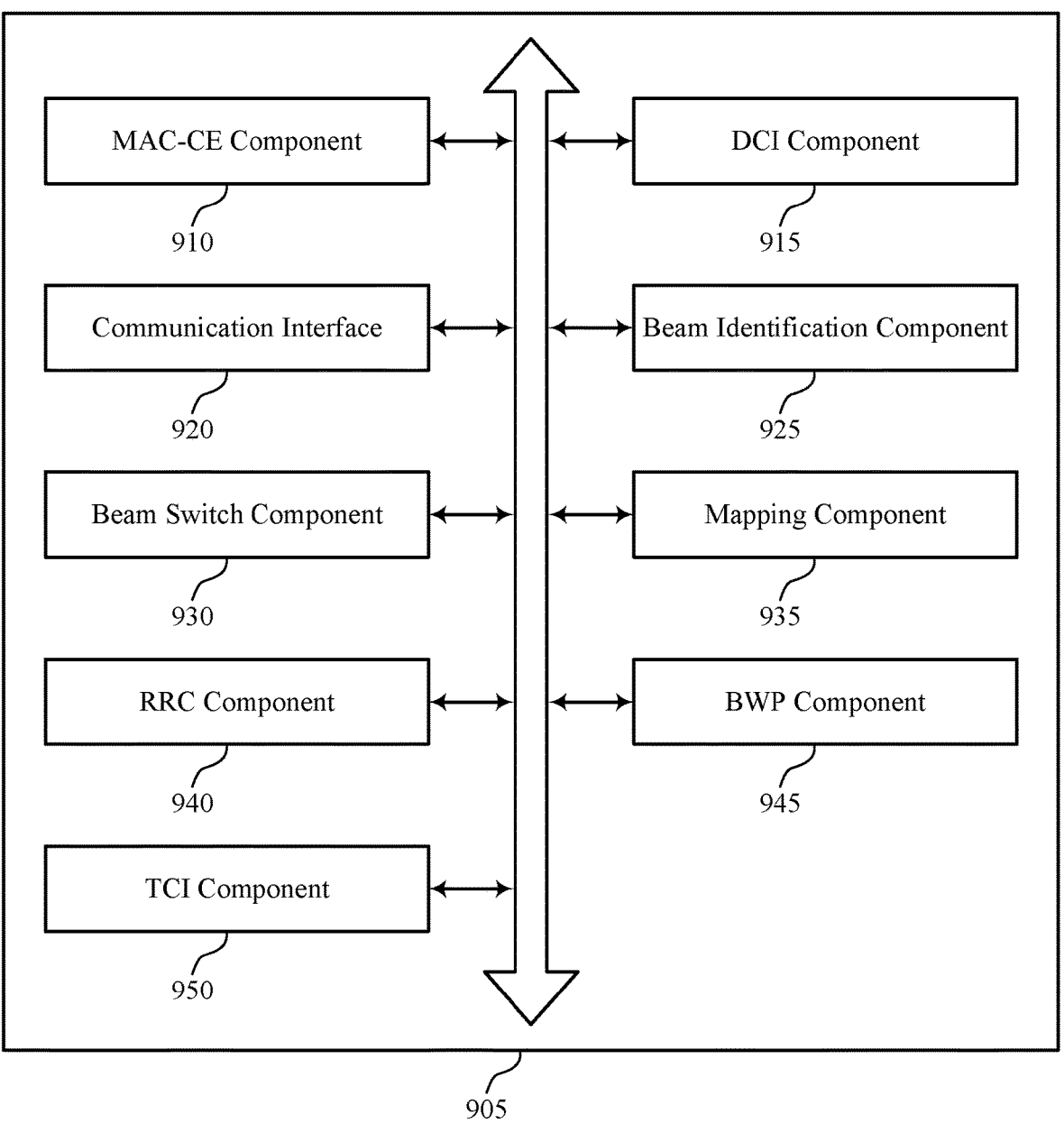
FIG. 9 shows a block diagram of a communications manager that supports bandwidth part switching by activation and signaling in accordance with one or more aspects of the present disclosure.

FIG. 9 shows a block diagram 900 of a communications manager 905 that supports bandwidth part switching by activation and signaling in accordance with one or more aspects of the present disclosure. The communications manager 905 may be an example of aspects of a communications manager 715, a communications manager 815, or a communications manager 1010 described herein. The communications manager 905 may include a MAC-CE component 910, a DCI component 915, a communication interface 920, a beam identification component 925, a beam switch component 930, a mapping component 935, an RRC component 940, a BWP component 945, and a TCI component 950. Each of these modules may communicate, directly or indirectly, with one another (e.g., via one or more buses).

The MAC-CE Component 910 may receive, from a network entity, a first control message that indicates a mapping of each index of a set of indexes to a bandwidth part identifier and a corresponding beam identifier.

In some examples, the MAC-CE Component 910 may receive, from a network entity, a first control message that includes an indication of a mapping of each TCI state of a subset of TCI states to a respective transmission configuration indicator codepoint.

In some examples, the MAC-CE Component 910 may receive, from a network entity, a control message that includes an indication of a TCI state identifier.

In some examples, the MAC-CE Component 910 may receive a MAC-CE message that indicates the mapping.

In some examples, the MAC-CE Component 910 may receive the first control message that indicates the mapping such that each index is mapped to the bandwidth part identifier corresponding to an uplink bandwidth part or such that each index is mapped to the bandwidth part identifier corresponding to a downlink bandwidth part.

In some examples, the MAC-CE Component 910 may receive the first control messages that indicates the mapping of each index to the bandwidth part identifier, the corresponding beam identifier, and a satellite identifier.

In some examples, the MAC-CE Component 910 may receive the first control message that indicates the mapping based on the corresponding beam identifier being included in a parameter of a bandwidth part indicated by the corresponding bandwidth part identifier.

In some examples, the MAC-CE Component 910 may receive a third control message having a same format as the first control message, the third control message indicating a new mapping of each index of the set of indexes to a bandwidth part identifier and a corresponding beam identifier, the third control message being received based at least in part on a change in location of the UE relative to the beam.

In some examples, the MAC-CE Component 910 may receive a MAC-CE message that indicates the mapping.

In some examples, the MAC-CE Component 910 may receive a bitmap, each value in the bitmap indicating an activation state of a corresponding TCI state, the respective TCI codepoint being mapped to the TCI state based on the activation state being an active state as indicated by the bitmap.

In some examples, the MAC-CE Component 910 may receive a MAC-CE message that includes the indication of the TCI state identifier.

In some examples, the MAC-CE Component 910 may receive the control message that includes the indication of the TCI state identifier and an indication of a sub-TCI state identifier, where the satellite beam is identified based on the indication of the sub-TCI state identifier.

The DCI component 915 may receive, from the network entity, a second control message that includes an indication of an index of the set of indexes.

In some examples, the DCI component 915 may receive, from the network entity, a second control message that includes a transmission configuration indicator codepoint and an indication of a bandwidth part identifier.

In some examples, the DCI component 915 may receive a DCI message that includes the indication of the index.

In some examples, the DCI component 915 may receive a DCI message that includes the transmission configuration indicator codepoint and the bandwidth part identifier.

In some examples, the DCI component 915 may receive the second control message that indicates the TCI state identifier corresponding to the TCI state having a TCI state type corresponding to a satellite beam index type.

In some examples, the DCI component 915 may receive, from the network entity, a DCI message that indicates a bandwidth part identifier, the communicating being performed on a bandwidth part corresponding to the indicated bandwidth part identifier.

In some cases, the indication of the index includes a bandwidth part index field.

The communication interface 920 may communicate with the network entity on a bandwidth part in a beam that is mapped to the indicated index by the first control message.

In some examples, the communication interface 920 may communicate with the network entity on a bandwidth part corresponding to the indicated bandwidth part identifier and in a beam that is identified by a TCI state that is mapped to the indicted transmission configuration indicator codepoint by the first control message.

In some examples, the communication interface 920 may communicate with the network entity using a satellite beam corresponding to the satellite beam identifier.

The TCI component 950 may determine that a TCI state corresponding to the TCI state identifier includes an indication of a satellite beam identifier.

In some examples, the TCI component 950 may identify the beam from the TCI state based on a satellite beam identifier, a cell identifier, or a synchronization signal block index included in the TCI state.

In some examples, the TCI component 950 may determine that the TCI state has a TCI state type of satellite beam index type.

In some examples, the TCI component 950 may determine that an activate TCI state corresponding to the indicated bandwidth part is a TCI state that includes an indication of the satellite beam identifier.

In some cases, the sub-TCI state identifier is included in the TCI state identified by the TCI state identifier and a sub-TCI state corresponding to the sub-TCI state identifier includes the indication of the satellite beam.

In some cases, a sub-TCI state corresponding to the sub-TCI state identifier includes an indication of a satellite identifier corresponding to the satellite beam.

The beam identification component 925 may determine that the beam that is mapped to the indicated index is different from a current beam.

In some examples, the beam identification component 925 may determine that the beam that is identified by the TCI state is different from a current beam.

In some examples, the beam identification component 925 may determine that the satellite beam corresponding to the satellite beam identifier is different from a current beam.

The beam switch component 930 may perform a beam switch procedure to communicate with the network entity on the beam based on determining that the beam is different from the current beam.

In some examples, the beam switch component 930 may identify one or more default bandwidth parts that correspond to the beam.

In some examples, the beam switch component 930 may adjust a frequency compensation, a timing parameter, or a combination thereof corresponding to the beam.

In some examples, the beam switch component 930 may identify an uplink bandwidth part different from the current bandwidth part based on determining that the bandwidth part is different from the current bandwidth part in accordance with the RRC message.

In some examples, the beam switch component 930 may perform a beam switch procedure to communicate with the network entity on the bandwidth part in the beam based on determining that the beam is different from the current beam.

In some examples, the beam switch component 930 may identify one or more default bandwidth parts that correspond to the beam.

In some examples, the beam switch component 930 may adjust a frequency compensation, a timing parameter, or a combination thereof corresponding to the beam.

In some examples, the beam switch component 930 may perform a beam switch procedure based on determining that the activate TCI state includes the indication of the satellite beam identifier.

In some examples, the beam switch component 930 may perform a beam switch procedure to communicate with the network entity on the satellite beam based on determining that the satellite beam is different from the current beam.

The mapping component 935 may de-map the indicated index based on the mapping indicated in the first control message to identify the bandwidth part and the beam.

In some examples, the mapping component 935 may de-map the transmission configuration indicator codepoint based on the mapping indicated in the first control message to identify the TCI sate that indicates the beam.

The RRC component 940 may receive, from the network entity, a RRC message that configures a set of TCI states that include a TCI state identifier, a TCI state type, and a satellite beam identifier, the first control message including the indication of the mapping of each transmission configuration indicator state to the respective transmission configuration indicator codepoint.

In some examples, the RRC component 940 may receive a RRC message that indicates that the UE is to switch an uplink bandwidth part when a downlink bandwidth part is switched by the transmission configuration indicator codepoint of the second control message.

In some examples, the RRC component 940 may receive, from the network entity, a RRC message that configures a set of TCI states that include a TCI state identifier, a TCI state type, and a satellite beam identifier, the control message including the indication of a TCI state identifier configured by the RRC message.

The BWP component 945 may determine that the bandwidth part corresponding to the indicated bandwidth part identifier is different from a current bandwidth part.

Figure 10:
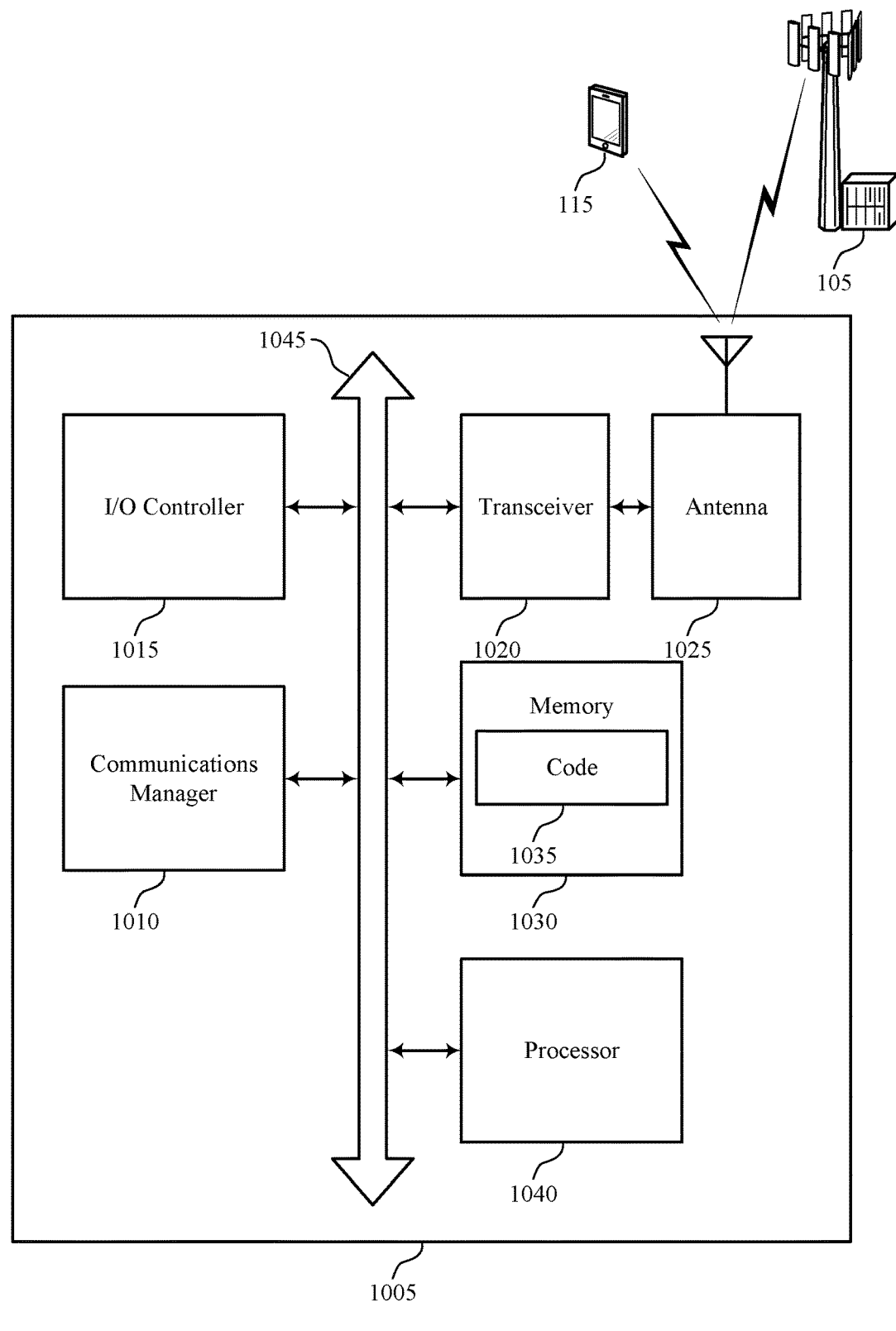
FIG. 10 shows a diagram of a system including a device that supports bandwidth part switching by activation and signaling in accordance with one or more aspects of the present disclosure.

FIG. 10 shows a diagram of a system 1000 including a device 1005 that supports bandwidth part switching by activation and signaling in accordance with one or more aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive, from a network entity, a first control message that indicates a mapping of each index of a set of indexes to a bandwidth part identifier and a corresponding beam identifier, receive, from the network entity, a second control message that includes an indication of an index of the set of indexes, and communicate with the network entity on a bandwidth part in a beam that is mapped to the indicated index by the first control message. The communications manager 1010 may also receive, from a network entity, a first control message that includes an indication of a mapping of each TCI state of a subset of TCI states to a respective transmission configuration indicator codepoint, receive, from the network entity, a second control message that includes a transmission configuration indicator codepoint and an indication of a bandwidth part identifier, and communicate with the network entity on a bandwidth part corresponding to the indicated bandwidth part identifier and in a beam that is identified by a TCI state that is mapped to the indicted transmission configuration indicator codepoint by the first control message. The communications manager 1010 may also receive, from a network entity, a control message that includes an indication of a TCI state identifier, determine that a TCI state corresponding to the TCI state identifier includes an indication of a satellite beam identifier, and communicate with the network entity using a satellite beam corresponding to the satellite beam identifier.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic input/output system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting bandwidth part switching by activation and signaling).

The computer-executable code 1035 may include instructions to implement aspects of the present disclosure, including instructions to support wireless communications. The computer-executable code 1035 may be stored in a non-transitory computer-readable medium such as system memory or other type of memory. In some cases, the computer-executable code 1035 may not be directly executable by the processor 1040 but may cause a computer (e.g., when compiled and executed) to perform functions described herein.

Figure 11:
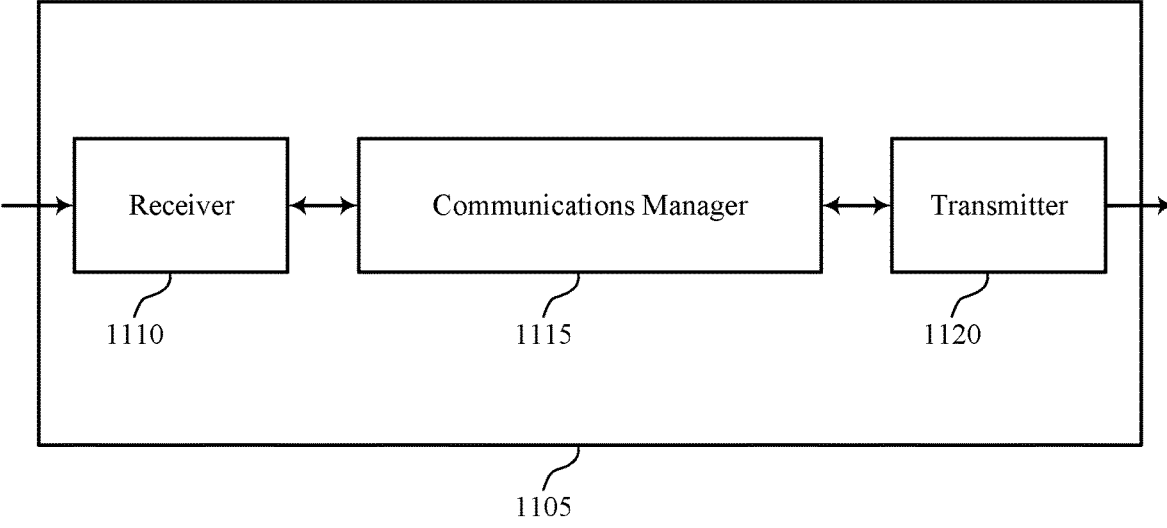
FIGS. 11 and 12 show block diagrams of devices that support bandwidth part switching by activation and signaling in accordance with one or more aspects of the present disclosure.

FIG. 11 shows a block diagram 1100 of a device 1105 that supports bandwidth part switching by activation and signaling in accordance with one or more aspects of the present disclosure. The device 1105 may be an example of aspects of a network entity as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to bandwidth part switching by activation and signaling, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may transmit, to a UE, a first control message that indicates a mapping of each index of a set of indexes to a bandwidth part identifier and a corresponding beam identifier, transmit, to the UE, a second control message that includes an indication of an index of the set of indexes, and communicate with the UE on a bandwidth part and a beam that is mapped to the indicated index by the first control message. The communications manager 1115 may also transmit, to a UE, a first control message that includes an indication of a mapping of each TCI state of a subset of TCI states to a respective transmission configuration indicator codepoint, transmit, to the UE, a second control message that includes an indication of a transmission configuration indicator codepoint and an indication of a bandwidth part identifier, and communicate with the network entity on a bandwidth part corresponding to the indicated bandwidth part identifier and in a beam that is identified by a TCI state that is mapped to the indicted TCI codepoint by the first control message. The communications manager 1115 may also transmit, to a UE, a control message that includes an indication of a TCI state identifier, a TCI state corresponding to the TCI state identifier including an indication of a satellite beam identifier and communicate with the UE using a satellite beam corresponding to the satellite beam identifier. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
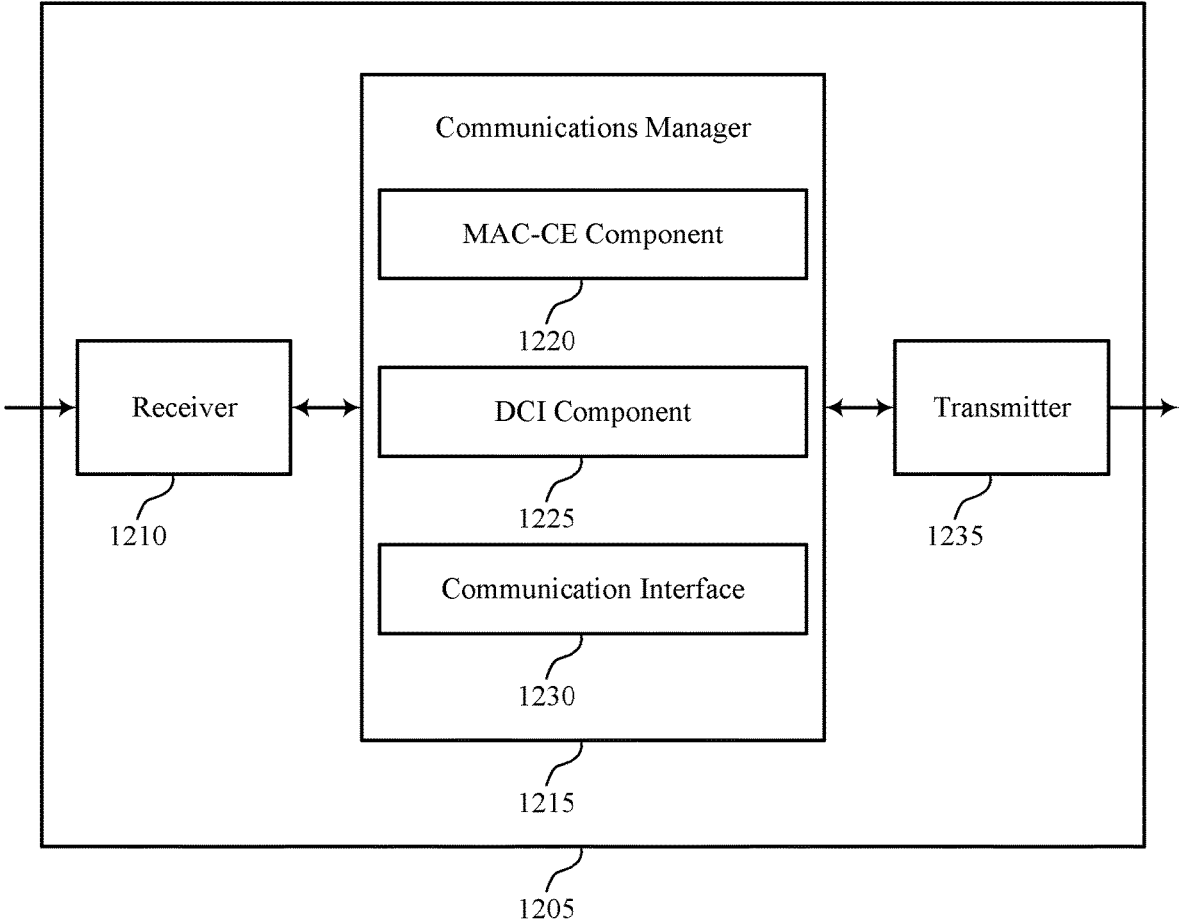

FIG. 12 shows a block diagram 1200 of a device 1205 that supports bandwidth part switching by activation and signaling in accordance with one or more aspects of the present disclosure. The device 1205 may be an example of aspects of a device 1105 or a network entity as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to bandwidth part switching by activation and signaling, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a MAC-CE component 1220, a DCI component 1225, and a communication interface 1230. The communications manager 1215 may be an example of aspects of the communications manager 1410 described herein.

The MAC-CE Component 1220 may transmit, to a UE, a first control message that indicates a mapping of each index of a set of indexes to a bandwidth part identifier and a corresponding beam identifier.

The DCI component 1225 may transmit, to the UE, a second control message that includes an indication of an index of the set of indexes.

The communication interface 1230 may communicate with the UE on a bandwidth part and a beam that is mapped to the indicated index by the first control message.

The MAC-CE Component 1220 may transmit, to a UE, a first control message that includes an indication of a mapping of each TCI state of a subset of TCI states to a respective transmission configuration indicator codepoint.

The DCI component 1225 may transmit, to the UE, a second control message that includes an indication of a transmission configuration indicator codepoint and an indication of a bandwidth part identifier.

The communication interface 1230 may communicate with the network entity on a bandwidth part corresponding to the indicated bandwidth part identifier and in a beam that is identified by a TCI state that is mapped to the indicted TCI codepoint by the first control message.

The MAC-CE Component 1220 may transmit, to a UE, a control message that includes an indication of a TCI state identifier, a TCI state corresponding to the TCI state identifier including an indication of a satellite beam identifier.

The communication interface 1230 may communicate with the UE using a satellite beam corresponding to the satellite beam identifier.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
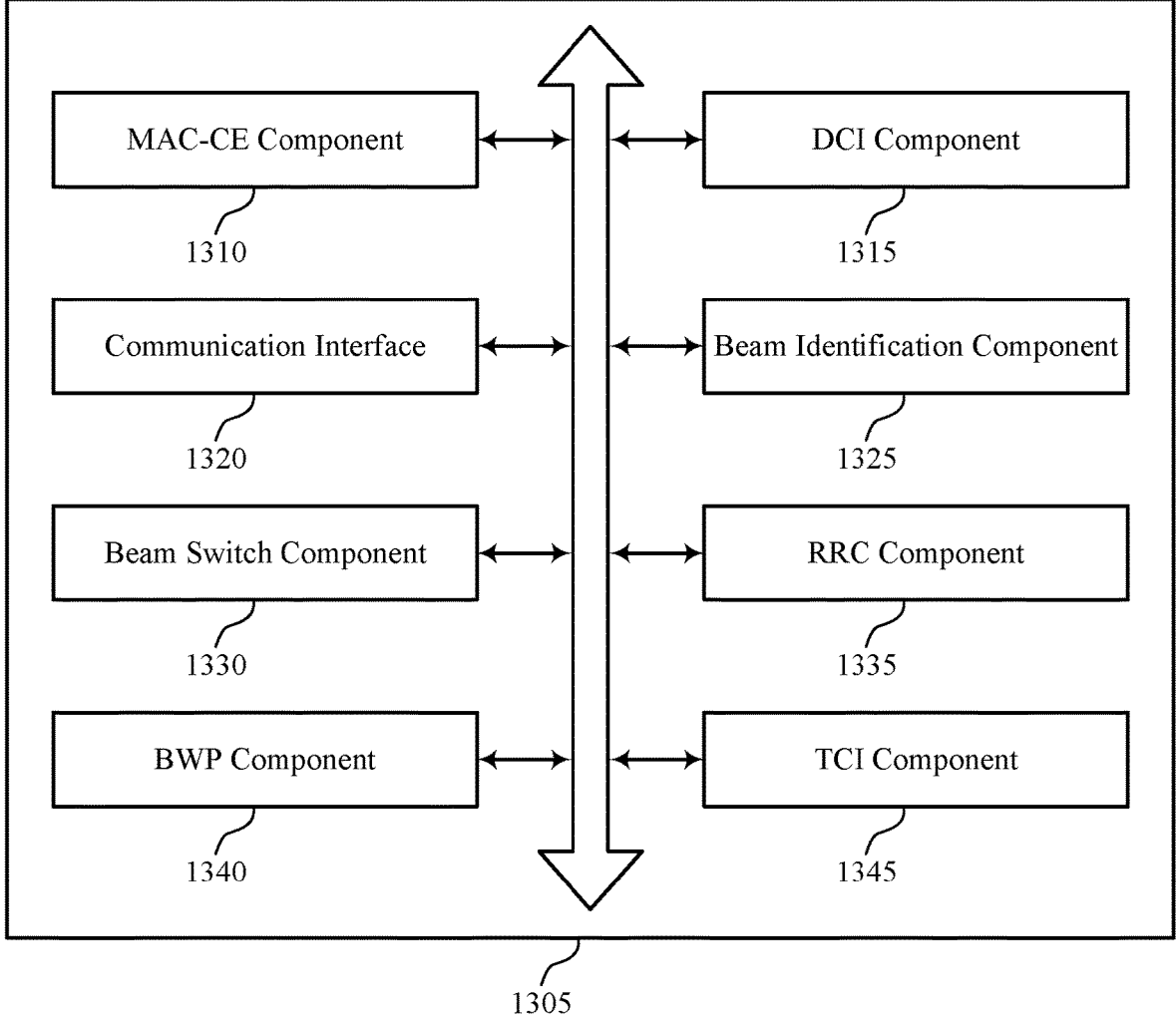
FIG. 13 shows a block diagram of a communications manager that supports bandwidth part switching by activation and signaling in accordance with one or more aspects of the present disclosure.

FIG. 13 shows a block diagram 1300 of a communications manager 1305 that supports bandwidth part switching by activation and signaling in accordance with one or more aspects of the present disclosure. The communications manager 1305 may be an example of aspects of a communications manager 1115, a communications manager 1215, or a communications manager 1410 described herein. The communications manager 1305 may include a MAC-CE component 1310, a DCI component 1315, a communication interface 1320, a beam identification component 1325, a beam switch component 1330, an RRC component 1335, a BWP component 1340, and a TCI component 1345. Each of these modules may communicate, directly or indirectly, with one another (e.g., via one or more buses).

The MAC-CE Component 1310 may transmit, to a UE, a first control message that indicates a mapping of each index of a set of indexes to a bandwidth part identifier and a corresponding beam identifier.

In some examples, the MAC-CE Component 1310 may transmit, to a UE, a first control message that includes an indication of a mapping of each TCI state of a subset of TCI states to a respective transmission configuration indicator codepoint.

In some examples, the MAC-CE Component 1310 may transmit, to a UE, a control message that includes an indication of a TCI state identifier, a TCI state corresponding to the TCI state identifier including an indication of a satellite beam identifier.

In some examples, the MAC-CE Component 1310 may transmit a MAC-CE message that indicates the mapping.

In some examples, the MAC-CE Component 1310 may transmit the first control message that indicates the mapping such that each index is mapped to the bandwidth part identifier corresponding to an uplink bandwidth part or such that each index is mapped to the bandwidth part identifier corresponding to a downlink bandwidth part.

In some examples, the MAC-CE Component 1310 may transmit the first control messages that indicates the mapping of each index to the bandwidth part identifier, the corresponding beam identifier, and a satellite identifier.

In some examples, the MAC-CE Component 1310 may transmit the first control message that indicates the mapping based on the corresponding beam identifier being included in a parameter of a bandwidth part indicated by the corresponding bandwidth part identifier.

In some examples, the MAC-CE Component 1310 may transmit a third control message having a same format as the first control message, the third control message indicating a new mapping of each index of the set of indexes to a bandwidth part identifier and a corresponding beam identifier, the third control message being transmitted based at least in part on a change in location of the UE relative to the beam.

In some examples, the MAC-CE Component 1310 may transmit a MAC-CE message that indicates the mapping.

In some examples, the MAC-CE Component 1310 may transmit a bitmap, each value in the bitmap indicating an activation state of a corresponding TCI state, the respective TCI codepoint being mapped to the TCI state based on the activation state being an active state as indicated by the bitmap.

In some examples, the MAC-CE Component 1310 may transmit the control message that indicates the TCI state that is associated with has a TCI state type of satellite beam index type.

In some examples, the MAC-CE Component 1310 may transmit a MAC-CE message that includes the indication of the TCI state identifier.

In some examples, the MAC-CE Component 1310 may transmit the control message that includes the indication of the TCI state identifier and an indication of a sub-TCI state identifier, where the satellite beam is identified based on the indication of the sub-TCI state identifier.

The DCI component 1315 may transmit, to the UE, a second control message that includes an indication of an index of the set of indexes.

In some examples, the DCI component 1315 may transmit, to the UE, a second control message that includes an indication of a transmission configuration indicator codepoint and an indication of a bandwidth part identifier.

In some examples, the DCI component 1315 may transmit a DCI message that includes the indication of the index.

In some examples, the DCI component 1315 may transmit a DCI message that includes the indication of the transmission configuration indicator codepoint and the bandwidth part identifier.

In some examples, the DCI component 1315 may transmit the second control message that indicates the transmission configuration indicator codepoint corresponding to the TCI state having a TCI state type corresponding to a satellite beam index type.

In some examples, the DCI component 1315 may transmit, to the UE, a DCI message that indicates a bandwidth part identifier, the communicating being performed on a bandwidth part corresponding to the indicated bandwidth part identifier.

In some cases, the indication of the index includes a bandwidth part index field.

The communication interface 1320 may communicate with the UE on a bandwidth part and a beam that is mapped to the indicated index by the first control message.

In some examples, the communication interface 1320 may communicate with the network entity on a bandwidth part corresponding to the indicated bandwidth part identifier and in a beam that is identified by a TCI state that is mapped to the indicted TCI codepoint by the first control message.

In some examples, the communication interface 1320 may communicate with the UE using a satellite beam corresponding to the satellite beam identifier.

The beam identification component 1325 may determine that the beam that is mapped to the indicated index is different from a current beam.

In some examples, the beam identification component 1325 may determine that the beam that is identified by the TCI state is different from a current beam.

The beam switch component 1330 may perform a beam switch procedure to communicate with the UE on the beam based on determining that the beam is different from the current beam.

In some examples, the beam switch component 1330 may identify one or more default bandwidth parts that correspond to the beam.

In some examples, the beam switch component 1330 may adjust a frequency compensation, a timing parameter, or a combination thereof corresponding to the beam.

In some examples, the beam switch component 1330 may perform a beam switch procedure to communicate with the network entity on the bandwidth part in the beam based on determining that the beam is different from the current beam.

The RRC component 1335 may transmit, to the UE, a RRC message that configures a set of TCI states that include a TCI state identifier, a TCI state type, and a satellite beam identifier, the first control message including the indication of the mapping of each TCI state to the respective TCI codepoint.

In some examples, the RRC component 1335 may transmit a RRC message that indicates that the UE is to switch an uplink bandwidth part when a downlink bandwidth part is switched by the transmission configuration indicator codepoint of the second control message.

In some examples, the RRC component 1335 may transmit, to the UE, a RRC message that configures a set of TCI states that include a TCI state identifier, a TCI state type, and a satellite beam identifier, the control message including the indication of a TCI state identifier configured by the RRC message.

The BWP component 1340 may determine that the bandwidth part corresponding to the indicated bandwidth part identifier is different from a current bandwidth part.

In some examples, the BWP component 1340 may identify an uplink bandwidth part different from the current bandwidth part based on determining that the bandwidth part is different from the current bandwidth part in accordance with the RRC message.

The TCI component 1345 may transmit an indication of the beam in the TCI state based on a satellite beam identifier, a cell identifier, or a synchronization signal block index included in the TCI state.

In some cases, the sub-TCI state identifier is included in the TCI state identified by the TCI state identifier and a sub-TCI state corresponding to the sub-TCI state identifier includes the indication of the satellite beam.

In some cases, a sub-TCI state corresponding to the sub-TCI state identifier includes an indication of a satellite identifier corresponding to the satellite beam.

Figure 14:
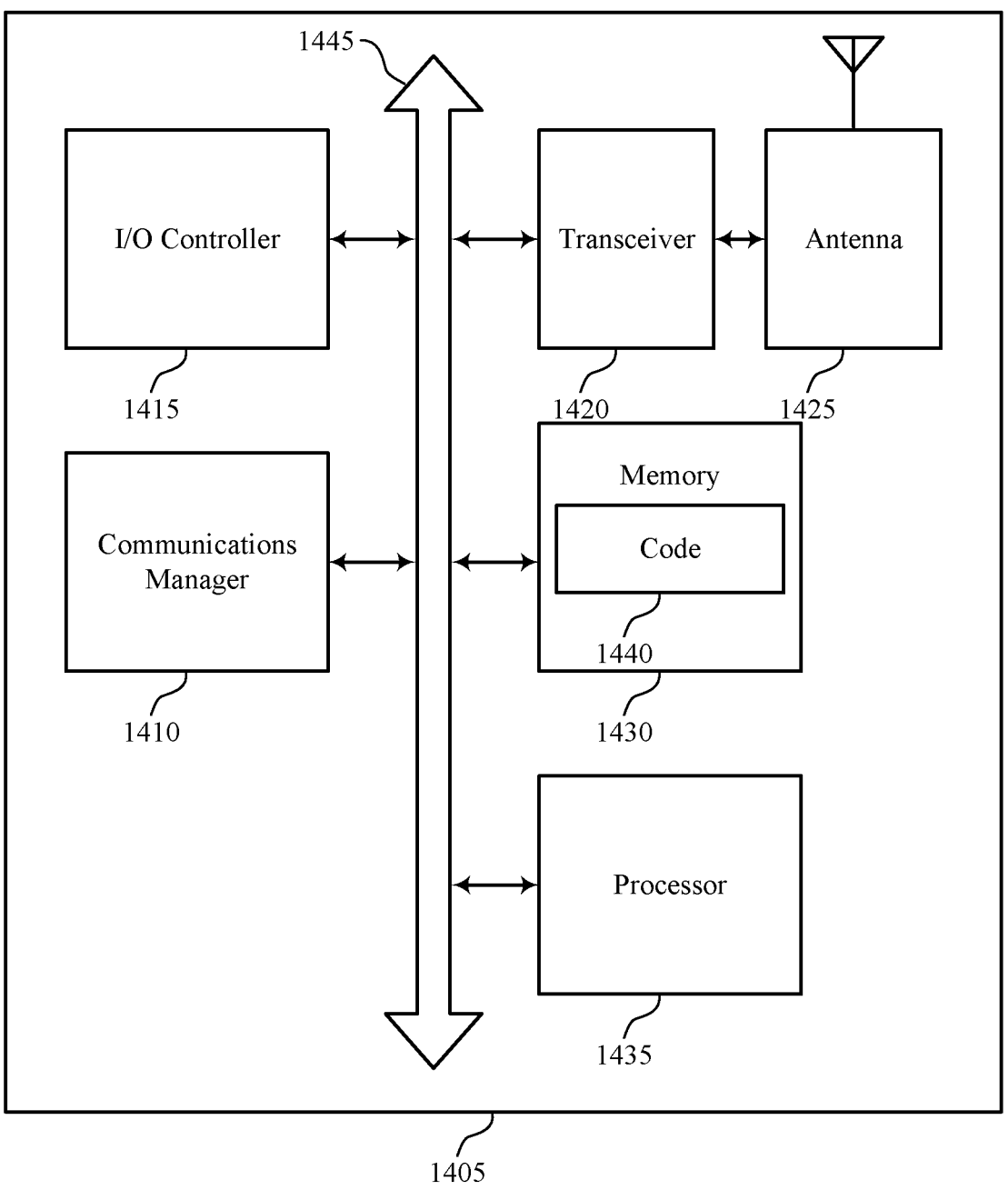
FIG. 14 shows a diagram of a system including a device that supports bandwidth part switching by activation and signaling in accordance with one or more aspects of the present disclosure.

FIG. 14 shows a diagram of a system 1400 including a device 1405 that supports bandwidth part switching by activation and signaling in accordance with one or more aspects of the present disclosure. The device 1405 may be an example of or include the components of device 1105, device 1205, or a network entity (e.g., satellite or base station) as described herein. In some examples, the device may be an example of a base station 105 or a satellite. The device 1405 may include components for bi-directional voice and data communications including components for transmitting and receiving communications, including a communications manager 1410, an I/O controller 1415, a transceiver 1420, an antenna 1425, memory 1430, and a processor 1435. These components may be in electronic communication via one or more buses (e.g., bus 1445).

The communications manager 1410 may transmit, to a UE, a first control message that indicates a mapping of each index of a set of indexes to a bandwidth part identifier and a corresponding beam identifier, transmit, to the UE, a second control message that includes an indication of an index of the set of indexes, and communicate with the UE on a bandwidth part and a beam that is mapped to the indicated index by the first control message. The communications manager 1410 may also transmit, to a UE, a first control message that includes an indication of a mapping of each TCI state of a subset of TCI states to a respective transmission configuration indicator codepoint, transmit, to the UE, a second control message that includes an indication of a transmission configuration indicator codepoint and an indication of a bandwidth part identifier, and communicate with the network entity on a bandwidth part corresponding to the indicated bandwidth part identifier and in a beam that is identified by a TCI state that is mapped to the indicted TCI codepoint by the first control message. The communications manager 1410 may also transmit, to a UE, a control message that includes an indication of a TCI state identifier, a TCI state corresponding to the TCI state identifier including an indication of a satellite beam identifier and communicate with the UE using a satellite beam corresponding to the satellite beam identifier.

The I/O controller 1415 may manage input and output signals for the device 1405. The I/O controller 1415 may also manage peripherals not integrated into the device 1405. In some cases, the I/O controller 1415 may represent a physical connection or port to an external peripheral. In some cases, the I/O controller 1415 may utilize an operating system such as iOS®, ANDROID®, MS-DOS®, MS-WINDOWS®, OS/2®, UNIX®, LINUX®, or another known operating system. In other cases, the I/O controller 1415 may represent or interact with a modem, a keyboard, a mouse, a touchscreen, or a similar device. In some cases, the I/O controller 1415 may be implemented as part of a processor. In some cases, a user may interact with the device 1405 via the I/O controller 1415 or via hardware components controlled by the I/O controller 1415.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM and ROM. The memory 1430 may store computer-readable, computer-executable code 1440 including instructions that, when executed, cause the processor to perform various functions described herein. In some cases, the memory 1430 may contain, among other things, a BIOS which may control basic hardware or software operation such as the interaction with peripheral components or devices.

The processor 1435 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1435 may be configured to operate a memory array using a memory controller. In other cases, a memory controller may be integrated into the processor 1435. The processor 1435 may be configured to execute computer-readable instructions stored in a memory (e.g., the memory 1430) to cause the device 1405 to perform various functions (e.g., functions or tasks supporting bandwidth part switching by activation and signaling).

The computer-executable code 1440 may include instructions to implement aspects of the present disclosure, including instructions to support wireless communications. The computer-executable code 1440 may be stored in a non-transitory computer-readable medium such as system memory or other type of memory. In some cases, the computer-executable code 1440 may not be directly executable by the processor 1435 but may cause a computer (e.g., when compiled and executed) to perform functions described herein.

FIG. 15 shows a flowchart illustrating a method 1500 that supports bandwidth part switching by activation and signaling in accordance with one or more aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may receive, from a network entity, a first control message that indicates a mapping of each index of a set of indexes to a bandwidth part identifier and a corresponding beam identifier. The operations of 1505 may be performed according to the methods described herein. In some examples, aspects of the operations of 1505 may be performed by a MAC-CE Component as described with reference to FIGS. 7 through 10.

At 1510, the UE may receive, from the network entity, a second control message that includes an indication of an index of the set of indexes. The operations of 1510 may be performed according to the methods described herein. In some examples, aspects of the operations of 1510 may be performed by a DCI component as described with reference to FIGS. 7 through 10.

At 1515, the UE may communicate with the network entity on a bandwidth part in a beam that is mapped to the indicated index by the first control message. The operations of 1515 may be performed according to the methods described herein. In some examples, aspects of the operations of 1515 may be performed by a communication interface as described with reference to FIGS. 7 through 10.

FIG. 16 shows a flowchart illustrating a method 1600 that supports bandwidth part switching by activation and signaling in accordance with one or more aspects of the present disclosure. The operations of method 1600 may be implemented by a network entity or its components as described herein. For example, the operations of method 1600 may be performed by a communications manager as described with reference to FIGS. 11 through 14. In some examples, a network entity may execute a set of instructions to control the functional elements of the network entity to perform the functions described below. Additionally or alternatively, a network entity may perform aspects of the functions described below using special-purpose hardware.

At 1605, the network entity may transmit, to a UE, a first control message that indicates a mapping of each index of a set of indexes to a bandwidth part identifier and a corresponding beam identifier. The operations of 1605 may be performed according to the methods described herein. In some examples, aspects of the operations of 1605 may be performed by a MAC-CE Component as described with reference to FIGS. 11 through 14.

At 1610, the network entity may transmit, to the UE, a second control message that includes an indication of an index of the set of indexes. The operations of 1610 may be performed according to the methods described herein. In some examples, aspects of the operations of 1610 may be performed by a DCI component as described with reference to FIGS. 11 through 14.

At 1615, the network entity may communicate with the UE on a bandwidth part and a beam that is mapped to the indicated index by the first control message. The operations of 1615 may be performed according to the methods described herein. In some examples, aspects of the operations of 1615 may be performed by a communication interface as described with reference to FIGS. 11 through 14.

FIG. 17 shows a flowchart illustrating a method 1700 that supports bandwidth part switching by activation and signaling in accordance with one or more aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1705, the UE may receive, from a network entity, a first control message that includes an indication of a mapping of each TCI state of a subset of TCI states to a respective transmission configuration indicator codepoint. The operations of 1705 may be performed according to the methods described herein. In some examples, aspects of the operations of 1705 may be performed by a MAC-CE Component as described with reference to FIGS. 7 through 10.

At 1710, the UE may receive, from the network entity, a second control message that includes a transmission configuration indicator codepoint and an indication of a bandwidth part identifier. The operations of 1710 may be performed according to the methods described herein. In some examples, aspects of the operations of 1710 may be performed by a DCI component as described with reference to FIGS. 7 through 10.

At 1715, the UE may communicate with the network entity on a bandwidth part corresponding to the indicated bandwidth part identifier and in a beam that is identified by a TCI state that is mapped to the indicted transmission configuration indicator codepoint by the first control message. The operations of 1715 may be performed according to the methods described herein. In some examples, aspects of the operations of 1715 may be performed by a communication interface as described with reference to FIGS. 7 through 10.

FIG. 18 shows a flowchart illustrating a method 1800 that supports bandwidth part switching by activation and signaling in accordance with one or more aspects of the present disclosure. The operations of method 1800 may be implemented by a network entity or its components as described herein. For example, the operations of method 1800 may be performed by a communications manager as described with reference to FIGS. 11 through 14. perform. In some examples, a network entity may execute a set of instructions to control the functional elements of the network entity to perform the functions described below. Additionally or alternatively, a network entity may perform aspects of the functions described below using special-purpose hardware.

At 1805, the network entity may transmit, to a UE, a first control message that includes an indication of a mapping of each TCI state of a subset of TCI states to a respective transmission configuration indicator codepoint. The operations of 1805 may be performed according to the methods described herein. In some examples, aspects of the operations of 1805 may be performed by a MAC-CE Component as described with reference to FIGS. 11 through 14.

At 1810, the network entity may transmit, to the UE, a second control message that includes an indication of a transmission configuration indicator codepoint and an indication of a bandwidth part identifier. The operations of 1810 may be performed according to the methods described herein. In some examples, aspects of the operations of 1810 may be performed by a DCI component as described with reference to FIGS. 11 through 14.

At 1815, the network entity may communicate with the network entity on a bandwidth part corresponding to the indicated bandwidth part identifier and in a beam that is identified by a TCI state that is mapped to the indicted TCI codepoint by the first control message. The operations of

1815 may be performed according to the methods described herein. In some examples, aspects of the operations of 1815 may be performed by a communication interface as described with reference to FIGS. 11 through 14.

FIG. 19 shows a flowchart illustrating a method 1900 that supports bandwidth part switching by activation and signaling in accordance with aspects of the present disclosure. The operations of method 1900 may be implemented by a UE 115 or its components as described herein. For example, the operations of method 1900 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1905, the UE may receive, from a network entity, a control message that includes an indication of a TCI state identifier. The operations of 1905 may be performed according to the methods described herein. In some examples, aspects of the operations of 1905 may be performed by a MAC-CE Component as described with reference to FIGS. 7 through 10.

At 1910, the UE may determine that a TCI state corresponding to the TCI state identifier includes an indication of a satellite beam identifier. The operations of 1910 may be performed according to the methods described herein. In some examples, aspects of the operations of 1910 may be performed by a TCI component as described with reference to FIGS. 7 through 10.

At 1915, the UE may communicate with the network entity using a satellite beam corresponding to the satellite beam identifier. The operations of 1915 may be performed according to the methods described herein. In some examples, aspects of the operations of 1915 may be performed by a communication interface as described with reference to FIGS. 7 through 10.

FIG. 20 shows a flowchart illustrating a method 2000 that supports bandwidth part switching by activation and signaling in accordance with one or more aspects of the present disclosure. The operations of method 2000 may be implemented by a network entity or its components as described herein. For example, the operations of method 2000 may be performed by a communications manager as described with reference to FIGS. 11 through 14. In some examples, a network entity may execute a set of instructions to control the functional elements of the network entity to perform the functions described below. Additionally or alternatively, a network entity may perform aspects of the functions described below using special-purpose hardware.

At 2005, the network entity may transmit, to a UE, a control message that includes an indication of a TCI state identifier, a TCI state corresponding to the TCI state identifier including an indication of a satellite beam identifier. The operations of 2005 may be performed according to the methods described herein. In some examples, aspects of the operations of 2005 may be performed by a MAC-CE Component as described with reference to FIGS. 11 through 14.

At 2010, the network entity may communicate with the UE using a satellite beam corresponding to the satellite beam identifier. The operations of 2010 may be performed according to the methods described herein. In some examples, aspects of the operations of 2010 may be performed by a communication interface as described with reference to FIGS. 11 through 14.

FIG. 21 shows a flowchart illustrating a method 2100 that supports bandwidth part switching by activation and signaling in accordance with one or more aspects of the present disclosure. The operations of method 2100 may be implemented by a UE 115 or its components as described herein. For example, the operations of method 2100 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 2105, the UE may receive, from a network entity, a control message that includes an indication of a TCI state identifier associated with a TCI state, the TCI state including an indication of a satellite beam identifier. The operations of 2105 may be performed according to the methods described herein. In some examples, aspects of the operations of 2105 may be performed by a MAC-CE Component as described with reference to FIGS. 7 through 10.

At 2110, the UE may communicate with the network entity using a satellite beam corresponding to the satellite beam identifier. The operations of 2110 may be performed according to the methods described herein. In some examples, aspects of the operations of 2110 may be performed by a communication interface as described with reference to FIGS. 7 through 10.

The following provides a first overview of aspects of the present disclosure:

Aspect 1: A method for wireless communications at a UE, comprising: receiving, from a network entity, a first control message that includes an indication of a mapping of each TCI state of a subset of TCI states to a respective transmission configuration indicator codepoint; receiving, from the network entity, a second control message that includes a transmission configuration indicator codepoint and an indication of a bandwidth part identifier; and communicating with the network entity on a bandwidth part corresponding to the indicated bandwidth part identifier and in a beam that is identified by a TCI state that is mapped to the indicted transmission configuration indicator codepoint by the first control message.

Aspect 2: The method of aspect 1, wherein receiving the second control message comprises: receiving, from the network entity, the second control message in a single transmission that includes the transmission configuration indicator codepoint and the indication of the bandwidth part identifier.

Aspect 3: The method of any of aspects 1 though 2, wherein receiving the second control message comprises: receiving the second control message that indicates a TCI state identifier corresponding to the TCI state having a TCI state type corresponding to a satellite beam index type.

Aspect 4: The method of any of aspects 1 though 3, further comprising: receiving, from the network entity, a RRC message that configures a set of TCI states that include a TCI state identifier, a TCI state type, and a satellite beam identifier, the first control message including the indication of the mapping of each transmission configuration indicator state to the respective transmission configuration indicator codepoint.

Aspect 5: The method of any of aspects 1 though 4, wherein receiving the first control message comprises: receiving a MAC-CE message that indicates the mapping.

Aspect 6: The method of any of aspects 1 though 5, wherein receiving the first control message comprises: receiving a bitmap, each value in the bitmap indicating an activation state of a corresponding TCI state, the respective TCI codepoint being mapped to the TCI state based at least in part on the activation state being an active state as indicated by the bitmap.

Aspect 7: The method of any of aspects 1 though 6, wherein receiving the second control message comprises: receiving a DCI message that includes the transmission configuration indicator codepoint and the bandwidth part identifier.

Aspect 8: The method of any of aspects 1 though 7, further comprising: receiving a RRC message that indicates that the UE is to switch an uplink bandwidth part when a downlink bandwidth part is switched by the transmission configuration indicator codepoint of the second control message.

Aspect 9: The method of aspect 8, further comprising: determining that the bandwidth part corresponding to the indicated bandwidth part identifier is different from a current bandwidth part; and identifying an uplink bandwidth part different from the current bandwidth part based at least in part on determining that the bandwidth part is different from the current bandwidth part in accordance with the RRC message.

Aspect 10: The method of any of aspects 1 though 9, wherein communicating with the network entity comprises: determining that the beam that is identified by the TCI state is different from a current beam; and performing a beam switch procedure to communicate with the network entity on the bandwidth part in the beam based at least in part on determining that the beam is different from the current beam.

Aspect 11: The method of aspect 10, wherein performing the beam switch procedure comprises: identifying one or more default bandwidth parts that correspond to the beam.

Aspect 12: The method of any of aspects 10 though 11, wherein performing the beam switch procedure comprises: adjusting a frequency compensation, a timing parameter, or a combination thereof corresponding to the beam.

Aspect 13: The method of any of aspects 1 though 12, further comprising: de-mapping the transmission configuration indicator codepoint based at least in part on the mapping indicated in the first control message to identify the TCI state that indicates the beam.

Aspect 14: The method of any of aspects 1 though 13, further comprising: identifying the beam from the TCI state based at least in part on a satellite beam identifier, a cell identifier, or a synchronization signal block index included in the TCI state.

Aspect 15: The method of any of aspects 1 though 14, wherein the first control message is a medium access control layer signaling message and the second control message is a physical layer signaling message.

Aspect 16: A method of wireless communications at a network entity, comprising: transmitting, to a UE, a first control message that includes an indication of a mapping of each TCI state of a subset of TCI states to a respective transmission configuration indicator codepoint; transmitting, to the UE, a second control message that includes an indication of a transmission configuration indicator codepoint and an indication of a bandwidth part identifier; and communicating with the network entity on a bandwidth part corresponding to the indicated bandwidth part identifier and in a beam that is identified by a TCI state that is mapped to the indicted transmission configuration indicator codepoint by the first control message.

Aspect 17: The method of aspect 16, wherein transmitting the second control message comprises: transmit, by the network entity, the second control message in a single transmission that includes the transmission configuration indicator codepoint and the indication of the bandwidth part identifier.

Aspect 18: The method of any of aspects 16 though 17, wherein transmitting the second control message comprises: transmitting the second control message that indicates the transmission configuration indicator codepoint corresponding to the TCI state having a TCI state type corresponding to a satellite beam index type.

Aspect 19: The method of any of aspects 16 though 18, further comprising: transmitting, to the UE, a RRC message that configures a set of TCI states that include a TCI state identifier, a TCI state type, and a satellite beam identifier, the first control message including the indication of the mapping of each TCI state to the respective TCI codepoint.

Aspect 20: A method of wireless communications at a UE, comprising: receiving, from a network entity, a control message that includes an indication of a TCI state identifier associated with a TCI state, the TCI state including an indication of a satellite beam identifier; and communicating with the network entity using a satellite beam corresponding to the satellite beam identifier.

Aspect 21: The method of aspect 20, further comprising: receiving, from the network entity, a RRC message that configures a set of TCI states that include a TCI state identifier, a TCI state type, and a satellite beam identifier, the control message including the indication of a TCI state identifier configured by the RRC message.

Aspect 22: The method of any of aspects 20 though 21, further comprising: determining that the TCI state has a TCI state type of satellite beam index type.

Aspect 23: A method of wireless communications at a network entity, comprising: transmitting, to a UE, a control message that includes an indication of a TCI state identifier, a TCI state corresponding to the TCI state identifier including an indication of a satellite beam identifier; and communicating with the UE using a satellite beam corresponding to the satellite beam identifier.

Aspect 24: The method of aspect 23, further comprising: transmitting, to the UE, a RRC message that configures a set TCI states that include a TCI state identifier, a TCI state type, and a satellite beam identifier, the control message including the indication of a TCI state identifier configured by the RRC message.

Aspect 25: The method of any of aspects 23 though 24, wherein transmitting the control message comprises: transmitting the control message that indicates the TCI state that is associated with has a TCI state type of satellite beam index type.

Aspect 26: A method for wireless communications at a UE, comprising: receiving, from a network entity, a first control message that indicates a mapping of each index of a set of indexes to a bandwidth part identifier and a corresponding beam identifier; receiving, from the network entity, a second control message that includes an indication of an index of the set of indexes; and communicating with the network entity on a bandwidth part in a beam that is mapped to the indicated index by the first control message.

Aspect 27: The method of aspect 26, wherein receiving the first control message comprises: receiving the first control message that indicates the mapping of each index to the bandwidth part identifier, the corresponding beam identifier, and a satellite identifier.

Aspect 28: The method of any of aspects 26 though 27, wherein receiving the first control message comprises: receiving a MAC-CE message that indicates the mapping.

Aspect 29: A method of wireless communications at a network entity, comprising: transmitting, to a UE, a first control message that indicates a mapping of each index of a set of indexes to a bandwidth part identifier and a corresponding beam identifier; transmitting, to the UE, a second control message that includes an indication of an index of the set of indexes; and communicating with the UE on a bandwidth part and a beam that is mapped to the indicated index by the first control message.

Aspect 30: The method of aspect 29, wherein transmitting the first control message comprises: transmitting the first control message that indicates the mapping of each index to the bandwidth part identifier, the corresponding beam identifier, and a satellite identifier.

Aspect 31: An apparatus for wireless communications at a UE, comprising a processor; memory coupled with the processor; and instructions stored in the memory and executable by the processor to cause the apparatus to perform a method of any of aspects 1 through 15.

Aspect 32: An apparatus for wireless communications at a UE, comprising at least one means for performing a method of any of aspects 1 though 15.

Aspect 33: A non-transitory computer-readable medium storing code for wireless communications at a UE, the code comprising instructions executable by a processor to perform a method of any of aspects 1 though 15.

Aspect 34: An apparatus comprising a processor; memory coupled with the processor; and instructions stored in the memory and executable by the processor to cause the apparatus to perform a method of any of aspects 16 though 19.

Aspect 35: An apparatus comprising at least one means for performing a method of any of aspects 16 though 19.

Aspect 36: A non-transitory computer-readable medium storing code the code comprising instructions executable by a processor to perform a method of any of aspects 16 through 19.

Aspect 37: An apparatus comprising a processor; memory coupled with the processor; and instructions stored in the memory and executable by the processor to cause the apparatus to perform a method of any of aspects 20 though 22.

Aspect 38: An apparatus comprising at least one means for performing a method of any of aspects 20 though 22.

Aspect 39: A non-transitory computer-readable medium storing code the code comprising instructions executable by a processor to perform a method of any of aspects 20 through 22.

Aspect 40: An apparatus comprising a processor; memory coupled with the processor; and instructions stored in the memory and executable by the processor to cause the apparatus to perform a method of any of aspects 23 though 25.

Aspect 41: An apparatus comprising at least one means for performing a method of any of aspects 23 though 25.

Aspect 42: A non-transitory computer-readable medium storing code the code comprising instructions executable by a processor to perform a method of any of aspects 23 through 25.

Aspect 43: An apparatus for wireless communications at a UE, comprising a processor; memory coupled with the processor; and instructions stored in the memory and executable by the processor to cause the apparatus to perform a method of any of aspects 26 through 28.

Aspect 44: An apparatus for wireless communications at a UE, comprising at least one means for performing a method of any of aspects 26 though 28.

Aspect 45: A non-transitory computer-readable medium storing code for wireless communications at a UE, the code comprising instructions executable by a processor to perform a method of any of aspects 26 though 28.

Aspect 46: An apparatus comprising a processor; memory coupled with the processor; the processor and memory configured to perform a method of any of aspects 29 through 30.

Aspect 47: An apparatus comprising at least one means for performing a method of any of aspects 29 though 30.

Aspect 48: A non-transitory computer-readable medium storing code the code comprising instructions executable by a processor to perform a method of any of aspects 29 through 30.

The following provides a second overview of examples of the present disclosure:

Example 1: A method of wireless communications at a UE, comprising: receiving, from a network entity, a first control message that indicates a mapping of each index of a set of indexes to a bandwidth part identifier and a corresponding beam identifier; receiving, from the network entity, a second control message that includes an indication of an index of the set of indexes; and communicating with the network entity on a bandwidth part in a beam that is mapped to the indicated index by the first control message.

Example 2: The method of example 1, the receiving the first control message comprising: receiving a MAC-CE message that indicates the mapping.

Example 3: The method of any of examples 1 and 2, the receiving the first control message comprising: receiving the first control message that indicates the mapping such that each index is mapped to the bandwidth part identifier corresponding to an uplink bandwidth part or such that each index is mapped to the bandwidth part identifier corresponding to a downlink bandwidth part.

Example 4: The method of any of examples 1 to 3, the receiving the first control message comprising: receiving the first control messages that indicates the mapping of each index to the bandwidth part identifier, the corresponding beam identifier, and a satellite identifier.

Example 5: The method of any of examples 1 to 4, the receiving the first control message comprising: receiving the first control message that indicates the mapping based at least in part on the corresponding beam identifier being included in a parameter of a bandwidth part indicated by the corresponding bandwidth part identifier.

Example 6: The method of any of examples 1 to 5, the receiving the second control message comprising: receiving a DCI message that includes the indication of the index.

Example 7: The method of example 6, wherein the indication of the index comprises a bandwidth part index field.

Example 8: The method of any of examples 1 to 7, further comprising: receiving a third control message having a same format as the first control message, the third control message indicating a new mapping of each index of the set of indexes to a bandwidth part identifier and a corresponding beam identifier, the third control message being received based at least in part on a change in location of the UE relative to the beam.

Example 9: The method of any of examples 1 to 8, the communicating with the network entity comprising: determining that the beam that is mapped to the indicated index is different from a current beam; and performing a beam switch procedure to communicate with the network entity on the beam based at least in part on determining that the beam is different from the current beam.

Example 10: The method of example 9, the performing the beam switch procedure comprising: identifying one or more default bandwidth parts that correspond to the beam.

Example 11: The method of any of examples 9 and 10, the performing the beam switch procedure comprising: adjusting a frequency compensation, a timing parameter, or a combination thereof corresponding to the beam.

Example 12: The method of any of examples 1 to 11, further comprising: de-mapping the indicated index based at least in part on the mapping indicated in the first control message to identify the bandwidth part and the beam.

Example 13: The method of any of examples 1 to 12, wherein the network entity comprises a satellite.

Example 14: The method of any of examples 1 to 13, wherein the first control message is a medium access control layer signaling message and the second control message is a physical layer signaling message.

Example 15: An apparatus for wireless communication comprising at least one means for performing a method of any one of examples 1 though 14.

Example 16: An apparatus for wireless communication comprising a processor and memory coupled to the processor, the processor and memory configured to perform a method of any one of examples 1 though 14j.

Example 17: A non-transitory computer-readable medium storing code for wireless communication, the code comprising instructions executable by a processor to perform a method of any one of examples 1 though 14j.

Example 18: A method of wireless communications at a network entity, comprising: transmitting, to a UE, a first control message that indicates a mapping of each index of a set of indexes to a bandwidth part identifier and a corresponding beam identifier; transmitting, to the UE, a second control message that includes an indication of an index of the set of indexes; and communicating with the UE on a bandwidth part and a beam that is mapped to the indicated index by the first control message.

Example 19: The method of example 18, the transmitting the first control message comprising: transmitting a MAC-CE message that indicates the mapping.

Example 20: The method of any of examples 18 to 19, the transmitting the first control message comprising: transmitting the first control message that indicates the mapping such that each index is mapped to the bandwidth part identifier corresponding to an uplink bandwidth part or such that each index is mapped to the bandwidth part identifier corresponding to a downlink bandwidth part.

Example 21: The method of any of examples 18 to 20, the transmitting the first control message comprising: transmitting the first control messages that indicates the mapping of each index to the bandwidth part identifier, the corresponding beam identifier, and a satellite identifier.

Example 22: The method of any of examples 18 to 21, the transmitting the first control message comprising: transmitting the first control message that indicates the mapping based at least in part on the corresponding beam identifier being included in a parameter of a bandwidth part indicated by the corresponding bandwidth part identifier.

Example 23: The method of any of examples 18 to 22, transmitting the second control message comprising: transmitting a DCI message that includes the indication of the index.

Example 24: The method of example 23, wherein the indication of the index comprises a bandwidth part index field.

Example 25: The method of any of examples 18 to 24, further comprising: transmitting a third control message having a same format as the first control message, the third control message indicating a new mapping of each index of the set of indexes to a bandwidth part identifier and a corresponding beam identifier, the third control message being transmitted based at least in part on a change in location of the UE relative to the beam.

Example 26: The method of any of examples 18 to 25, the communicating with the UE comprising: determining that the beam that is mapped to the indicated index is different from a current beam; and performing a beam switch procedure to communicate with the UE on the beam based at least in part on determining that the beam is different from the current beam.

Example 27: The method of example 26, the performing the beam switch procedure comprising: identifying one or more default bandwidth parts that correspond to the beam.

Example 28: The method of any of examples 25 to 26, the performing the beam switch procedure comprising: adjusting a frequency compensation, a timing parameter, or a combination thereof corresponding to the beam.

Example 29: The method of any of examples 18 to 26, wherein the network entity comprises a satellite.

Example 30: The method of any of examples 18 to 26, wherein the first control message is a medium access control layer signaling message and the second control message is a physical layer signaling message.

Example 31: An apparatus for wireless communication comprising at least one means for performing a method of any one of examples 18 though 30.

Example 32: An apparatus for wireless communication comprising a processor and memory coupled to the processor, the processor and memory configured to perform a method of any one of examples 18 though 30

Example 33: A non-transitory computer-readable medium storing code for wireless communication, the code comprising instructions executable by a processor to perform a method of any one of examples 18 though 30.

Example 34: A method of wireless communications at a UE comprising: receiving, from a network entity, a first control message that includes an indication of a mapping of each TCI state of a subset of TCI states to a respective transmission configuration indicator codepoint; receiving, from the network entity, a second control message that includes a transmission configuration indicator codepoint and an indication of a bandwidth part identifier; and communicating with the network entity on a bandwidth part corresponding to the indicated bandwidth part identifier and in a beam that is identified by a TCI state that is mapped to the indicted transmission configuration indicator codepoint by the first control message.

Example 35: The method of example 34, further comprising: receiving, from the network entity, a RRC message that configures a set of TCI states that include a TCI state identifier, a TCI state type, and a satellite beam identifier, the first control message including the indication of the mapping of each transmission configuration indicator state to the respective transmission configuration indicator codepoint.

Example 36: The method of any of examples 34 to 35, the receiving the first control message comprising: receiving a MAC-CE message that indicates the mapping.

Example 37: The method of any of examples 34 to 36, the receiving the first control message comprising: receiving a bitmap, each value in the bitmap indicating an activation state of a corresponding TCI state, the respective TCI codepoint being mapped to the TCI state based at least in part on the activation state being an active state as indicated by the bitmap.

Example 38: The method of any of examples 34 to 37, the receiving the second control message comprising: receiving a DCI message that includes the transmission configuration indicator codepoint and the bandwidth part identifier.

Example 39: The method of any of examples 34 to 38, the receiving the second control message comprising: receiving the second control message that indicates the TCI state identifier corresponding to the TCI state having a TCI state type corresponding to a satellite beam index type.

Example 40: The method of any of examples 34 to 39, further comprising: receiving a RRC message that indicates that the UE is to switch an uplink bandwidth part when a downlink bandwidth part is switched by the transmission configuration indicator codepoint of the second control message.

Example 41: The method of any of examples 34 to 40, further comprising: determining that the bandwidth part corresponding to the indicated bandwidth part identifier is different from a current bandwidth part; and identifying an uplink bandwidth part different from the current bandwidth part based at least in part on determining that the bandwidth part is different from the current bandwidth part in accordance with the RRC message.

Example 42: The method of any of examples 34 to 41, the communicating with the network entity comprising: determining that the beam that is identified by the TCI state is different from a current beam; and performing a beam switch procedure to communicate with the network entity on the bandwidth part in the beam based at least in part on determining that the beam is different from the current beam.

Example 43: The method of example 42, the performing the beam switch procedure comprising: identifying one or more default bandwidth parts that correspond to the beam.

Example 44: The method of any of examples 41 and 42, the performing the beam switch procedure comprising: adjusting a frequency compensation, a timing parameter, or a combination thereof corresponding to the beam.

Example 45: The method of an of examples 34 to 44, further comprising: de-mapping the transmission configuration indicator codepoint based at least in part on the mapping indicated in the first control message to identify the TCI sate that indicates the beam.

Example 46: The method of any of examples 34 to 45, further comprising: identifying the beam from the TCI state based at least in part on a satellite beam identifier, a cell identifier, or a synchronization signal block index included in the TCI state.

Example 47: The method of any of examples 34 to 46, wherein the first control message is a medium access control layer signaling message and the second control message is a physical layer signaling message.

Example 48: An apparatus for wireless communication comprising at least one means for performing a method of any one of examples 34 though 47.

Example 49 An apparatus for wireless communication comprising a processor and memory coupled to the processor, the processor and memory configured to perform a method of any one of examples 34 though 47.

Example 50: A non-transitory computer-readable medium storing code for wireless communication, the code comprising instructions executable by a processor to perform a method of any one of examples 34 though 47.

Example 51: A method of wireless communications at a network entity, comprising: transmitting, to a UE, a first control message that includes an indication of a mapping of each TCI state of a subset of TCI states to a respective transmission configuration indicator codepoint; transmitting, to the UE, a second control message that includes an indication of a transmission configuration indicator codepoint and an indication of a bandwidth part identifier; and communicating with the network entity on a bandwidth part corresponding to the indicated bandwidth part identifier and in a beam that is identified by a TCI state that is mapped to the indicted TCI codepoint by the first control message.

Example 52: The method of example 51: further comprising: transmitting, to the UE, a RRC message that configures a set of TCI states that include a TCI state identifier, a TCI state type, and a satellite beam identifier, the first control message including the indication of the mapping of each TCI state to the respective TCI codepoint.

Example 53: The method of any of examples 51 to 52, the transmitting the first control message comprising: transmitting a MAC-CE message that indicates the mapping.

Example 54: The method of any of examples 51 to 53, the transmitting the second control message comprising: transmitting a bitmap, each value in the bitmap indicating an activation state of a corresponding TCI state, the respective TCI codepoint being mapped to the TCI state based at least in part on the activation state being an active state as indicated by the bitmap.

Example 55: The method of any of examples 51 to 54, the transmitting the second control message comprising: transmitting a DCI message that includes the indication of the transmission configuration indicator codepoint and the bandwidth part identifier.

Example 56: The method of any of examples 51 to 55, the transmitting the second control message comprising: transmitting the second control message that indicates the transmission configuration indicator codepoint corresponding to the TCI state having a TCI state type corresponding to a satellite beam index type.

Example 57: The method of any of examples 51 to 56, further comprising: transmitting a RRC message that indicates that the UE is to switch an uplink bandwidth part when a downlink bandwidth part is switched by the transmission configuration indicator codepoint of the second control message.

Example 58: The method of any of examples 51 to 57, further comprising: determining that the bandwidth part corresponding to the indicated bandwidth part identifier is different from a current bandwidth part; and identifying an uplink bandwidth part different from the current bandwidth part based at least in part on determining that the bandwidth part is different from the current bandwidth part in accordance with the RRC message.

Example 59: The method of any of examples 51 to 58, the communicating with the UE comprising: determining that the beam that is identified by the TCI state is different from a current beam; and performing a beam switch procedure to communicate with the network entity on the bandwidth part in the beam based at least in part on determining that the beam is different from the current beam.

Example 60: The method of any of examples 51 to 59, further comprising: transmitting an indication of the beam in the TCI state based at least in part on a satellite beam identifier, a cell identifier, or a synchronization signal block index included in the TCI state.

Example 61: The method of any of examples 51 to 60, wherein the first control message is a medium access control layer signaling message and the second control message is a physical layer signaling message.

Example 62: An apparatus for wireless communication comprising at least one means for performing a method of any one of examples 51 though 61.

Example 63: An apparatus for wireless communication comprising a processor and memory coupled to the processor, the processor and memory configured to perform a method of any one of examples 51 though 61.

Example 64: A non-transitory computer-readable medium storing code for wireless communication, the code comprising instructions executable by a processor to perform a method of any one of examples 51 though 61.

Example 65: A method of wireless communications at a UE, comprising: receiving, from a network entity, a control message that includes an indication of a TCI state identifier; determining that a TCI state corresponding to the TCI state identifier includes an indication of a satellite beam identifier; and communicating with the network entity using a satellite beam corresponding to the satellite beam identifier.

Example 66: The method of example 65, further comprising: receiving, from the network entity, a RRC message that configures a set of TCI states that include a TCI state identifier, a TCI state type, and a satellite beam identifier, the control message including the indication of a TCI state identifier configured by the RRC message.

Example 67: The method of any of examples 65 to 66, the determining that the TCI state includes the indication of the satellite beam identifier comprising: determining that the TCI state has a TCI state type of satellite beam index type.

Example 68: The method of any of examples 65 to 67, the receiving the control message comprising: receiving a MAC-CE message that includes the indication of the TCI state identifier.

Example 69: The method of any of examples 65 to 68, the receiving the control message comprising: receiving the control message that includes the indication of the TCI state identifier and an indication of a sub-TCI state identifier, wherein the satellite beam is identified based at least in part on the indication of the sub-TCI state identifier.

Example 70: The method of example 69, wherein the sub-TCI state identifier is included in the TCI state identified by the TCI state identifier and a sub-TCI state corresponding to the sub-TCI state identifier includes the indication of the satellite beam.

Example 71: The method of any of examples 69 and 70, wherein a sub-TCI state corresponding to the sub-TCI state identifier includes an indication of a satellite identifier corresponding to the satellite beam.

Example 72: The method of any of examples 65 to 71, further comprising: determining that an activate TCI state corresponding to the indicated bandwidth part is a TCI state that includes an indication of the satellite beam identifier; and performing a beam switch procedure based at least in part on determining that the activate TCI state includes the indication of the satellite beam identifier.

Example 73; The method of any of examples 65 to 72, further comprising: determining that an activate TCI state corresponding to the indicated bandwidth part is a TCI state that includes an indication of the satellite beam identifier; and performing a beam switch procedure based at least in part on determining that the activate TCI state includes the indication of the satellite beam identifier.

Example 74: The method of any of examples 65 to 73, further comprising: determining that the satellite beam corresponding to the satellite beam identifier is different from a current beam; and performing a beam switch procedure to communicate with the network entity on the satellite beam based at least in part on determining that the satellite beam is different from the current beam.

Example 75: An apparatus for wireless communication comprising at least one means for performing a method of any one of examples 65 though 74.

Example 76: An apparatus for wireless communication comprising a processor and memory coupled to the processor, the processor and memory configured to perform a method of any one of examples 65 though 74.

Example 77: A non-transitory computer-readable medium storing code for wireless communication, the code comprising instructions executable by a processor to perform a method of any one of examples 65 though 74.

Example 78: A method wireless communications at a network entity, comprising: transmitting, to a UE, a control message that includes an indication of a TCI state identifier, a TCI state corresponding to the TCI state identifier including an indication of a satellite beam identifier; and communicating with the UE using a satellite beam corresponding to the satellite beam identifier.

Example 79: The method of example 78, further comprising: transmitting, to the UE, a RRC message that configures a set of TCI states that include a TCI state identifier, a TCI state type, and a satellite beam identifier, the control message including the indication of a TCI state identifier configured by the RRC message.

Example 80: The method of any of examples 78 to 79, the transmitting the control message comprising: transmitting the control message that indicates the TCI state that is associated with has a TCI state type of satellite beam index type.

Example 81: The method of any of examples 78 to 80, the transmitting the control message comprising: transmitting a MAC-CE message that includes the indication of the TCI state identifier.

Example 82: The method of any of examples 78 to 81, the transmitting the control message comprising: transmitting the control message that includes the indication of the TCI state identifier and an indication of a sub-TCI state identifier, wherein the satellite beam is identified based at least in part on the indication of the sub-TCI state identifier.

Example 83: The method of example 82, further comprising: wherein the sub-TCI state identifier is included in the TCI state identified by the TCI state identifier and a sub-TCI state corresponding to the sub-TCI state identifier includes the indication of the satellite beam.

Example 84: The method of any of examples 78 to 83, wherein a sub-TCI state corresponding to the sub-TCI state identifier includes an indication of a satellite identifier corresponding to the satellite beam.

Example 85: The method of any of examples 78 to 84, further comprising: transmitting, to the UE, a DCI message that indicates a bandwidth part identifier, the communicating being performed on a bandwidth part corresponding to the indicated bandwidth part identifier.

Example 86: An apparatus for wireless communication comprising at least one means for performing a method of any one of examples 78 though 85.

Example 87: An apparatus for wireless communication comprising a processor and memory coupled to the processor, the processor and memory configured to perform a method of any one of examples 78 though 85.

Example 88: A non-transitory computer-readable medium storing code for wireless communication, the code comprising instructions executable by a processor to perform a method of any one of examples 78 though 85.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a user equipment (UE), comprising:
   one or more memories; and
   one or more processors coupled with the one or more memories and configured to cause the UE to:
      receive, from a network entity, a radio resource control message that configures a set of transmission configuration indicator states that include respective transmission configuration indicator state identifiers, respective transmission configuration indicator state types, and respective satellite beam identifiers;

receive, from the network entity, a first control message that includes an indication of a mapping of each transmission configuration indicator state of a subset of the set of transmission configuration indicator states to a respective transmission configuration indicator codepoint, wherein the first control message further includes a transmission configuration indicator state identifier indicative that at least one transmission configuration indicator state of the subset of the set of transmission configuration indicator states is a satellite beam index type;

receive, from the network entity, a second control message that includes a transmission configuration indicator codepoint and an indication of a bandwidth part identifier, wherein the transmission configuration indicator codepoint is mapped by the first control message to a transmission configuration indicator state of the at least one transmission configuration indicator state; and communicate with the network entity on a bandwidth part that corresponds to the bandwidth part identifier and in a beam that is indicated in the transmission configuration indicator state.

2. The apparatus of claim 1, wherein, to receive the second control message, the one or more processors are configured to cause the UE to:

receive, from the network entity, the second control message in a single transmission that includes the transmission configuration indicator codepoint and the indication of the bandwidth part identifier.

3. The apparatus of claim 1, wherein, to receive the first control message, the one or more processors are configured to cause the UE to:

receive a medium access control-control element (MAC-CE) message that indicates the mapping.

4. The apparatus of claim 1, wherein, to receive the first control message, the one or more processors are configured to cause the UE to:

receive a bitmap, wherein each value in the bitmap indicates an activation state of a corresponding transmission configuration indicator state, and wherein the respective transmission configuration indicator codepoint is mapped to the transmission configuration indicator state based at least in part on the activation state being an active state as indicated by the bitmap.

5. The apparatus of claim 1, wherein, to receive the second control message, the one or more processors are configured to cause the UE to:

receive a downlink control information message that includes the transmission configuration indicator codepoint and the bandwidth part identifier.

6. The apparatus of claim 1, wherein the radio resource control message indicates that the UE is to switch to an uplink bandwidth part when a downlink bandwidth part is switched by the transmission configuration indicator codepoint of the second control message.

7. The apparatus of claim 6, wherein the one or more processors are configured to cause the UE to:

determine the bandwidth part that corresponds to the bandwidth part identifier to be different from a current bandwidth part; and identify the uplink bandwidth part different from the current bandwidth part based at least in part on the determination that the bandwidth part is different from the current bandwidth part in accordance with the radio resource control message.

8. The apparatus of claim 1, wherein, to communicate with the network entity, the one or more processors are configured to cause the UE to:

determine that the beam identified by the transmission configuration indicator state is different from a current beam; and perform a beam switch procedure to communicate with the network entity on the bandwidth part in the beam based at least in part on the determination that the beam is different from the current beam.

9. The apparatus of claim 8, wherein, to perform the beam switch procedure, the one or more processors are configured to cause the UE to:

identify one or more default bandwidth parts that correspond to the beam.

10. The apparatus of claim 8, wherein, to perform the beam switch procedure, the one or more processors are configured to cause the UE to:

adjust a frequency compensation, a timing parameter, or a combination thereof corresponding to the beam.

11. The apparatus of claim 1, wherein the one or more processors are configured to cause the UE to:

de-map the transmission configuration indicator codepoint based at least in part on the mapping indicated in the first control message to identify the transmission configuration indicator state that indicates the beam.

12. The apparatus of claim 1, wherein the one or more processors are configured to cause the UE to:

identify the beam from the transmission configuration indicator state based at least in part on a satellite beam identifier, a cell identifier, or a synchronization signal block index included in the transmission configuration indicator state.

13. The apparatus of claim 1, wherein the first control message is a medium access control layer signaling message and the second control message is a physical layer signaling message.

14. An apparatus for wireless communication at a network entity, comprising:

one or more memories; and one or more processors coupled with the one or more memories and configured to cause the network entity to:

transmit a radio resource control message that configures a set of transmission configuration indicator states that include respective transmission configuration indicator state identifiers, respective transmission configuration indicator state types, and respective satellite beam identifiers;

transmit a first control message that includes an indication of a mapping of each transmission configuration indicator state of a subset of the set of transmission configuration indicator states to a respective transmission configuration indicator codepoint, wherein the first control message further includes a transmission configuration indicator state identifier indicative that at least one transmission configuration indicator state of the subset of the set of transmission configuration indicator states is a satellite beam index type;

transmit a second control message that includes an indication of a transmission configuration indicator codepoint and an indication of a bandwidth part identifier, wherein the transmission configuration indicator codepoint is mapped by the first control message to a transmission configuration indicator state of the at least one transmission configuration indicator state; and communicate on a bandwidth part that corresponds to the bandwidth part identifier and in a beam that is indicated in the transmission configuration indicator state.

15. The apparatus of claim 14, wherein, to transmit the second control message, the one or more processors are configured to cause the network entity to:

transmit the second control message in a single transmission that includes the transmission configuration indicator codepoint and the indication of the bandwidth part identifier.

16. An apparatus for wireless communication at a user equipment (UE), comprising:

one or more memories; and one or more processors coupled with the one or more memories and configured to cause the UE to:

receive, from a network entity, a radio resource control message that configures a set of transmission configuration indicator states, wherein each transmission configuration indicator state of the set of transmission configuration indicator states includes a respective transmission configuration indicator state identifier, a respective transmission configuration indicator state type, and a respective satellite beam identifier;

receive, from the network entity, a control message that includes an indication of a transmission configuration indicator state identifier indicative that a transmission configuration indicator state of the set of transmission configuration indicator states is a satellite beam index type, wherein the control message further includes an indication of a satellite beam identifier; and communicate with the network entity via a satellite beam that corresponds to the satellite beam identifier.

17. The apparatus of claim 16, wherein the one or more processors are configured to cause the UE to:

determine that the transmission configuration indicator state has a transmission configuration indicator state type that is the satellite beam index type.

18. An apparatus for wireless communication at a network entity, comprising:

one or more memories; and one or more processors coupled with the one or more memories and configured to cause the network entity to:

transmit a radio resource control message that configures a set of transmission configuration indicator states that include respective transmission configuration indicator state identifiers, respective transmission configuration indicator state types, and respective satellite beam identifiers;

transmit a control message that includes an indication of a transmission configuration indicator state identifier indicative that a transmission configuration indicator state of the set of transmission configuration indicator states is a satellite beam index type, wherein the control message further includes an indication of a satellite beam identifier; and communicate via a satellite beam that corresponds to the satellite beam identifier.

19. The apparatus of claim 18, wherein, to transmit the control message, the one or more processors are configured to cause the network entity to:

transmit the control message indicative of the transmission configuration indicator state that has a transmission configuration indicator state type that is the satellite beam index type.

20. A method for wireless communication at a user equipment (UE), comprising:

receiving, from a network entity, a radio resource control message that configures a set of transmission configuration indicator states that include respective transmission configuration indicator state identifiers, respective transmission configuration indicator state types, and respective satellite beam identifiers;

receiving, from the network entity, a first control message that includes an indication of a mapping of each transmission configuration indicator state of a subset of the set of transmission configuration indicator states to a respective transmission configuration indicator codepoint, wherein the first control message further includes a transmission configuration indicator state identifier indicative that at least one transmission configuration indicator state of the subset of the set of transmission configuration indicator states is a satellite beam index type;

receiving, from the network entity, a second control message that includes a transmission configuration indicator codepoint and an indication of a bandwidth part identifier, wherein the transmission configuration indicator codepoint is mapped by the first control message to a transmission configuration indicator state of the at least one transmission configuration indicator state; and communicating with the network entity on a bandwidth part that corresponds to the bandwidth part identifier and in a beam that is indicated in the transmission configuration indicator state.

21. The method of claim 20, wherein receiving the second control message comprises:

receiving, from the network entity, the second control message in a single transmission that includes the transmission configuration indicator codepoint and the indication of the bandwidth part identifier.

22. The method of claim 20, wherein receiving the first control message comprises:

receiving a medium access control-control element (MAC-CE) message that indicates the mapping.

23. The method of claim 20, wherein receiving the first control message comprises:

receiving a bitmap, wherein each value in the bitmap indicates an activation state of a corresponding transmission configuration indicator state, and wherein the respective transmission configuration indicator codepoint is mapped to the transmission configuration indicator state based at least in part on the activation state being an active state as indicated by the bitmap.

24. A method for wireless communication at a network entity, comprising:

transmitting a radio resource control message that configures a set of transmission configuration indicator states that include respective transmission configuration indicator state identifiers, respective transmission configuration indicator state types, and respective satellite beam identifiers;

transmitting a first control message that includes an indication of a mapping of each transmission configuration indicator state of a subset of the set of transmission configuration indicator states to a respective transmission configuration indicator codepoint, wherein the first control message further includes a transmission configuration indicator state identifier indicative that at least one transmission configuration indicator state of the subset of the set of transmission configuration indicator states is a satellite beam index type;

transmitting a second control message that includes an indication of a transmission configuration indicator codepoint and an indication of a bandwidth part identifier, wherein the transmission configuration indicator codepoint is mapped by the first control message to a transmission configuration indicator state of the at least one transmission configuration indicator state; and communicating on a bandwidth part that corresponds to the bandwidth part identifier and in a beam that is indicated in the transmission configuration indicator state.

25. The method of claim 24, wherein transmitting the second control message comprises:

transmitting the second control message in a single transmission that includes the transmission configuration indicator codepoint and the indication of the bandwidth part identifier.

26. A method for wireless communication at a user equipment (UE), comprising:

receiving, from a network entity, a radio resource control message that configures a set of transmission configuration indicator states, wherein each transmission configuration indicator state of the set of transmission configuration indicator states includes a respective transmission configuration indicator state identifier, a respective transmission configuration indicator state type, and a respective satellite beam identifier;

receiving, from the network entity, a control message that includes an indication of a transmission configuration indicator state identifier indicative that a transmission configuration indicator state of the set of transmission configuration indicator states is a satellite beam index type, wherein the control message further includes an indication of a satellite beam identifier; and communicating with the network entity via a satellite beam that corresponds to the satellite beam identifier.

27. The method of claim 26, further comprising:

determining that the transmission configuration indicator state has a transmission configuration indicator state type that is the satellite beam index type.

28. A method for wireless communication at a network entity, comprising:

transmitting a radio resource control message that configures a set of transmission configuration indicator states that include respective transmission configuration indicator state identifiers, respective transmission configuration indicator state types, and respective satellite beam identifiers;

transmitting a control message that includes an indication of a transmission configuration indicator state identifier indicative that a transmission configuration indicator state of the set of transmission configuration indicator states is a satellite beam index type, wherein the control message further includes an indication of a satellite beam identifier; and communicating via a satellite beam that corresponds to the satellite beam identifier.

29. The method of claim 28, wherein transmitting the control message comprises:

transmitting the control message indicative of the transmission configuration indicator state that has a transmission configuration indicator state type that is the satellite beam index type.

* * * * *